United States Patent
Hull et al.

(10) Patent No.: US 6,687,404 B1
(45) Date of Patent: Feb. 3, 2004

(54) AUTOMATIC TRAINING OF LAYOUT PARAMETERS IN A 2D IMAGE MODEL

(75) Inventors: Jesse Hull, Boston, MA (US); Philip A. Chou, Bellevue, WA (US); Gary E. Kopec, Belmont, CA (US); Dennis S. Arnon, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 956 days.

(21) Appl. No.: 08/880,137

(22) Filed: Jun. 20, 1997

(51) Int. Cl.$^7$ .................................. G06K 9/00
(52) U.S. Cl. ......................... 382/226; 382/180
(58) Field of Search ................. 345/419, 427, 345/436, 435; 707/513; 382/180, 309, 226, 209

(56) References Cited

U.S. PATENT DOCUMENTS

| | | | |
|---|---|---|---|
| 5,020,112 A | 5/1991 | Chou | 382/37 |
| 5,123,062 A | 6/1992 | Sangu | 382/57 |
| 5,130,924 A | * 7/1992 | Barker et al. | 707/509 |
| 5,317,647 A | 5/1994 | Pagallo | 382/267 |
| 5,321,773 A | 6/1994 | Kopec et al. | 382/30 |
| 5,335,290 A | * 8/1994 | Cullem et al. | 382/176 |
| 5,384,863 A | 1/1995 | Huttenlocher et al. | 382/9 |
| 5,384,864 A | 1/1995 | Spitz | 382/9 |
| 5,438,512 A | 8/1995 | Mantha et al. | 364/419.1 |
| 5,448,696 A | * 9/1995 | Shimada et al. | 345/357 |
| 5,481,626 A | 1/1996 | Matsubayashi | 382/189 |
| 5,491,628 A | 2/1996 | Wakayama et al. | 364/419 |
| 5,539,839 A | 7/1996 | Bellegarda et al. | 382/187 |
| 5,544,262 A | 8/1996 | Pagallo | 382/189 |
| 5,574,802 A | 11/1996 | Ozaki | 382/176 |
| 5,594,809 A | 1/1997 | Kopec et al. | 382/161 |
| 5,627,914 A | 5/1997 | Pagallo | 382/189 |
| 5,719,960 A | * 2/1998 | Melen | 382/209 |
| 5,774,579 A | * 6/1998 | Wang et al. | 382/176 |
| 5,883,986 A | * 3/1999 | Kopec et al. | 382/310 |

OTHER PUBLICATIONS

Deforges, O. and Barba, D. , "Segmentation of Complex Documents Multilevel Images: a Robust and Fast Text Bodies–Headers Detection and Extraction Scheme", Proceedings 3rd Int'l Conf. on Document Analysis and Recognition, vol. 2, pp. 770–773, Aug. 14, 1995.*

(List continued on next page.)

*Primary Examiner*—Amelia M. Au
*Assistant Examiner*—Martin Miller

(57) ABSTRACT

A two-dimensional (2D) image model models the layout structure of a class of document images as an image grammar and includes production rules having explicit layout parameters as data items that indicate information about the spatial relationships among image constituents occurring in images included in the class. The parameters are explicitly represented in the grammar rules in a manner that permits them to be automatically trained by a training operation that makes use of sample document images from the class of modeled documents. After each sample image is aligned with the 2D grammar, document-specific measurements about the spatial relationships between image constituents are taken from the image. Optimal values for the layout parameters are then computed from the measurement data collected from all samples. An illustrated implementation of the 2D image model takes the form of a stochastic context-free attribute grammar in which synthesized and inherited attributes and synthesis and inheritance functions are associated with each production rule in the grammar. The attributes indicate physical spatial locations of image constituents in the image, and a set of parameterized functions, in which the coefficients are the layout parameters, compute the attributes as a function of a characteristic of an image constituent of the production rule. The measurement data is taken from an annotated parse tree produced for each training image by the grammar. A trained grammar can then be used, for example, for document recognition and layout analysis operations on any document in the class of documents modeled by the grammar.

25 Claims, 21 Drawing Sheets

OTHER PUBLICATIONS

Deforges, O. and Barba, D. , "A Fast Multiresolution Text–Line and Non Text–Line Structures Extraction and Discrimination Scheme for Document Image Analysis", ICIP–94, vol. 1, p 134–138, 1994.*

Kojima, K. and Myers, B., "Parsing Graphic Function Sequences", Proc. IEEE Workshop on Visual Languages, pp. 111–117, Oct. 8, 1991.*

Barford, Lee A. and Bradley T. Vander Zanden. "Attribute Grammars in Constraint–Based Graphics Systems," Software–Practice and Experience, vol. 19, No. 4, pp. 309–328. Apr. 1989.

Belaid, Abdelwaheb and Jean–Paul Haton. "A Syntactic approach for Handwritten Mathematical Formula Recognition," IEEE Transactions on Pattern Analysis and Machine Intelligence, vol. PAMI–6, No. 1, pp. 105–111, Jan. 1984.

Butler, Timothy. "Retaining Document Format in OCR," *Proceedings of SPIE–The International Society for Optical Engineering SPIE Vol 2181 Document Recognition*, Feb. 9–10, 1994, San Jose, California, pp. 78–86.

Donzeau–Gouge, Véronique et al. "Programming Environments Based on Structured Editors: the Mentor Experience," D. Barstow et al. Editors. Interactive Programming Environments, pp. 128–140. McGraw Hill. New York, NY. 1984.

Franchi–Zannettacci, Paul. "Attribute Specifications for Graphical Interface Generation," in *Proceedings XI World Computer IFIP Congress*, San Francisco, CA., Aug. 1989, pp. 149–155.

Franchi–Zannettacci, Paul and Dennis S. Arnon. "Context–Sensitive Semantics As A Basis For Processing Structured Documents." In *Workshop on Object–Oriented Document Manipulation*. pp. 135–146, Rennes, France, May, 1989. BIGRE.

Kernighan, Brian W. and Lorinda L. Cherry. "A System For Typesetting Mathematics." Technical Report. Bell Laboratories, pp. 1–10, Murray Hill, NJ, 1975.

Naina, Majid Mojtabavi. "A New Efficient Incremental Evaluator for Attribute Grammars Allowing Conditional Semantic Equations," *Proceedings of 1988 IEEE Southeastcon*, pp. 386–390, Apr. 11–13, 1988, Knoxville, TN.

Rosenberg, Jonathan et al. "Multi–Media Document Translation: ODA and the Expres Project, Springer–Verlag," New York, 1991, Ch. 2–4, pp. 21–160.

Tsai, Wen–Hsiang and King–Sun Fu. "Attributed Grammar–a Tool for Combing Syntactic and Statistical Approaches to Pattern Recognition," IEEE Transactions on Systems, Man, and Cybernetics, vol. SMC–10, No. 12, Dec. 1980, pp. 873–885.

Hull, Jesse F., "Recognition of mathematics using a two–dimensional trainable context–free grammar", *Master's Thesis, Massachusetts Institute Of Technology*, Jun. 1996.

P.A. Chou and G. E. Kopec, "A stochastic attribute grammar model of document production and its use in document image decoding," *Document Recognition II, Proc. SPIE 2422*, Luc M. Vincent, Henry S. Baird, Editors, pp. 66–73 (Feb., 1995).

P.A. Chou, "Recognition of Equations Using a Two–Dimensional Stochastic Context–Free Grammar," *SPIE, vol. 1199, Visual Communications and Image Processing IV*, 1989, pp. 852–863.

G.E. Kopec and P.A. Chou, "Document Image Decoding Using Markov Source Models", *IEEE Trans. Pattern Analysis and Machine Intelligence*, vol. 16 No. 6, Jun. 1994, pp. 602–617.

G.E. Kopec, "Least–squares font metric estimation from image," *IEEE Trans. On Images Processing*, vol. 2 No. 4, Oct. 1993, pp. 510–519.

J. Higashino, H. Fujisawa, Y. Nakano, and M. Ejiri, "A knowledge–based segmentation method for document understanding", *Proceedings of the $8^{th}$ International Conference on Pattern Recognition (ICPR)*, Paris, France, 1986, pp. 745–748.

L. Spitz, "Style directed document recognition," *First Intl. Conf. on Doc. Analysis and Recognition (ICDAR)*, Saint Malo, France, Sep. 1991, pp. 611–619.

T. Pavlidis and J. Zhou, "Page segmentation and classification," *IEEE Trans. PAMI*, vol. 54, No. 6, Nov. 1992, pp. 484–496.

K. Taghva, et al, "An evaluation of an automatic markup system," *Document Recognition II, Proc. SPIE 2422*, Luc M. Vincent, Henry S. Baird, Editors, (Feb., 1995) pp. 317–327.

S. Kuo and O.E. Agazzi, "Keyword spotting in poorly printed documents using pseudo 2D hidden Markov models," *IEEE Transactions on Pattern Analysis and Machine Intelligence*, vol. 16, No. 8, Aug., 1994, pp. 842–848.

A. Dengel, "ANASTASIL: a system for low–level and high–level geometric analysis of printed documents," *Structured Document Image Analysis*, H. Baird, H. Bunke and K. Yamamoto, eds., Berlin Springer–Verlag, 1992.

Lynn D. Wilcox and Lawrence Spitz, "Automatic recognition and representation of documents," *Proceedings of the International Conference on Electronic Publishing, Manipulation and Typography*, Nice (France), Apr. 1988, pp. 47–57.

C. Bose and S. Kuo, "Connected and degraded text recognition using hidden Markov model," *Proceedings of the International Conference on Pattern Recognition*, Netherlands, Sep. 1992, pp. 116–119.

A.V. Aho and J.D. Ullman, *The Theory of Parsing, Translation, and Compiling, vol. 1: Parsing*, Prentice–Hall, Englewood Cliffs, NJ, 1972, Chapter 2, pp. 83–127.

G. Story, et al., "The RightPages image–based electronic library for alerting and browsing," *IEEE Computer*, Sep. 1992, pp. 17–26.

G. Nagy, et al., "A prototype document image analysis system for technical journals", *IEEE Computer*, Jul., 1992, pp. 10–22.

A, Conway, "Page grammers and page parsing: A syntactic approach to document layout recognition," *Second Int'l. Conf. on Doc. Analysis and Recognition (ICDAR)*, Japan, Oct. 1992, pp. 761–764.

R. Ingold, R–P Bonvin, and G. Coray, "Structure Recognition of Printed Documents" in *Document Manipulation and Typography, (Proceedings of the International Conference on Electronic Publishing, Document Manipulation and Typography)*, Nice, France, (Cambridge University Press) Apr., 1988, pp. 59–70.

* cited by examiner

FIG. 17

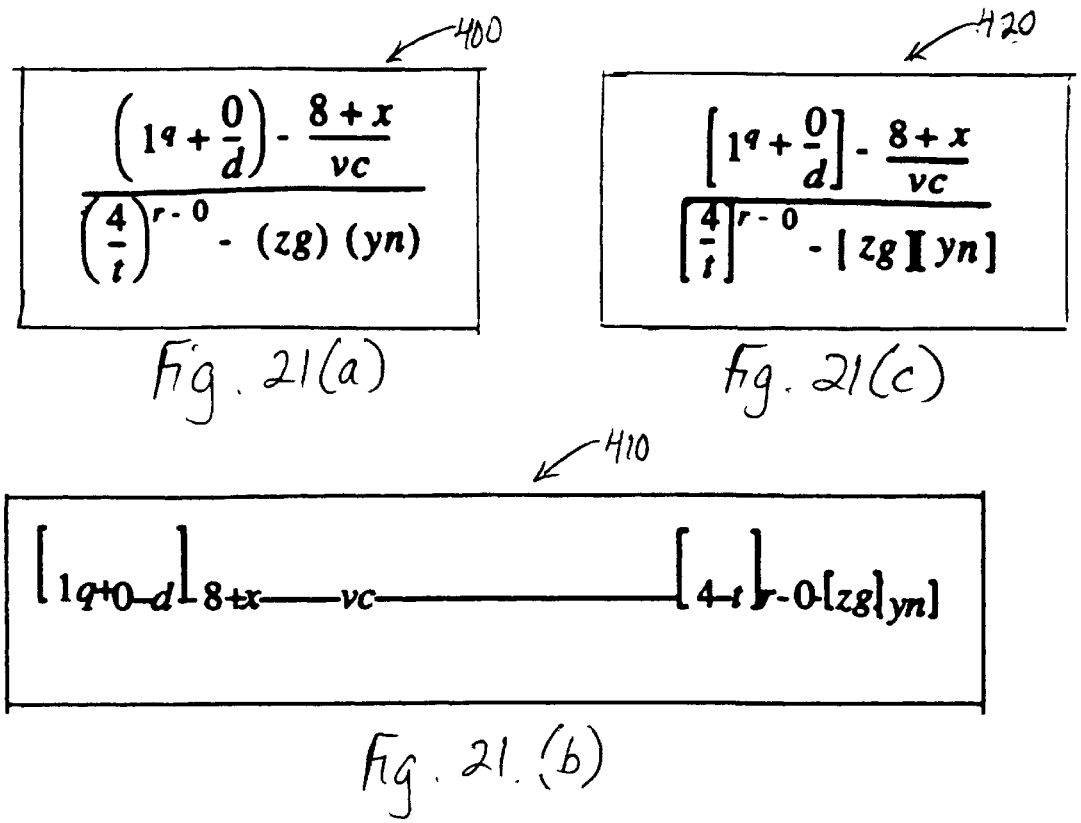
Fig. 21(a)
Fig. 21(c)
Fig. 21.(b)
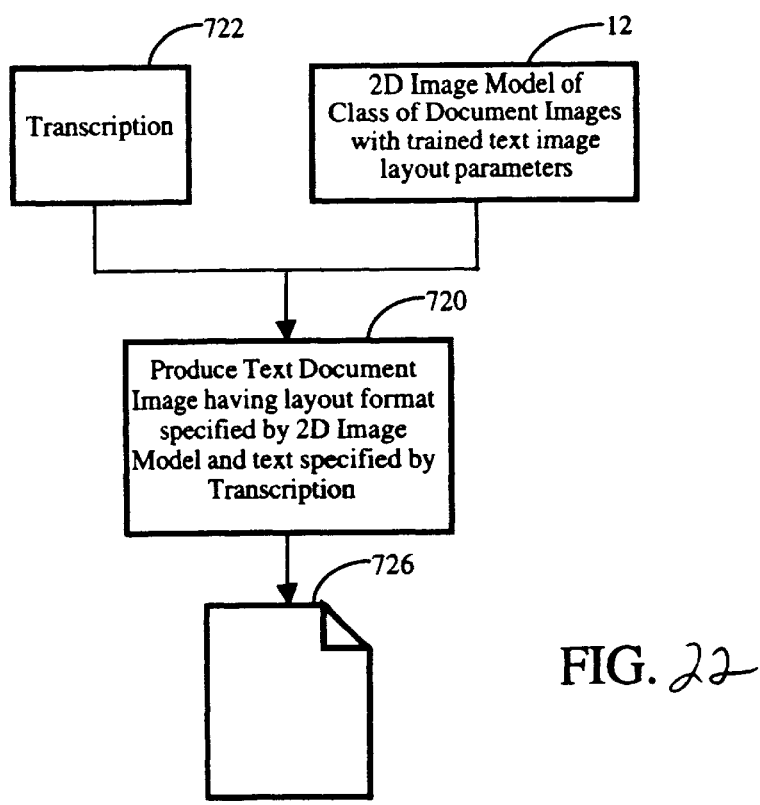
FIG. 22

AUTOMATIC TRAINING OF LAYOUT PARAMETERS IN A 2D IMAGE MODEL

CROSS REFERENCE TO RELATED APPLICATIONS

The present invention is related to inventions that are the subject matter of other concurrently filed, commonly assigned U.S. patent applications, which have inventors in common with the subject application, and which have the following application numbers and titles: application Ser. No. 08/879,756, entitled "2D Image Model Data Structure Having Parameterized Layout Functions"; and application Ser. No. 08/879,753, entitled "Producing an Editable Document Data Structure of a Text Image Having Actual Layout Specifications of the Image". The latter application, application Ser. No. 08/879,753, is hereby incorporated by reference herein as if set out in full.

BACKGROUND OF THE INVENTION

The present invention relates generally to the field of computer-implemented methods of, and systems for, text image modeling, recognition and layout analysis, and more particularly to a method and system for training layout parameters specified in a two-dimensional (2D) image grammar that models text images. The image grammar is used in various document processing operations, including document image recognition and layout analysis operations.

1. Document Image Layout Analysis and Image Layout Models.

Document image layout analysis is a type of document image recognition operation implemented in a processor-controlled machine that automatically makes determinations about the geometric, spatial and functional relationships of the physical and logical structures of a text (or document) image. These physical and logical structures are referred to herein as "image constituents." An image constituent as used herein is a portion of an image that is perceived by an observer to form a coherent unit in the image. Image constituents are typically represented in an image-based data structure as collections of pixels, but are generally described in terms of the perceived unit, rather than in terms of the pixels themselves. Examples of image constituents include the conventional text units of individual character or symbol images (referred to as "glyphs"), words, and text lines. Image constituents can contain other image constituents and so may also include groupings of these conventional text units into the logical, or semantic, notions of paragraphs, columns, sections, titles, footnotes, citations, headers, page numbers, and any one of a number of other logical structures to which the observer of a document may assign meaning. A glyph is typically considered to be the smallest image constituent; a group of image constituents is often called a "block," and includes, by way of example, a word, a text line, or a group of text lines. The layout analysis process typically produces the image locations of blocks with functional labels assigned to them according to their physical features, their physical image location, or their logical meaning, as imposed by the functional requirements of a particular type of document. The location of an image constituent is typically expressed in terms of image coordinates that define a minimally-sized bounding box that includes the image constituent.

To enhance the ability to perform functional layout analysis some document image layout systems use a priori information about the physical structure of a specific class of documents in order to accurately and efficiently identify constituents in documents that include specific types of higher-level image constituents. This a priori information is commonly referred to as a document "class layout specification," or may be referred to as a document image model. A document class layout specification describes or models the structure of the class of documents to be analyzed and supplies information about the types, locations and other geometrical attributes of the constituents of a given class of document images.

A class layout specification may be supplied in one of two ways: (1) as an explicit data structure input to the layout analysis system, which typically allows for different types of documents to be processed according to the structural information provided by the data structure input; or (2) in the form of document description information that is implicitly built into the processing functionality of the system, on the assumption that all documents to be processed by the system are restricted to having the same structural layout specification. A class layout specification in effect "tunes" the layout analysis system to particular document structures and restricts the type of document image for which layout analysis is to be performed.

Examples of document image layout systems that make use of an explicit class layout specification are disclosed in U.S. Pat. No. 5,574,802, entitled, "Method and Apparatus for Document Element Classification by Analysis of Major White Region Geometry"; in G. Story, et al, in "The RightPages image-based electronic library for alerting and browsing", *IEEE Computer*, September 1992, pp. 17–26 (hereafter, "the Story reference"); in G. Nagy, et al in "A prototype document image analysis system for technical journals", *IEEE Computer*, July, 1992, pp. 10–22 (hereafter "the Nagy reference"); in A. Dengel, "ANASTASIL: a system for low-level and high-level geometric analysis of printed documents", in H. Baird, H. Bunke and K. Yamamoto, *Structured Document Image Analysis*, Berlin: Springer-Verlag, 1992; in J. Higashino, H. Fujisawa, Y. Nakano, and M. Ejiri, "A knowledge-based segmentation method for document understanding", *Proceedings of the 8th International Conference on Pattern Recognition (ICPR)*, Paris, France, 1986, pp. 745–748; and in L. Spitz, "Style directed document recognition", *First Intl. Conf. on Doc. Analysis and Recognition (ICDAR)*, Saint Malo, France, September 1991, pp. 611–619.

U.S. Pat. No. 5,574,802 discloses a system for logically identifying document elements in a document image using structural models; the system includes a geometric relationship comparator for comparing geometric relationships in a document to the geometric relationships in a structural model to determine which one of a set of structural models of document images matches a given input document image. A logical tag assigning system then assigns logical tags to the document elements in the image based on the matching structural model. If the document elements are treated as nodes and the spatial relationships between the document elements are treated as links between the nodes, the document elements and relationships of a structural model form a graph data structure. Structural models are preferably predefined and prestored, and may be created by an end user, using a specific structural model definition support system, based on observation of model documents which best represent the type of document to be represented by a particular structural model. U.S. Pat. No. 5,574,802 discloses further that during creation of the structural model, the end-user may be prompted to designate rectangles for the document elements contained in sample document images, and the structural model definition support system then measures the distances between the designated rectangles for each of the major geometric relationships (i.e., either an "above-below" or "right-left" relationship) and stores these measurements.

The Story reference discloses the use of explicitly-defined "partial order grammars" ("pogs") to guide labeling of rectangular blocks that are extracted from journal table of contents page images. During pogs parsing of a page image in the RightPages system, each rectangular block identified and extracted is considered a terminal symbol and two relationships between blocks are defined: a left-right relationship and an above-below relationship. The grammar groups the rectangles into the image constituents.

The Nagy reference discloses a document image analysis system, called the "Gobbledoc" system, that uses an explicit document class layout specification in the form of a collection of publication-specific document grammars that are formal descriptions of all legal page formats that articles in a given technical journal can assume. The document grammar guides a segmentation and labeling process that subdivides the page image into a collection of nested rectangular blocks. Applying the entire document grammar to an input page image results in a subdivision of the page image into nested rectangular blocks. The subdivision is represented in a data structure called the X-Y tree. The rectangular regions are labeled with logical categories such as abstract, title-block, byline-block, reference-entry and figure-caption.

Many existing systems rely on a two-part process to perform document image layout analysis. A first phase that performs feature analysis or extraction, commonly referred to as page segmentation, finds the physical dimensions of blocks on the page, and the second phase applies the class layout specification to these blocks. When a class layout specification is defined as a document grammar in any of these above-referenced examples of layout analysis systems, the grammar is typically used in this second phase, in the form of some type of parsing operation, to identify the logical structure of the physical blocks identified in a first phase of processing.

2. Grammars Used as Image Layout Models.

An example of a document image layout system that makes use of an image grammar as an explicit class layout specification is disclosed in commonly-assigned application Ser. No. 08/491,420, entitled, "Document Image Layout Analysis Using an Image Grammar and a Transcription," (hereafter the '420 application). The '420 application discloses a document image layout analysis method and system for identifying and labeling text image constituents in an input two-dimensional (2D) text image using a formal image model and a page layout transcription as explicit inputs to the layout analysis process. The formal image model models the spatial image structure of a class of document images as an image grammar, while the page layout transcription identifies the specific image constituents that occur in the input text image and constrains the document layout analysis process to look for and identify those specific image constituents, thereby enhancing accuracy of the layout specification output.

The '420 application applies the use an image grammar as a formal model of image structure to the domain of document image layout analysis. The use of various forms of grammars in text recognition is well-known and is discussed, for example in the Background portion of application Ser. No. 08/491,420, which is hereby incorporated by reference herein. Examples of the use of grammars in text operations such as recognition and layout analysis are disclosed in A. Conway, "Page grammars and page parsing: A syntactic approach to document layout recognition," in *Second Intl. Conf on Doc. Analysis and Recognition (ICDAR)*, Japan, October 1992, pp. 761–764; S. Kuo and O. E. Agazzi, in "Keyword spotting in poorly printed documents using pseudo 2D hidden Markov models," *IEEE Transactions on Pattern Analysis and Machine Intelligence*, Vol. 16, No. 8, August, 1994, pp. 842–848 (hereafter, "the Kuo and Agazzi keyword spotting reference"); in U.S. Pat. No. 5,020,112, entitled "Image Recognition Using Two-Dimensional Stochastic Grammars," issued to P. A. Chou, one of the inventors herein; in U.S. Pat. No. 5,321,773, issued to G. E. Kopec and P. A. Chou, also inventors herein, and entitled "Image Recognition Method Using Finite State Networks;" and in G. E. Kopec and P. A. Chou, "Document image decoding using Markov source models," *IEEE Trans. Pattern Analysis and Machine Intelligence* 16(6):602–617. June 1994 (hereafter, "Kopec and Chou, 'Document Image Decoding'").

The Conway reference ("Page grammars and page parsing . . . ", 1992); discloses a syntactic approach to deducing the logical structure of printed documents from their physical layout. Page layout is described by a 2-dimensional grammar, similar to a context-free string grammar, and a chart parser is used to parse segmented page images according to the grammar. The layout conventions of a class of documents are described to the system by a page; layout grammar similar to a context-free string grammar. String grammars describe structure in terms of concatenation of sub-strings, and the sub-strings here consist of nodes linked together into a graph or tree structure; the grammar rules specify how these substructures are embedded in larger structures. The nodes in the parse structure are page blocks which are groups of neighboring segments. .The layout relationships between page blocks are expressed by a set of page relations that are defined on the bounding rectangles of the blocks and that define a set of neighbors for each block on a page. Constraints can also be attached to grammar rules, to allow use of information such as font size and style, alignment and indentation.

U.S. Pat. No. 5,020,112 discloses a method of identifying bitmapped image objects using a two-dimensional (2D) image model based on a 2D stochastic, context-free grammar. This recognizer is also discussed in an article by P. A. Chou, entitled "Recognition of Equations Using a Two-Dimensional Stochastic Context-Free Grammar," in *Visual Communications and Image Processing IV, SPIE, Vol*. 1199, 1989, pp. 852–863. The 2D image model is represented as a stochastic 2D grammar having production rules that define spatial relationships based on nonoverlapping rectangles between objects in the image; the grammar is used to parse the list of objects to determine the one of the possible parse trees that has the largest probability of occurrence. The objects are stored in an object template library and are each defined as an n by m bitmapped template of an image object having an associated probability of occurrence in the image to be recognized. The term "stochastic" when used in this context refers to the use of probabilities associated with the possible parsing of a statement to deal with real world situations characterized by noise, distortion and uncertainty.

U.S. Pat. No. 5,321,773 discloses a 2D image model represented as a stochastic finite state transition network that defines image production in terms of a regular grammar. The 2D image grammar disclosed therein models a class of document images using a bitmapped character template model based on the sidebearing model of letterform shape description and positioning that is used in digital typography. In the sidebearing character model, pairs of adjacent character images are positioned with respect to their image origin positions to permit overlapping rectangular bounding boxes as long as the foreground (e.g., black) pixels of one character are not shared with, or common with, the foreground pixels of the adjacent character.

A general image production model, of which the image models disclosed in U.S. Pat. Nos. 5,020,112 and 5,321,773 are special cases, is discussed in P. A. Chou and G. E. Kopec, "A stochastic attribute grammar model of document production and its use in document image decoding," in *Document Recognition* II, Luc M. Vincent, Henry S. Baird, Eds, *Proc. SPIE* 2422, 1995, pp. 66–73 (hereafter, "Chou and Kopec, 'A stochastic attribute grammar model'"), which is hereby incorporated by reference herein for all that it teaches as if set out in full.

3. The Training of Image Models.

Image models may include components and make use of various types of parameters that require or permit training in order to improve the operational performance of the model. In certain types of stochastic image models where, for example, a Hidden Markov Model or variation thereof is used to represent a character or a word prototype to be used for recognition, training the character or word model involves training probability parameters that represent the probabilities of features or sequences of letters occurring in a character or word. An example of this type of model training may be found in the Kuo and Agazzi Keyword Spotting reference cited above, which discloses, at pg. 844, that parameters for keyword models are trained from a training set that contains, for each model, the same keyword at different levels of degradation, represented as a feature vector called an observation sequence; the features are extracted from segments of word image samples. Feature-based template training of a stochastic character model is also disclosed in C. Bose and S. Kuo, "Connected and degraded text recognition using hidden Markov model," in *Proceedings of the International Conference on Pattern Recognition*, Netherlands, September 1992, pp. 116–119. The image models being trained are character or line (word) models, and not 2D models that represent a multiple-line 2D (e.g., page) image.

Training of a 2D image model is disclosed in U.S. Pat. No. 5,020,112, which is discussed briefly above and which describes a stochastic context-free grammar as the 2D image model therein. U.S. Pat. No. 5,020,112 discloses the unsupervised training of the probability parameters associated with the object templates that are the terminal symbols of that grammar model.

Image models of the type disclosed in U.S. Pat. No. 5,321,773 that make use of character template models may benefit from training the character templates in a particular font that occurs in a class of documents to be recognized, in effect training the image model to be used as a font-specific recognizer. An example of this type of training is disclosed in commonly-assigned application Ser. No. 08/431,223 "Automatic Training of Character Templates Using a Transcription and a Two-Dimensional Image Source Model," and U.S. Pat. No. 5,594,809, entitled "Automatic Training of Character Templates Using a Text Line Image Source, a Text Line Transcription and an Image Source Model." In one implementation of the invention disclosed in these references, the training of the character templates includes the training of the template's character set width. Character set width is defined as the distance from the origin of a character template to the origin of the next adjacent character template positioned in the image.

Many types of document processing tasks incorporate layout analysis operations as part of their functionality. Text recognition, for example, uses layout information to locate the image constituents (typically glyphs) being recognized. With a sufficiently precise explicit or implicit image model, an image layout analysis function is able to accurately locate and label many types of image constituents on a document page image. However, the accuracy and completeness of the layout analysis result is typically dependent on the characteristics of the model and on the quality of the page image. For many of the image models described above, it is necessary for a user to manually specify the precise spatial relationships among image constituents for each potential type of document for which an operation that uses layout analysis is to be performed, which can be a tedious and time-consuming process. Some models, such as the those described in the Story and Nagy references may not even provide the ability to describe many image structures in sufficient detail to produce a desired level of precision in the layout analysis. Yet the ability to produce a precise and comprehensive description of the spatial relationship of image constituents has many advantages in the recognition of text images and in the generation of documents that have a specific spatial image structure.

For example, a desirable feature of a commercial optical character recognition (OCR) application is to provide the recognized text of a scanned input text document in the form of a data structure suitable for use by a word processing (WP) application; the WP data structure enables, the WP application to render the recognized text in a document image that substantially resembles the original scanned document in layout format and appearance and permits the recognized text to be edited. In order to place the recognized text in the WP-compatible data structure, the OCR application must perform document layout analysis at a sufficient level to make decisions about the organizational structure of the text and where text is located on the page. Conventional OCR applications that provide this type of functionality typically perform very rudimentary document layout analysis and image processing operations on the original scanned document image to identify only the most basic document structures. Moreover, these document structures are likely to be identified without regard to their relationship to other document structures, which could present editing difficulties when a user attempts to edit the document using the WP-compatible data structure.

In another example, an additional desirable feature of an OCR application is to be able to recognize text in documents with complex layout and formatting. Recognition of mathematical equations and text formatted in complex tabular structures present particularly difficult challenges because of the use of characters in different type fonts and sizes that are positioned in the text image above or below a normal baseline.

Existing image models are unable to describe the spatial structure of a document image and its image constituents with both sufficient precision and flexibility to accurately accommodate a wide variety of document layouts without the necessity of manual layout specification.

SUMMARY OF THE INVENTION

The present invention makes use of a 2D image grammar that models the geometric spatial relationships among image constituents that occur in a class of document images as explicit parameters, referred to as layout parameters, in the grammar. Depending upon the details of the particular implementation of the 2D image grammar, the explicit parameters in the mathematical model either directly represent, or form the basis for deriving, one or more text image layout parameters that represent an actual geometric spatial relationship between, or an actual physical measurement of, image constituents in an image in the class of images being modeled. Functionally, the 2D image grammar must be capable of representing at least the layout structure (e.g., the physical locations) of the image constituents of a class of document images, and must specify the layout structure in a manner that makes a measurable spatial relationship between two image constituents explicit in the model.

Thus, the present invention is further premised on the discovery that the ability to capture and represent the spatial relationship between two image constituent in terms of an explicit parameter in the 2D image grammar means that the image grammar is capable of automatically learning the value of the parameter from examples of actual physical layout structures of text document images in the class of images modeled by the grammar. That is, the user of the 2D image model need not manually specify the actual spatial relationship between two image constituents in a particular document before the 2D image model may be used to operate on that document. Instead, by specifying a spatial relationship between image constituents in the model by way of one or more parameterized relationships, one or more of the parameters in these relationships may be given an arbitrary or estimated initial value and then automatically trained (without manual intervention) to a specific value that accurately represents the actual spatial relationship between the image constituents that the parameter represents.

Training involves, for each 2D text image in a set of input training images, producing a data structure representation of the input training image that indicates the layout structure of the training image; in this image representation, image constituent labels, acquired from a transcription associated with the input training image, are aligned with their respective image constituents in the training image using the layout structure specified by the 2D image grammar, and physical locations of labeled image constituents in the training image are then measured or determined. After all input training images have been aligned and estimated locations determined, actual values of the parameters are computed from all of the estimated physical location data, and the 2D image model is updated to reflect these computed parameter values. This sequence of alignment, computing parameters and updating the model may be repeated until a stopping condition is met. The resulting trained 2D image model includes parameters that accurately specify (within acceptable tolerances) the layout structure of the class of modeled images.

Training may be accomplished in either an unsupervised or a supervised mode. Supervised training uses as an explicit input to the training process a transcription of each input training image. However, supervised training requires no manual involvement by a user, since such a transcription may be obtained from a conventional character recognition operation, and the training operation itself aligns the elements of the transcription with the image constituents in the input training image associated with the transcription, according to rules specified by the image grammar. Unsupervised training simply makes use of a recognition operation to produce a transcription of a training image before proceeding with training the layout parameters in the model.

The implications of this discovery are significant for enhancing the efficiency and productivity of document processing operations. For text recognition operations that make use of an explicit 2D image model as input to the recognition process, a 2D image grammar that describes the logical structure of a class of text documents that have complex formatting features can be trained automatically to learn the physical layout structure of the class. When this trained 2D image model is then used in a recognition operation on documents in the class, recognition accuracy improves significantly over that of commercial text recognition systems that make use of less sophisticated layout analysis functionality.

The text layout parameter information that is learned about a class of documents as a result of training according to the present invention may also be useful independently of its use as part of the 2D image model for other document processing operations on that class of documents. For example, the text image layout parameters that are trained may include information about the font metrics of the type font used in the class of documents that is sufficient to produce a font program to recreate any document in that same font. In addition, the text image layout parameters that are trained may include information sufficient to produce, after text recognition, an editable data structure representation of a document in the modeled class that is readable by a word processing program.

Moreover, defining a model of the class of document images being trained as an explicit input to the training process allows for flexibility in defining the class of documents for which training is needed. By defining a new 2D image model for each class of documents, the same training procedure can be used without modification to train text image layout parameters for, for example, business letters on a particular corporate letterhead and journal papers published in a journal. In addition, the invention allows for either the automatic training of all parameters identified in the 2D image model, or for selecting and specifying for training one or more individual parameters in the 2D image model.

One implementation for making layout parameters explicit in the 2D image grammar is for a grammar production rule to specify the spatial relationship between first and second image constituents as a parameterized mathematical function, with the coefficients of the function representing the layout parameters. A value for the function is measured for each occurrence in a training image of an image constituent produced according to the production rule. The measured values for the function for a given rule, as measured from all of the training data, represent the observed values from which a value for a layout parameter can be computed. In effect, finding the value of the layout parameter from the measured values is an optimization problem where the measured values represent values for some overall function of the layout parameter for which an optimal value can be computed.

An illustrated implementation of the invention makes use of a stochastic context-free attribute grammar in which synthesized and inherited attributes and synthesis and inheritance functions are associated with production rules in the grammar. The attributes express physical spatial locations of image constituents in the image, and the parameterized functions express physical relationships among image constituents in the image. An annotated parse tree produced by the grammar explicitly represents both the logical and layout structures of a text image in the class of images being modeled. During training, an annotated parse tree of an input training image is produced, and the measured values of the parameterized functions are taken from data in the parse tree. Implementation examples of the use of an attribute grammar as a 2D image model described herein illustrate the training of text image layout parameters for classes of documents that include journal papers and equations.

Therefore, in accordance with one aspect of the present invention, there is provided a method for operating a processor-controlled machine to determine an unknown value of a text image layout parameter used with a two-dimensional (2D) image model. The machine operated by the invention includes a signal source for receiving data; memory for storing data; and a processor connected for accessing instruction data which is stored in the memory for operating the machine. The processor is further connected for receiving data from the signal source; and connected for storing data in the memory. The method comprises operations performed by the processor in carrying out instructions to operate the machine according to the invention. The processor, in executing the instructions, obtains a data structure indicating a 2D image model modeling as an image grammar an image layout structure common to a class of 2D text images. The 2D image model includes a production rule that indicates that first and second image constituents occurring in the 2D text image produce a third image constituent occurring therein. The production rule includes a text image layout parameter that indicates the spatial relationship between the first and second image constituents. At the start of the training operation, a value of the text image layout parameter is unknown and computing a value is the object of the training operation. The processor then receives a plurality of input two-dimensional (2D) text image data structures from the signal source. Each input 2D text image has the image layout structure common to the class of 2D text images and includes at least one occurrence of first and second image constituents. For each respective input 2D text image, the processor produces a data structure, using the 2D image model, indicating first and second image positions in the input 2D text image identifying respective locations of the first and second image constituents therein. The processor then obtains document-specific measurement data from the data structure. The document-specific measurement data indicates the spatial relationship between the first and second image constituents identified therein. When all of the input 2D text images have been processed, the processor computes a value for the text image layout parameter using the document-specific measurement data obtained from the data structures for the respective input 2D text images. The value computed for the text image layout parameter represents a class-specific value for all text images in the class of 2D input text images being modeled by the 2D image model.

In another aspect of the present invention, the production rule specifies the spatial relationship between the first and second image constituents as a mathematical function of a characteristic of at least one of the first and second image constituents. The mathematical function includes the text image layout parameter as a parameter therein. The document-specific measurement data obtained from the data structure include values for the mathematical function measured from the data structure. The values of the function indicating the spatial relationship between the first and second image constituents in each respective input 2D text image. Then, computing a value for the text image layout parameter includes using the values for the mathematical function measured from each respective input training image.

In still another aspect of the present invention, the 2D image model is represented as a stochastic context-free attribute grammar.

The novel features that are considered characteristic of the present invention are particularly and specifically set forth in the appended claims. The invention itself, however, with respect to its structure, method of construction and method of operation, together with its advantages, will best be understood from the following description when read in connection with the accompanying drawings. In the Figures, the same numbers have been used to denote the same component parts or steps.

BRIEF DESCRIPTION OF THE DRAWINGS

FIG. 17 shows an example of a page image used to illustrate the training operation of FIG. 4 according to an illustrated embodiment of the present invention;

FIGS. 21(a), 21(b) and 21(c) show examples of images that contain equations, and show the results of training the layout parameters of a 2D layout grammar that models equations, according to the illustrated implementation of the present invention;

FIG. 22 is a simplified block diagram showing a first application of the trained 2D image grammar of the present invention;

DETAILED DESCRIPTION OF THE INVENTION

A. Conceptual Framework

Figure 1:
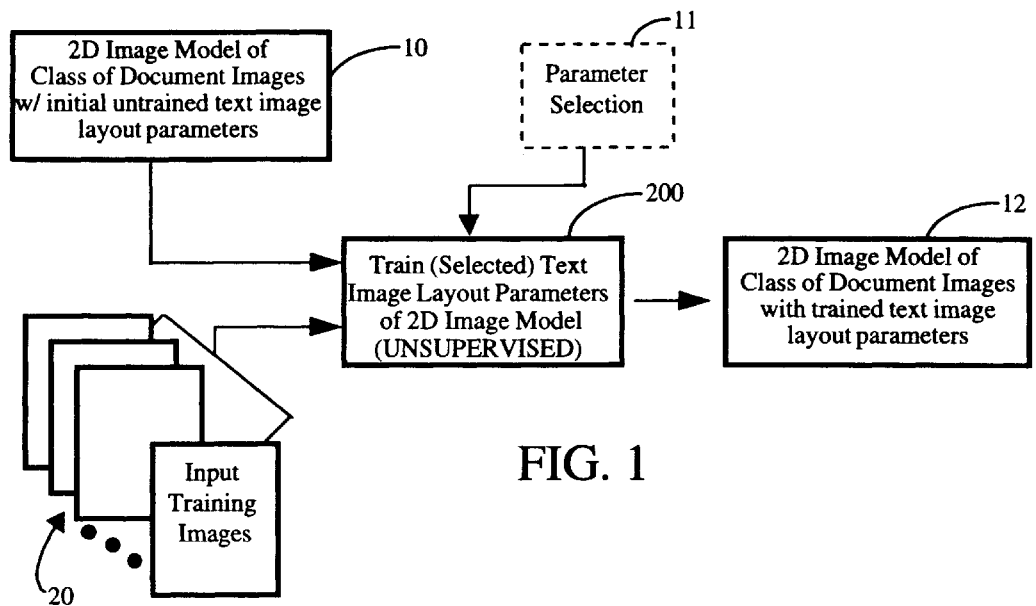
FIG. 1 is a simplified block diagram illustrating the input and output data structures of the text image layout parameter training operation of the present invention.

The description of the invention that follows includes certain concepts and terminology that are specifically relevant to and defined for describing the claimed invention illustrated in the accompanying drawings. Unless otherwise specifically indicated in the discussion below, these concepts and defined terms have the meanings indicated below throughout this specification and in the claims, rather than any meanings that may occur in other sources, such as, for example, documents that are incorporated by reference herein elsewhere in this description.

The term "data" or "data item" refers herein to physical signals that indicate or include information. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. For example, in the data structure representation of parse tree 50 in FIG. 7, each terminal node data item 64 indicates values for the font metrics of a respective character in a character set. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data.

The term "image" as used herein refers to a data representation of an image in a processor-controlled system, unless specifically referred to in its perceptual form as a "perceived image." One or more items of data "define" a perceived image when the data includes sufficient information for the processor to directly produce the image, such as by presenting the perceived image on a display or other medium. For example, a two-dimensional (2D) array can define all or any part of an image, with each item of data in the array providing a value indicating the color of a respective location of the image. In this type of image representation, each such image location is conventionally called a "picture element," or "pixel," and represents a small unique region of the image. A pixel having a "foreground" color represents a respective mark or active position in the perceived image, while a pixel having a "background" color represents the absence of a mark in the perceived image. In black and white images, black is typically used as the foreground color and white is used as the background color; thus, reference herein to black pixels is used interchangeably with foreground pixels throughout this discussion, unless explicitly noted otherwise.

"Character" as used herein means a single, discrete, abstract element or symbol. For example, a character can include an abstract symbol that appears in a written or printed form of a language. A "text" or "string" is a sequence of characters; the characters of a text or string may form words and other subsequences within the text. A "glyph" is a single instance, or example, of a character that is realized as a perceived image, for example on a marking medium such as paper or on a display screen.

Figure 17:
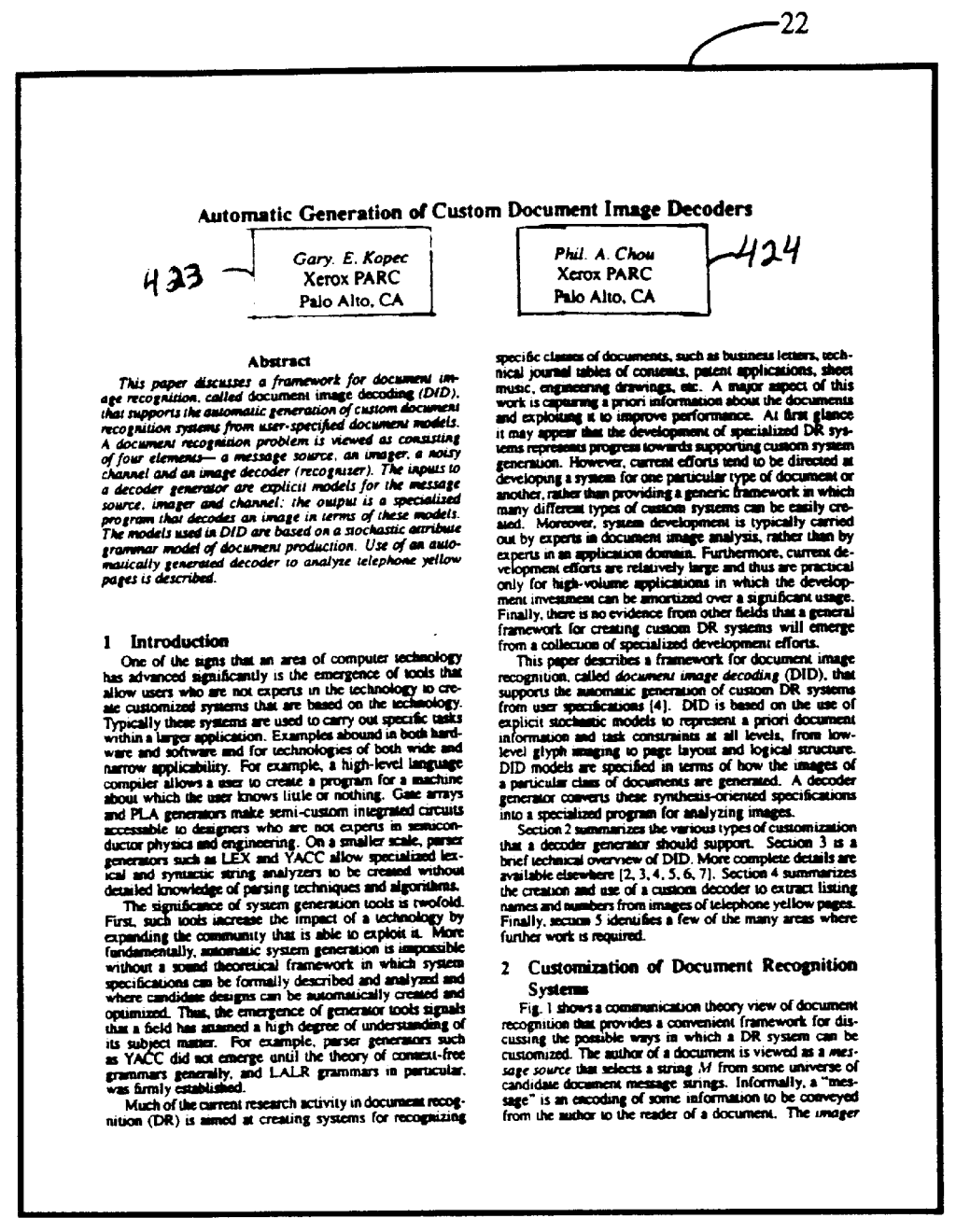

An "image constituent" is a portion of a text image that is perceived by an observer of the image to form a coherent unit in the perceived image. An image constituent is often subjectively defined, and is given a name by the observer in terms of the semantic meaning of the perceived unit to the observer. Examples of image constituents include, but are not limited to, the conventional and generic text units of individual glyphs, words, text lines, paragraphs, columns, sections, titles, footnotes, citations, headers, page numbers, rows or columns in table structures, and the like. These image constituents occur in a wide spectrum of document image types, and so have conventional names. Other examples of image constituents are specific to a particular kind of document. For example, sections and footnotes commonly occur in reports and articles, but not usually in business letters. Conversely, letters usually include perceived image constituents of a greeting and a signature, whereas reports and articles do not. Image constituents known as equations and chemical formulas typically appear in technical documents. Tables contain image constituents called rows, columns and cells, while printed music contains image constituents of note heads, stems, chords, staff lines and key signatures. When no commonly known name of the image constituent is available, it may be given a name by an observer of the image for its function or meaning in the image. The image constituent of "author block" used in an illustrated example of the present invention that is described in the discussion accompanying FIG. 17 is an example of an image constituent that belongs to a specific type of document and that has been given a name by one observer that could differ from a name for the same constituent perceived by another observer. A "two-dimensional (2D) image constituent" is an image constituent that is defined relative to a portion of a 2D text image whose height is larger than a single line of characters. Examples of 2D image constituents include single text lines, paragraphs, and columns. A "line image constituent" is an image constituent that is defined relative to a single line of text. Examples of line image constituents include glyphs, words and other collections of glyphs that occur within a single text line.

The terminology "two-dimensional (2D) document (or text) image data structure including a plurality of image constituents arranged therein," also referred to in an abbreviated form herein as an "2D text image," refers to a data structure, suitable for storage in a memory device of a processor-controlled machine or system, that defines a text image in which a plurality of image constituents occur in a 2D space. The organization of the 2D text image is such that individual pixel locations are accessible by the processor, but the pixels that comprise an individual glyph or other image constituent are not initially identified as a unit of data that is accessible to the processor, and no information is initially available to the processor as to whether a specific x, y coordinate position in the 2D text image indicates a pixel that is included in a glyph or other image constituent. A 2D text image, by definition, has a vertical size dimension larger than an image of a single horizontal row of glyphs, as, for example, represented by a single line of text in a document. A 2D text image is conceptually analogous to a page of a document, and may frequently represent an image of an actual physical page, with glyphs being vertically and horizontally distributed in the 2D space; however, the 2D text image is not intended to be limited in any manner to an entire page, or to a single page of a document. An 2D text image is not limited to include only glyphs; other image objects such as graphical objects or shapes, pictures, halftone images, line drawings, photographs, other pictorial elements, or images that constitute noise may be included in the 2D text image.

It is to be understood that the source device that provides an input 2D text image for processing by the present invention is independent of and unrelated to the operation of the invention. The input 2D image source may be produced by a scanning, digital faxing or digital copying operation applied to an existing physical document; the input 2D image source may also be a synthetic binary image created by a user using any suitable processor-controlled system.

An "image layout structure" or just "layout structure" is a description of the physical arrangement and locations of some selected set of the image constituents in a 2D text image. The selected set of image constituents described in an image layout structure for a particular 2D text image determines the layout structure's level of detail, and thus more than one image layout structure may be described for a given 2D text image. The selected set of image constituents may, of course, include all image constituents in the text image.

A "class of document images", or a "class of documents" is two or more 2D text images in which each image has an image layout structure in common with all other 2D text images in the class. A class of documents may be viewed as a generic type of document, and not as a specific and finite set of identified documents: e.g., all single column text documents; all business letters on standard corporate letterhead; all documents having 3-column tables; all scientific journal articles; all journal articles of the form published in *IEEE Computer*. Since an image layout structure may vary in its level of detail, it follows that the set of documents that are considered to be in the same class is determined by the image layout structure defined for the class.

A "2D image grammar" is a data structure that indicates a model of a class of two-dimensional (2D) text images in the form of a 2D image grammar. The term "grammar" when used in the formal, linguistic sense, is a set of production rules that defines the allowable formats (syntax) that statements in a specific language are allowed to take. As applied to images, a "2D image grammar" is a set of production rules that defines the spatial structure and content that a 2D image in a class of 2D images modeled by the grammar is allowed to take. A 2D image grammar may also be referred to herein as a "2D image model". Each text image in the class of modeled documents includes a plurality of image constituents spatially arranged in an image layout structure common to is all text images in the class. The 2D image model specifies, or describes, at least one image layout structure for each of the 2D text images in the class. The 2D image model may also specify at least one message string (also referred to as a "transcription") for each of the 2D text images in the class. The 2D image model is distinguishable from a data structure that defines a specific 2D text image, and from a transcription data structure that is the output of a recognition operation performed on a specific image.

A 2D image grammar as used in accordance with the present invention may have, but need not have, the characteristic of having the capability of synthesizing, or generating images that belong to the class of images being modeled, and when the grammar has this characteristic it is referred to herein as a 2D generative image grammar. This terminology is a slight departure from that used in some texts in this field. authors A. Aho and J. Ullman, in *The Theory of Parsing, Translation and Compiling*, Volume I: Parsing, Prentice-Hall, Englewood Cliffs, N.J., Chapter 2, 1972 (hereafter, "the Aho and Ullman text"), which is hereby incorporated by reference, note that, in the context of string languages, there are two principal methods of defining a language—the generator and the recognizer. One method for defining a language uses a generative system, called a grammar. The central part of a grammar is a finite set of formation rules, or productions, which describe how the sentences of the language are to be generated, and a basic property of a grammar is that it can be used to generate the objects that belong to the class of objects it describes. According to the concepts set forth in the Aho and Ullman text, defining a language, or a class of document images, as a grammar is distinguishable from defining the language or class of document images as a recognizer. A recognizer has the property of determining whether an arbitrary input sequence of symbols is included in the language or document image class defined by the recognizer. By this definition, a recognizer lacks the generative property of a grammar and cannot generate the objects that belong to the class of objects described by the recognizer.

When an image layout structure described by a 2D image model describes the spatial arrangement of individual glyphs as image constituents in a 2D text image, the 2D image model also includes a set of character templates that are consistent with a character template model. A character template model models templates in the character set used in the class of text images modeled by the 2D image model, and therefore defines how glyphs are spatially arranged or positioned with respect to one another in an image. The spatial relationships of higher level image constituents also depend to a certain extent on the particular template model that defines the character templates: since glyphs form the basic units of larger image constituents, the template model necessarily influences the spatial relationships between larger image constituents. If the template model requires that glyphs be adjacently arranged in nonoverlapping bounding boxes (referred to as a "segment-based model"), the 2D image model produces image constituent position information that is derived from the position of glyph bounding boxes. If the template model is a non-segment-based model, such as the sidebearing model of letterform shape description and positioning that is used in digital typography, the 2D image model produces image constituent position information that is derived from glyph image origin positions and character set widths. The sidebearing model of letterform shape description is described in U.S. Pat. No. 5,594,809 at cols. 9–10 and in FIG. 1; these portions of U.S. Pat. No. 5,594,809 are hereby incorporated by reference herein.

A "transcription data structure" or "transcription" as used herein is a data structure indicating a unique message string, M. Message string M includes a plurality of message substrings, $m_1, m_2, \ldots, m_n$, each of which indicates at least one of a plurality of characters in a character set. Each substring, $m_i$, is referred to as a "transcription label data item," or simply as a "transcription label." A transcription is said to be "associated with" a 2D image model when the 2D image model together with the information indicated by the transcription labels in the transcription establishes a mapping between an image constituent in an input 2D text image and a transcription label identifying the image constituent. The term "mapping" is used herein in its mathematical sense to refer to a rule of correspondence established between two sets that associates each member of the first set with a single member of the second. The interpretation of the information indicated by the transcription is dependent on information indicated by the 2D image model about the mapping between the image constituents and the transcription labels. A consequence of this dependency is that transcription labels have no implied or inferred order with respect to one another, or with respect to the image constituents in the associated 2D image unless the transcription is of a type in which the order of the transcription labels is explicitly indicated by the definition of the transcription type.

A transcription is said to be "associated with" a specific input 2D text image when the transcription data structure meets one of two conditions: (1) The transcription data structure is, or is capable of being produced from, the output of a recognition operation performed on the input 2D image. The recognition operation may be processor-controlled, such as a computer-implemented recognition or decoding operation performed on the specific 2D image. Or the recognition operation may be performed by a user using a processor-controlled system; for example, a user may produce the transcription data structure by visually inspecting the 2D image and entering character codes using a conventional input device, such as a keyboard, that produces signals indicating the character codes. (2) The transcription data structure is, or is capable of being produced from, a data structure that is an input source to an image rendering operation, such as a document formatting operation, that produces the 2D image. The input 2D image with which a transcription is associated is referred to as the "associated 2D image."

There are no restrictions on the type of transcription that may be associated with a particular 2D image model. Transcriptions may be literal or nonliteral, and if nonliteral, may include a label such as a "tag" that indicates markup information such as that used in various types of standardized document interchange formats for representing document structure and content between document processing systems. Examples of markup languages include SGML (Standard Generalized Markup Language), ODA (Office Document Architecture) and HTML (Hypertext Markup Language). Tags also occur in data structures used or produced by document specification and formatting systems, also called automatic text layout systems, that include within the data structure instructions for the format and logical structure of a document, such as found in document data structures produced using markup languages. Examples of such document specification and formatting systems include GML (Generalized Markup Language), TeX and LaTeX.

A "layout procedure" is an operation that maps a logical or symbolic description of a text image into a spatial or geometric description of the image, such that when the spatial or geometric description of the text image is rendered into the data structure that directly represents the image, image constituents are spatially arranged in physical locations in the image. A "text image layout parameter" is any real-valued quantity on which a layout procedure depends to map an image constituent from its symbolic description of its location in a text image to an actual physical location in the image. The 2D image model of the present invention indicates at least one text image layout parameter that specifies the spatial relationship between first and second image constituents in each 2D text image included in the class. For example, a text image layout parameter may specify the physical location of a glyph that functions as a superscript in an equation relative to the baseline of its base glyph. Or a text image layout parameter may specify the distance between consecutive paragraphs or the distance between image constituents consecutively placed on the same baseline. Note that a text image layout parameter does not include a probability parameter that may be associated with or included in a 2D image model, since a probability parameter is not a quantity on which a layout procedure depends to map an image constituent from its symbolic description of its location in a text image to an actual physical location in the image. Note further that, because the 2D image model mathematically models the relationship between image constituents, a text image layout parameter may not be explicitly defined as a single identifiable data item in the model, but may be computed or derivable from other explicit data items in the model, or produced by the operation that performs a layout procedure.

B. General Features of the Invention

FIG. 1 is a block diagram showing layout parameter training operation 200 of the present invention. Training operation 200 takes as input a 2D image model 10 that models as a grammar a class of document images; 2D image model 10 models the spatial structure of a text image in the class of images as a set of parameterized layout functions that specify the spatial relationship in the image between image constituents. A parameterized layout function for a pair of first and second image constituents makes the physical location in the image of the second image constituent dependent on the physical location in the image of the first image constituent. The parameters of the layout function provide explicit data items from which, at the conclusion of training operation 200, at least one text image layout parameter relating to at least one of the first or second image constituents can be determined.

Training operation 200 also takes as input a set 20 of training images; each training image is an image in the class of document images modeled by 2D image model 10. In general there are more than two possible layout functions that could be specified for the relationship between two image constituents, and it is not practical nor always possible to include in the 2D image grammar all possible layout functions. Moreover, while several examples of documents in the class (i.e., the training images) may provide enough information to distinguish the layout function being used, example images are noisy in the sense that measurements of bounding boxes, midpoints, or other distinguished points of an image constituent are inherently imprecise. The 2D image model represents the set of possible layout choices in a continuum and parameterizes them by a finite number of layout parameters. Because the set of allowable layout functions lies in a parameterized space, the operation of learning the parameters of the functions may be viewed as being analogous to a curve fitting problem.

Very generally, training operation 200 learns the layout parameters of the layout functions in the 2D image grammar by determining measurements of actual examples of image constituents in the input training images, and by determining the physical spatial relationship(s) between first and second measured image constituents that have an explicit relationship expressed in one of the layout functions. Then, after accumulating measurement data from all of the training images, training operation 200 uses the measurement data to estimate values for the parameters in the layout functions, thus learning the layout rules that describe the physical relationship between the two image constituents in the image model. Training operation 200 then produces as its output a trained 2D image model 12 which includes an explicit value for at least one parameter in at least one layout function that represents a physical relationship between two image constituents in the class of images being modeled. The value of a text image layout parameter is able to be determined from one or more explicit parameter values produced as a result of the training operation.

Training operation 200 is a general and flexible training operation for two reasons. First, while operation 200 may be implemented to train all text image layout parameters included in 2D image model 10, it may also be implemented to accept as input one or more selected layout parameters for training. This optional implementation is shown in FIG. 1 by parameter selection input 11 represented in dashed lines. Secondly, the functions performed by training operation 200 are not dependent on the particular 2D image model that operation 200 uses nor on the training images that operation 200 receives; operation 200 may train the text image layout parameters of any 2D image model that it is provided as input, as long as the set 20 of input training images have the structure of the class of documents modeled by the input 2D image model.

Figure 2:
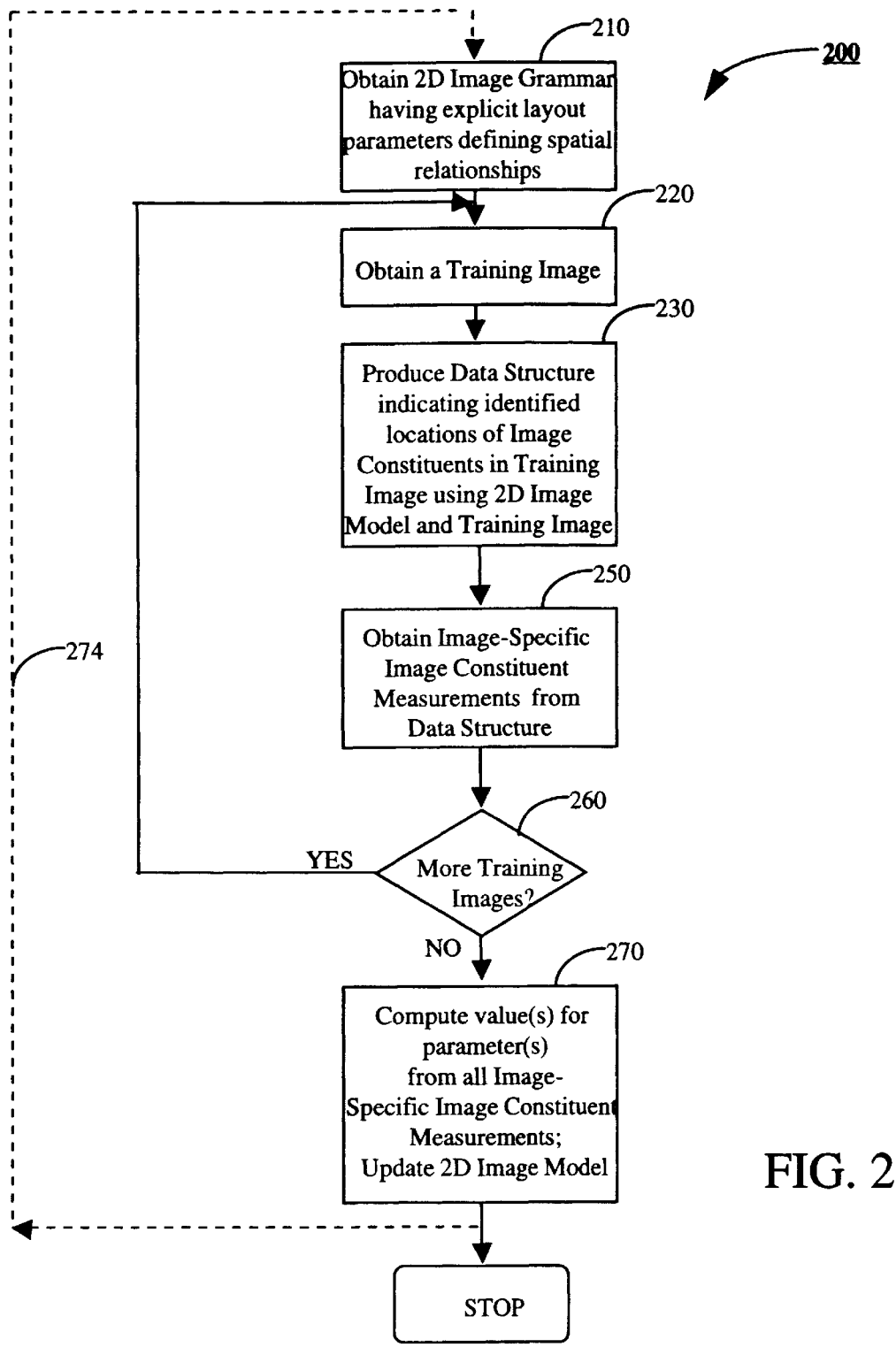
FIG. 2 is a flow chart illustrating the general steps of the text image layout parameter training operation of the present invention.

FIG. 2 illustrates the general steps of training operation 200 as carried out by the processor of a processor-controlled machine. The processor, in box 210, obtains a data structure indicating a 2D image grammar having parameterized layout functions that represent the spatial relationship in a modeled image between image constituents in the image. The actual values of the parameters in the layout functions in the grammar that express the physical relationships among image constituents are initially unknown and learning these are the goal of the training operation. To the extent these parameters may be used during the training operation they are initialized to reasonable but essentially arbitrary initial values. However, certain initial information is provided in the model such as image constituent measurements of the terminal symbols in the grammar, and image coordinates of the location of the root symbol in the grammar.

The processor then obtains, in box 220, a first training image. The processor then uses the 2D image grammar and the training image to produce, in box 230, a data structure that indicates estimated actual physical locations of identified, or labeled, image constituents in the training image. One of the component operations of operation 230 is to obtain, in any suitable manner, the labels that identify the image constituents in the training image, and, during its operation, to pair those labels with image locations of respective image constituents in the image. The processor then obtains, in box 250, measurements that are specific to the identified image constituents using the physical location information in the data structure and that are data components of a layout function included in the 2D image grammar. An inquiry is made, in box 260, as to whether there are more training images, and if so, processing control returns to the operation in box 220, and the operations in boxes 220, 230 and 250 are repeated to collect additional measurement data.

When all training images have been processed, processing control proceeds to the operation in box 270 where values for the parameters in the layout functions are computed using all of the image-specific image constituent measurements accumulated during the operation in box 250. Once the parameters in the layout functions have been determined, the layout functions in the 2D image grammar may be updated with the computed parameter values.

Note that, depending on the particular implementation of training operation 200, individual parameters may be selected for training, as shown in FIG. 1; additional functions not shown in FIG. 2 would also be implemented to accept the parameter selection and to tailor the collection of the image-specific image constituent measurement data appropriately. In addition and also depending on the particular implementation of training operation 200, individual ones or groups of layout function parameters may be trained in phases to simplify the operation or enhance the performance of the training operation. For example, training operation 200 may train all of the parameters for layout functions that express a particular kind of spatial relationship or for specific types of image constituents first, while keeping the values of the remaining parameters at their initialized values, and then repeat the training operation steps for a next group of parameters, using the results of the previous phase(s) of training. This phased training operation may improve overall training performance and results for some types of document grammars.

At this point the 2D image grammar either has been sufficiently trained to permit its successful use in a subsequent operation, or further training may be needed. Dashed line 274 in FIG. 2 shows that the entire training process optionally may be iterated again to further refine the parameter values used in the layout functions, using the 2D image grammar updated with the parameter values computed for the layout functions in the last iteration of training. If a phased training approach is used, iteration typically follows the completion of one pass of each phase of training. Note that, in order to determine whether additional iterations of training are needed, it may be necessary to use the 2D image grammar in its current updated form in an operation, such as recognition, to evaluate the performance of the grammar (e.g., its accuracy in recognition) and thus determine whether the layout parameters have stabilized at values that produce satisfactory results.

Training operation 200 in FIG. 1 is labeled as being unsupervised because there is no explicit input to the training process that provides to operation 200, and specifically to operation 230 of FIG. 2, the labels that identify the image constituents in the training images. Image constituent labels are typically obtained from a transcription. A training operation that does not require the explicit input of a transcription as a source of labels is said to be "unsupervised."

Figure 3:
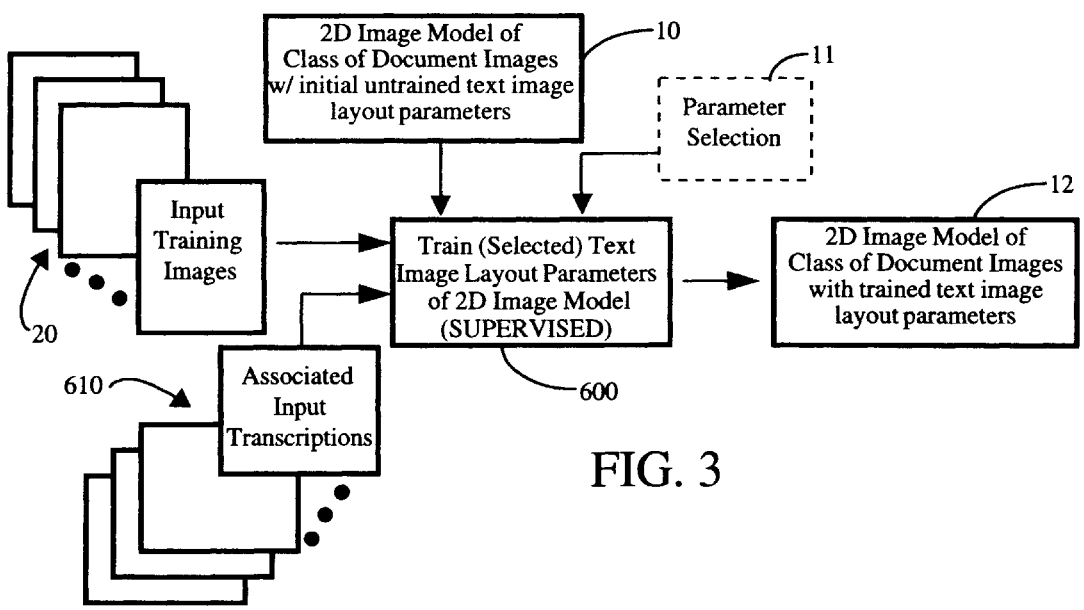
FIG. 3 is a simplified block diagram illustrating the input and output data structures of a supervised implementation of the text image layout parameter training operation of FIG. 1.

Training operation 200 may be implemented as a supervised training operation by supplying a transcription associated with each training image as an explicit input to the training process. Supervised training operation 600 is illustrated in FIG. 3. Training operation 600 proceeds in much the same manner as described above for training operation 200 of FIG. 2 except that operation 230 need not include a component operation that produces a transcription of the training image since the transcription is explicitly supplied as an input to the training operation.

C. An Illustrated Implementation

An illustrated implementation of training operation 200 of FIGS. 1 and 2 makes use of a stochastic context-free attribute grammar as 2D image grammar 10. In this implementation, the stochastic context-free attribute grammar is a component of a document recognition system described in terms of a communication theory framework. This framework is discussed in the Kopec and Chou, "Document Image Decoding" reference cited above in the Background discussion, and U.S. Pat. No. 5,321,773 discloses a document recognizer is implemented using the principles of this framework. Document recognition using a stochastic context-free attribute grammar is discussed in the Chou and Kopec, "A stochastic attribute grammar model" reference, which is also cited above. The following discussion of an implementation of the present invention assumes a background knowledge of this material, and for ease of reference, some of this background is incorporated in the discussions below, as well as in a discussion at the end of this disclosure in the Appendix. Additional details about this illustrated implementation may also be found in Jesse F. Hull, *Recognition of Mathematics Using a Two-Dimensional Trainable Context-Free Grammar*, Massachusetts Institute of Technology, Masters Thesis, June 1996 (hereafter, "the Hull reference") which is hereby incorporated by reference herein as if set out in full or all that it teaches.

1. General Description of the Training Process.

Figure 4:
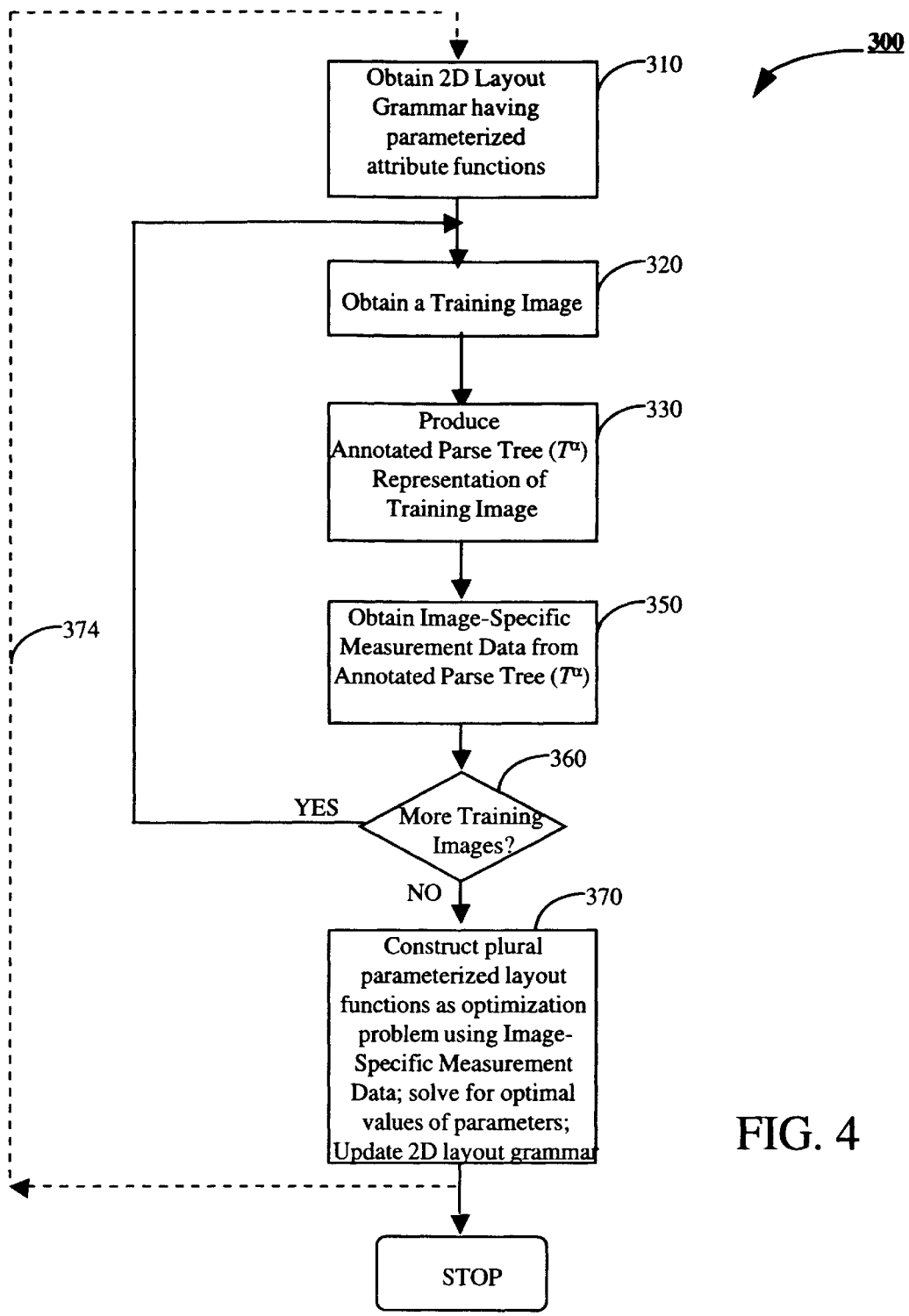
FIG. 4 is a flow chart illustrating the general steps of an illustrated implementation of the present invention.

The training technique in this illustrated implementation of the present invention generally proceeds as described in the discussion that accompanies FIGS. 1 and 2 above. FIG. 4 illustrates the component steps of the training operation specifically with respect to this illustrated implementation. The processor of a processor-controlled machine obtains, in box 310, a 2D stochastic context free layout grammar modeling a particular class of text images; the attribute grammar has been constructed with synthesized and inherited attributes and synthesis and inheritance functions declared and defined for each production rule, as described in more detail below. Also included in the layout grammar is a set of one or more parameterized functions of the synthesized attributes. The parameters in this set of one or more functions express actual physical relationships between and among image constituents in the class of images being modeled; the actual values of these parameters with respect to the modeled class of images are unknown at the beginning of training, and are trained during the training process. The values for the synthesized attributes for each terminal symbol and the inherited attributes for the root production rule in the layout grammar are initialized prior to training.

The processor obtains training images, in box 320, one at a time and produces, for each training image, in box 330, an annotated parse tree representation, $T^\alpha$ of the training image using a modified form of the 2D layout grammar model that is specially constructed for this task. The process of producing $T^\alpha$ is called alignment and uses a decoder which is an image recognizer that makes use of a modified heuristic A* search algorithm, also described in more detail below. Annotated parse tree $T^\alpha$ is the most likely representation of the structure and content of the training image. The alignment process also makes use of a modified, or restricted, form of the 2D layout grammar to simply its operation. The process of alignment produces sufficient information for the processor to estimate image-specific measurements, i.e., image locations, of each image constituent in the training image, and to compute both the synthesized attributes (i.e., the box metrics of the image constituents) and the inherited attributes (the global coordinates of the image constituents) using the synthesis and inheritance functions to complete the syntax-directed translation and produce the annotated parse tree. Note that the details of implementing the alignment process change according to whether the training operation used is unsupervised or supervised. The specifics of the alignment process are described in detail below.

In this illustrated implementation, the synthesis functions are formulated to reflect a linear relationship between the physical location of an image constituent in its local coordinate system and the physical location of the image constituent in its parent and the global (page) coordinate system of the training image. Relationships among the synthesis functions are captured in one or more parameterized functions of the synthesized attributes. The coefficients of these functions express a relationship among the synthesized attributes (i.e., the box metrics) that describe the layout of the image constituents and essentially characterize the layout of two image constituents in the image with respect to each other; these coefficients are called the layout parameters. Values of the synthesized attributes are directly available from the annotated parse tree of each training image after alignment. Thus, after alignment of a training image is completed, the processor, in box 350, records the measurements of the synthesized attributes from the annotated parse tree—i.e., the box metrics—in a set of image-specific functions of the layout parameters for each training image.

The processor then obtains the next training image and performs the alignment process, producing an annotated parse tree representation of that image. The processor then collects synthesized attribute data from the annotated parse tree for the parameterized function(s) associated with this next training image. A set of parameterized equations having the layout parameters as coefficients is collected in this manner for each training image processed. It can now be seen that, for each collection of training images, data has been collected for each rule in the grammar about the position of a pair A and B of image constituents with respect to each other. Since each training image is an example of the class of images being modeled, the several examples of data for image constituents A and B for a given grammar rule are likely to provide sufficient information from which to conclude an accurate relationship between A and B. The values of the layout parameters in these equations are initially unknown at the beginning of training, but after processing of all training images is completed, finding the values of the layout parameters, in box 370 (FIG. 4), essentially becomes an optimization problem. The layout parameters in the equations included in the 2D layout grammar are then updated with these final values.

A wide variety of processing options are possible during the training process with respect to how many of the parameters are trained at one time. For example, it may be desirable to train the layout parameters in phases, rather than all at one, by only computing some subset of the values of the layout parameters in the synthesized functions while assigning reasonable guesses to the other layout parameters and holding them constant during this training phase. Subsequent training phases can then make use of the parameter values trained in prior phases. Generally, the processing option selected will depend on the complexity of the image constituent layout of the class of modeled documents, which is reflected, in turn, in the complexity of the layout grammar and its synthesis and inheritance functions.

As shown in FIG. 4 by dashed line 374, the entire training process may be iterated one or more times using the last-updated layout grammar for each successive iteration, with the same or with a new set of training images, until a stopping condition is met. A description of the 2D image grammar and each of these processes is now described in detail.

2. Description of the 2D Image Attribute Grammar Having Layout Rules Specified as Parameterized Functions.

Two or more attribute grammars, each called a component attribute grammar, can be combined into a single attribute grammar called a product attribute grammar. Each component attribute grammar may have its own set of associated inherited and synthesized attributes, referred to as its component attributes.

Figure 5:
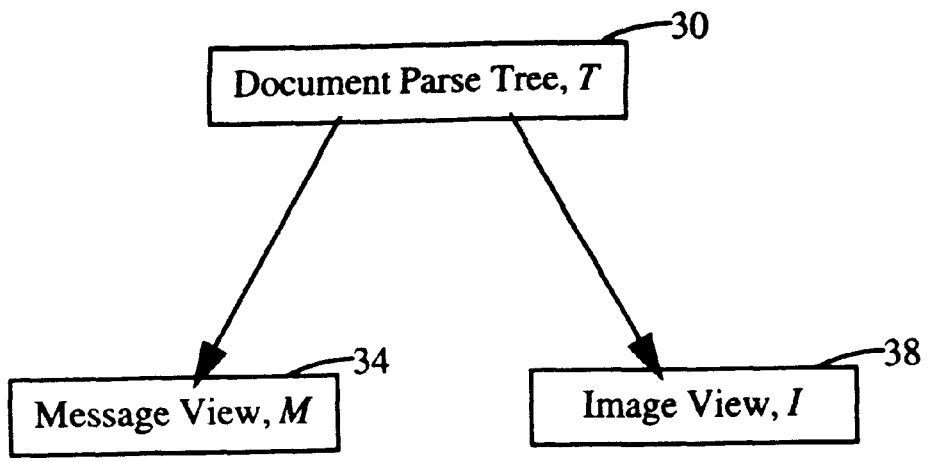
FIG. 5 schematically illustrates a parse tree representation of a document image that coordinates different views of the document image according to an illustrated implementation of the present invention.

As schematically illustrated in FIG. 5, in the framework of the illustrated implementations of this invention, a document is a parse tree 30, T, in a product attribute grammar G that coordinates a message view 34 and an image view 38 of the document, each view being represented by a component attribute grammar. Message view 34 of a document is a string M=M(T); image view 38 is a sequence of bitmapped images I=I(T). M and I are syntax-directed translations of T in the component grammars $G_1$ and $G_2$, respectively. $G_1$ is called the message component grammar, while $G_2$ is called the image component grammar. M and I are deterministic functions of T.

Figure 6:
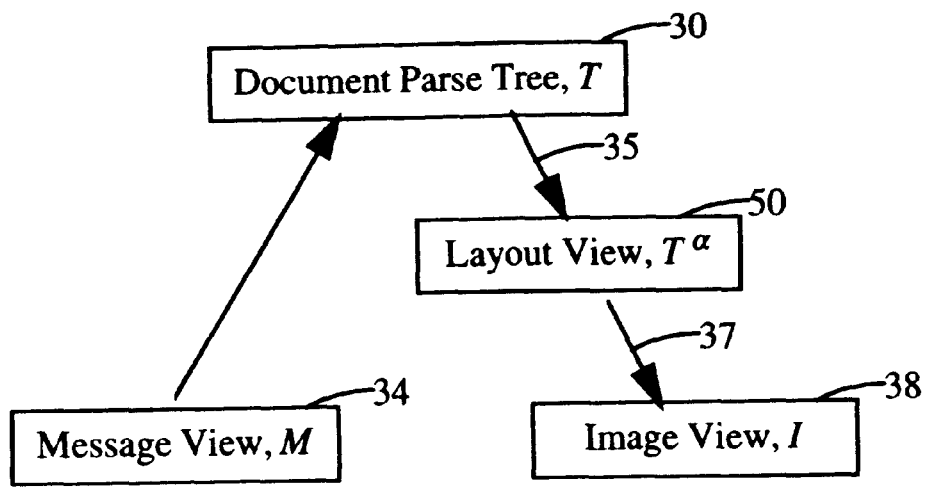
FIG. 6 schematically illustrates the decomposing of the parse tree representation of a document image of FIG. 5 into a layout view and an image view.

Document processing operations include formatting and rendering. Formatting is the process of laying out a logical document structure as a set of graphical elements at various coordinates in the plane or in a sequence of planes. Rendering is the process of mapping those graphical elements through their coordinates into a set of bits in a bit array or sequence of bit arrays, for eventual printing or display. In the framework of this invention, formatting and rendering taken together constitute a mapping from the message view 34 of a document to its image view 38. As shown in FIG. 6, formatting and rendering are distinguished by decomposing the syntax-directed translation I(T) from the document parse tree 30 to its image view 38 into two separate operations represented by arrows 35 and 37. Operation 35 is the syntax-directed translation of document parse tree 30, T, to $T^\alpha$, and rendering operation 37 renders annotated parse tree $T^\alpha$ to image view 38, I. The parse tree 50, $T^\alpha$, is called the "layout view" of T, and is defined to be the tree T annotated by graphical information at each node (such as a coordinate transformation) to represent an object and its position on an appropriate plane (e.g., a page). Formatting can be viewed as the process of mapping a message view 34, or M, into layout view 50, or $T^\alpha$, while rendering is the process of mapping layout view 50 into image view 38. The portion of the attribute grammar defining the image view I(T) of the document parse tree T that is needed to compute $T^\alpha$ from T is called the layout component grammar. In this illustrated implementation, a layout component grammar, with its parse tree denoted as $T^\alpha$, serves as the 2D image model 10 of FIGS. 1 and 2 that is used during the training process.

Figure 7:
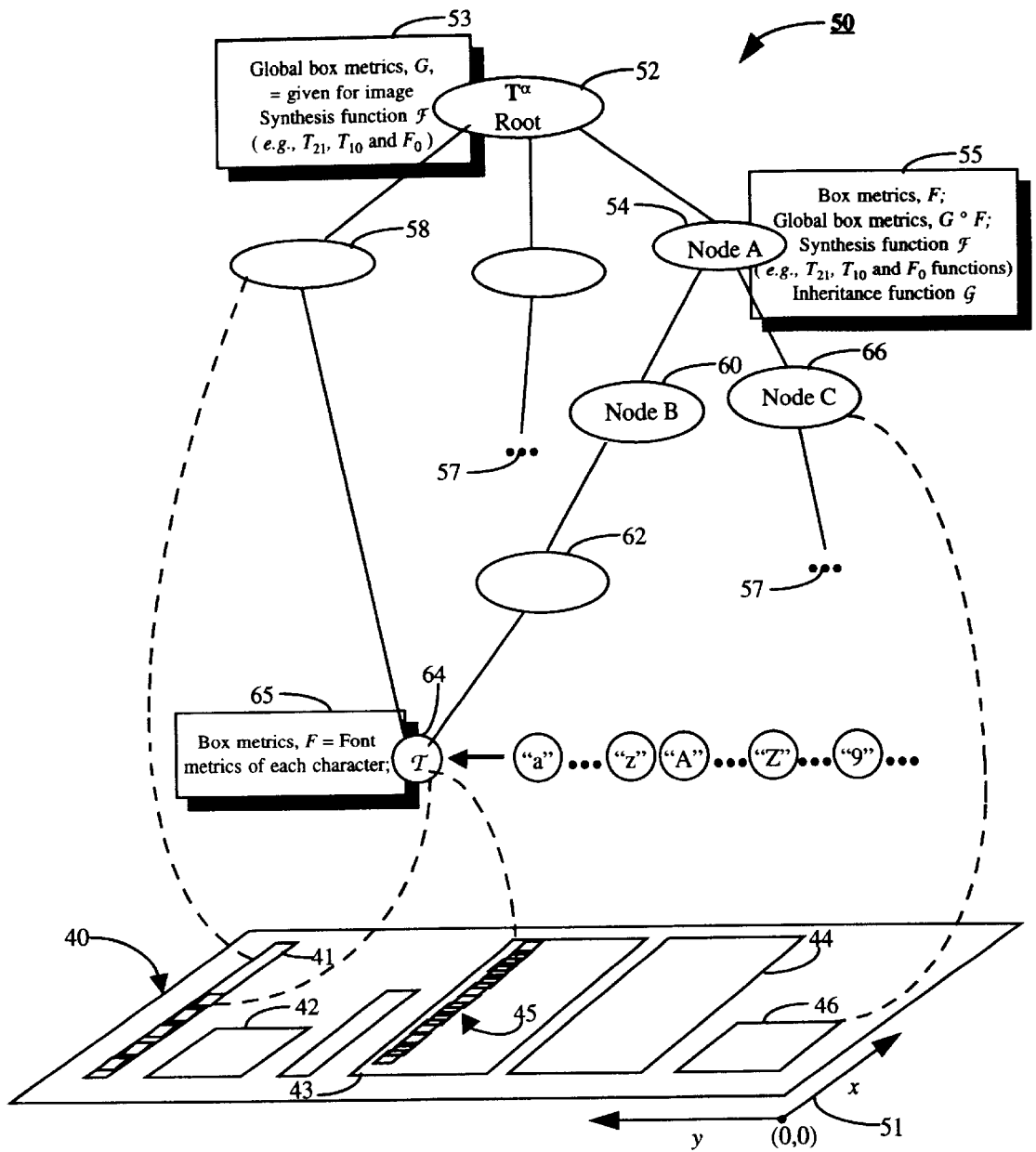
FIG. 7 schematically illustrates the layout view of FIG. 6 of a class of document images as a parse tree having attributes and functions associated with symbols at its nodes, according to an illustrated implementation of the present invention.

FIG. 7 shows what is intended to be a general example of parse tree 50, $T^\alpha$ of FIG. 6, representing a class of document images having the structure of representative image 40; for compactness in the figure, image 40 is shown at the bottom of the FIG. 7 positioned to appear as though it is lying on a surface and viewed from above. The syntax-directed translation of parse tree 50 produces an image view 38 (FIG. 6) of the document class, as represented by image 40. Certain nodes of parse tree 50 are shown with a dashed line connection to an image constituent of image 40, indicating that the node represents the message content of that image constituent in image 40 and the physical location of that image constituent in the image coordinate system 51 of image 40. Node 58, for example, represents image constituent 41, and individual terminal symbols 64 represent individual glyphs within image constituent 41. Node 54 in the parse tree represents image constituents 43, 44 and 46; intermediate nodes 60 and 62 represent component image constituents of constituents 43 and 44 not specifically called out, while node 66 represents image constituent 46. Individual terminal symbols 64 represent individual glyphs 45 in image constituent 43. Each node in parse tree 50 has synthesized and inherited attributes and parameterized synthesis and inheritance functions, $\mathcal{F}$ and $\mathcal{G}$, associated with it, details of which are explained more fully below. These synthesis and inheritance functions, $\mathcal{F}$ and $\mathcal{G}$, are examples of layout functions for the grammar rule represented by the node. Internal node 54 shows these in box 55, terminal symbols 64 shows these in box 65, and root node 52 shows these in box 53. Note that the ellipsis symbols 57 merely represent portions of parse tree 50 that have been omitted from the drawing; in the case of the terminal symbols, the ellipsis symbols represent other characters in the character set that make up the set of terminal symbols, such as characters in the English language as shown in the drawing.

a. Synthesized Attributes.

The synthesized attributes for production rules for a terminal symbol (i.e., a character) are the three two-dimensional vectors that comprise the font metrics of the character, and are designated as $(ll_x, ll_y)$ for the lower left (bottom) corner 192 (FIG. 29) of the character bounding box; $(upr_x, upr_y)$ for the upper right (top) corner 194 (FIG. 29), of the character bounding box; and the origin 198 (FIG. 29) and $(end_x, end_y)$ for the character endpoint 196 (FIG. 29), each in the character's local coordinate system. (Note that in this description, the notation for the font metrics and for the box metrics is changed from that used in the Appendix and in FIG. 29.) FIG. 7 shows these synthesized attributes in box 65 for a representative one of the set 64 of terminal symbols.

The synthesized attributes for non-leaf (internal) nodes are referred to as the box metrics of the node, are collectively denoted by F, and also consist of three vectors; the first two vectors are the lower left corner and the upper right corner of the bounding box of the frame represented by the node, and the third vector is some distinguishing point in the frame of the node. The notation ($F_A^{llx}$, $F_A^{lly}$), ($F_A^{uprx}$, $F_A^{upry}$), and ($F_A^{endx}$, $F_A^{endy}$) shall be used to denote the lower left, upper right, and end point of the box metrics for a node A.

b. Inherited Attributes.

The inherited attributes of a node consist of the global coordinate transformation, G, which maps the local coordinate system of the node to the global coordinates of the page image. To actually lay out an ideal image from its parse tree, one must construct a global coordinate transformation for all of the symbols in the image. These transformations specify how the local coordinates of each terminal symbol and each parent node up to the root of the parse tree are transformed to the global coordinates of the page. In general this transformation can be non-linear. In practice, however, the affine transformation of Equation (H.7) (in the Appendix) is sufficient to represent the type of transformations that occur in most classes of documents. In this illustrated implementation, a uniform scaling translation, which uses slightly different notation than that of Equation (H.7) and which takes the form $$G: \begin{bmatrix} x \\ y \end{bmatrix} \mapsto \begin{bmatrix} s & 0 \\ 0 & s \end{bmatrix} \begin{bmatrix} x \\ y \end{bmatrix} + \begin{bmatrix} b_1 \\ b_2 \end{bmatrix} \quad (1)$$

is assumed. It is to be understood that for some classes of documents, this assumption may be too restrictive because there may be characters or other image constituents, such as special types of symbols, that undergo non-uniform scaling. A uniform scaling translation G is parameterized by the three values $G^{scale}$, $G^{shiftx}$, and $G^{shifty}$, which will denote the transformation $$G: \begin{bmatrix} x \\ y \end{bmatrix} \mapsto \begin{bmatrix} G^{scale} & 0 \\ 0 & G^{scale} \end{bmatrix} \begin{bmatrix} x \\ y \end{bmatrix} + \begin{bmatrix} G^{shiftx} \\ G^{shifty} \end{bmatrix} \quad (2)$$

When F represents a set of box metrics for a node in the local coordinates of the node, then G·F represents the set of box metrics produced by applying G to every vector in F. Two additional notational matters are useful in understanding this illustrated implementation of the invention: if $G_1$ and $G_2$ are transformations, then $G_1$ o $G_2$ denotes the transformation created by applying $G_2$ followed by $G_1$; and the inverse transform, $G^{-1}$, is given by $$G^{-1}: \begin{bmatrix} x \\ y \end{bmatrix} \mapsto \begin{bmatrix} \frac{1}{G^{scale}} & 0 \\ 0 & \frac{1}{G^{scale}} \end{bmatrix} \begin{bmatrix} x \\ y \end{bmatrix} + \begin{bmatrix} \frac{-G^{shiftx}}{G^{scale}} \\ \frac{-G^{shifty}}{G^{scale}} \end{bmatrix} \quad (3)$$

where $G^{scale} \neq 0$.

c. The Synthesis Function.

The synthesis function for each rule actually constructs the box metrics (i.e., the synthesized attributes) for an internal (non-terminal) node A in the parse tree from the box metrics of each of the symbols in the rule of A, and expresses those box metrics in the local coordinate system of internal node A. That is, for an internal node having the rule A→BC the synthesis function $\mathcal{F}$ maps $F_B$ and $F_C$ to $F_A$: $F_A = \mathcal{F}(F_B, F_C)$. The synthesis function is composed of three functions, referred to as the $T_{21}$, $T_{10}$ and $F_0$ functions, that are part of the layout grammar. As will soon be evident from the description of these component functions, defining the synthesis function in this manner reflects a particular view of how image layout is accomplished. Moreover, the component functions of the synthesis function defined in this manner are also used to define the inheritance function.

i. The $T_{21}$ Function.

Figure 8:
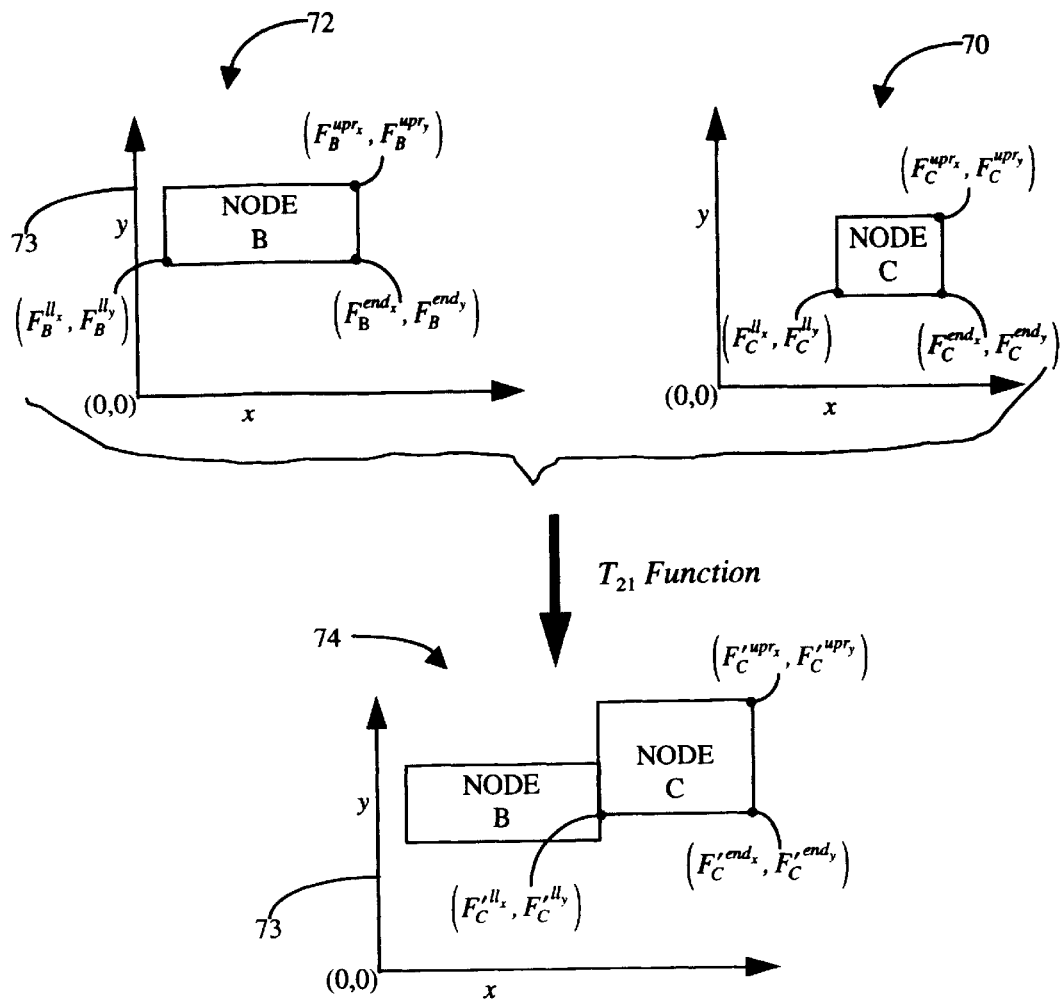
FIG. 8 shows two image constituents positioned in their respective local coordinate systems and shows the coordinate transformation of a second image constituent to the local coordinate system of the first image constituent, according to a synthesis function defined in the illustrated implementation of the present invention.

The $T_{21}$ function for a rule of the form A→BC is a coordinate transformation of the box metrics of the second node C from the coordinate system of C to the coordinate system of first node B. $T_{21}$ specifies how the image constituents represented by the subtrees of nodes B and C should be laid out with respect to each other. With reference to FIG. 8, the image constituent represented by a Node C in a parse tree is shown in its local image coordinate system 70 with its box metrics explicitly labeled. Local image coordinate system 73 in graph 72 on the left side of FIG. 8 shows the image constituent represented by a Node B in a parse tree, also with its box metrics labeled. Application of the $T_{21}$ function to the box metrics of Node C results in graph 74 showing the box metrics of Node C converted to coordinates in local image coordinate system 73 of Node B. The converted box metrics of node C in graph 74 are shown labeled as F' to distinguish them from the box metrics of node C in graph 70. Components of the $T_{21}$ function include three parameterized functions, $T_{21}^{scale}$, $T_{21}^{shiftx}$, and $T_{21}^{shifty}$, that respectively control the scale of the box metrics of the image constituent at node C relative to the scale of the image constituent at node B, and the x and y coordinate locations of the origin of the image constituent at node C relative to those of node B. In FIG. 8, it can be observed that node C has been scaled up in size by approximately 50% and has a position immediately adjacent and to the right of Node B and up from the baseline of node B. These transformations are represented in the parameters of the $T_{21}$ function. Note that, for a rule of the form A→B $T_{21}$ is taken to be the identity since there is no second node. As with the global coordinate transformation, $T_{21}$ is required to be a uniform scaling translation.

ii. The $T_{10}$ Function.

The $T_{10}$ function for a rule of the form A→BC or A→B is a coordinate transformation of the box metrics of the image constituent(s) represented by the subtree(s) of node B (and node C, if applicable) on the right hand side of the rule, i.e., from the local coordinate system of node B, to the local coordinate system of node A. For a rule of the form A→B the coordinate transformation $T_{10}$ depends only on the box metrics of node B. However, when the rule is of the form A→BC this function depends on the box metrics of B and C as well as the $T_{21}$ transformation between them. In addition, the transformation of the box metrics of a node C from the coordinate system of C to A is determined by $T_{10}$ and $T_{21}$, and therefore need not be explicitly provided.

Figure 9:
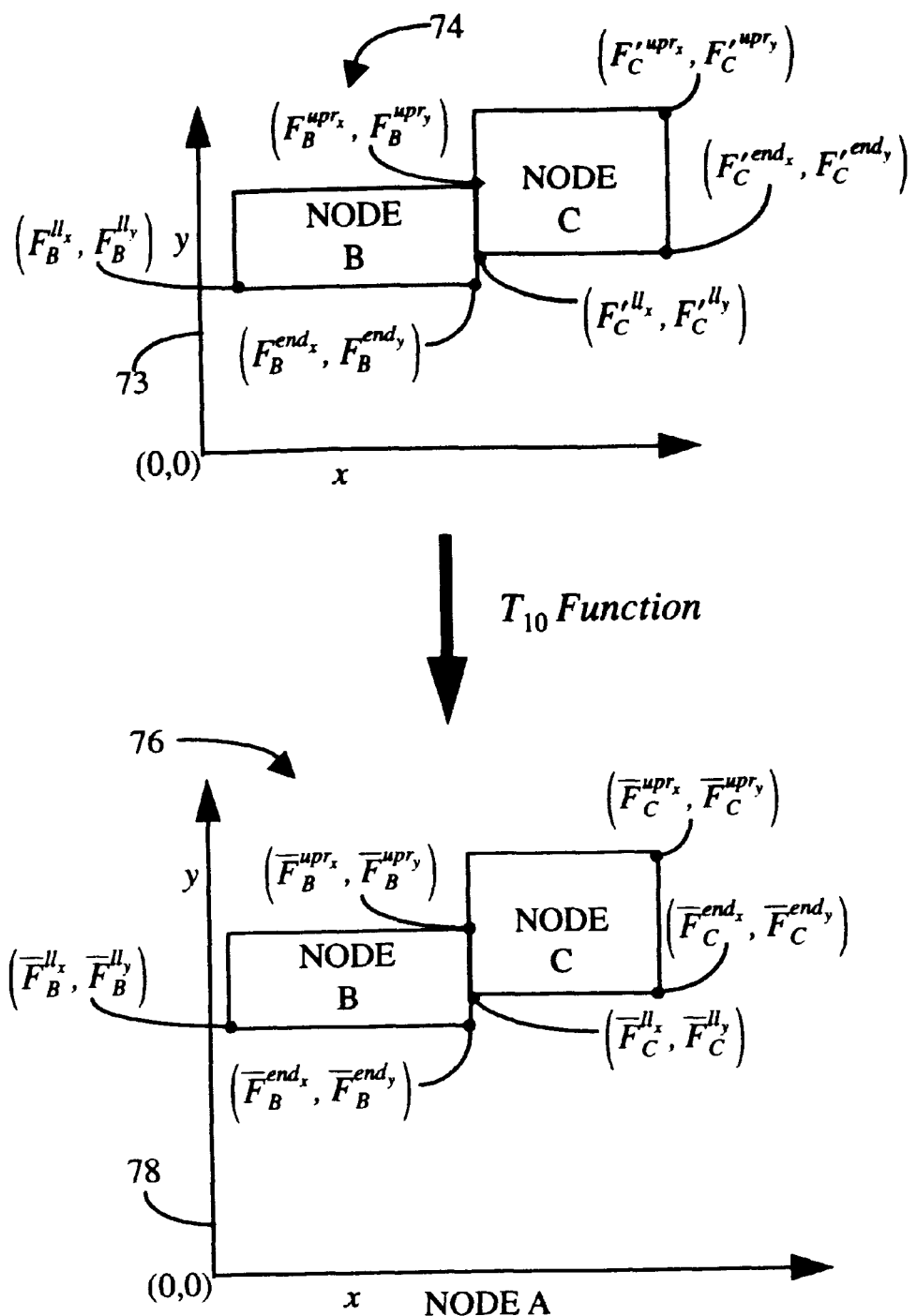
FIG. 9 shows the coordinate transformation of the image constituent created in the transformation illustrated in FIG. 8 to the local coordinate system of a parent image constituent, according to a second synthesis function defined in the illustrated implementation of the present invention.

FIG. 9 illustrates the $T_{10}$ function as applied to the results of the $T_{21}$ function of FIG. 8, showing in graph 76 the box metrics of both nodes B and C converted to local image coordinate system 78 of Node A. The converted box metrics of Node C and the box metrics of Node B in graph 76 are shown labeled as $\bar{F}$ to distinguish them from the converted box metrics F' of Node C and the original box metrics of Node B in graph 74. As with the $T_{21}$ function, components of the $T_{10}$ function include three parameterized functions, $T_{10}^{scale}$, $T_{10}^{shiftx}$, and $T_{10}^{shifty}$, that respectively control the scale of the box metrics of the image constituents at nodes B and C relative to the scale of the image constituent at node A, and the x and y coordinate locations of the origin of the image constituents at nodes B and C relative to those of node A. In FIG. 9, it can be observed that Nodes B and C appear in the same size as they do in their local coordinate systems and have positions slightly to the left (in the minus x direction) and up (in the plus y direction) from their positions in graph 74. These transformations are represented in the parameters of the $T_{10}$ function.

iii. The $F_0$ Function.

The $F_0$ function for a rule of the form A→BC or A→B is the function that computes the box metrics of the image constituent(s) for the internal node A in the local coordinate system of node A. When the rule is of the form A→BC $F_0$ takes as arguments the box metrics for nodes B and C in the local coordinate system of node A, which are given by the expressions $\bar{F}_B = T_{10} \cdot F_B$ and $\bar{F}_C = T_{10} \cdot (T_{21} \cdot F_C)$, respectively. Here $F_B$ and $F_C$ are the box metrics for the nodes B and C in their own coordinate system. When the rule is of the form A→B $F_0$ only depends on $\bar{F}_B$.

Note that the first two vectors of the box metrics are simply the lower left and upper right coordinates for that node, and these two vectors are always calculated in the same manner, as follows:

$$F_0^{llx} = \min(\bar{F}_B^{llx}, \bar{F}_C^{llx}) \qquad (4)$$

$$F_0^{lly} = \min(\bar{F}_B^{lly}, \bar{F}_C^{lly}) \qquad (5)$$

$$F_0^{uprx} = \max(\bar{F}_B^{uprx}, \bar{F}_C^{uprx}) \qquad (6)$$

$$F_0^{upry} = \max(\bar{F}_B^{upry}, \bar{F}_C^{upry}) \qquad (7)$$

Figure 10:
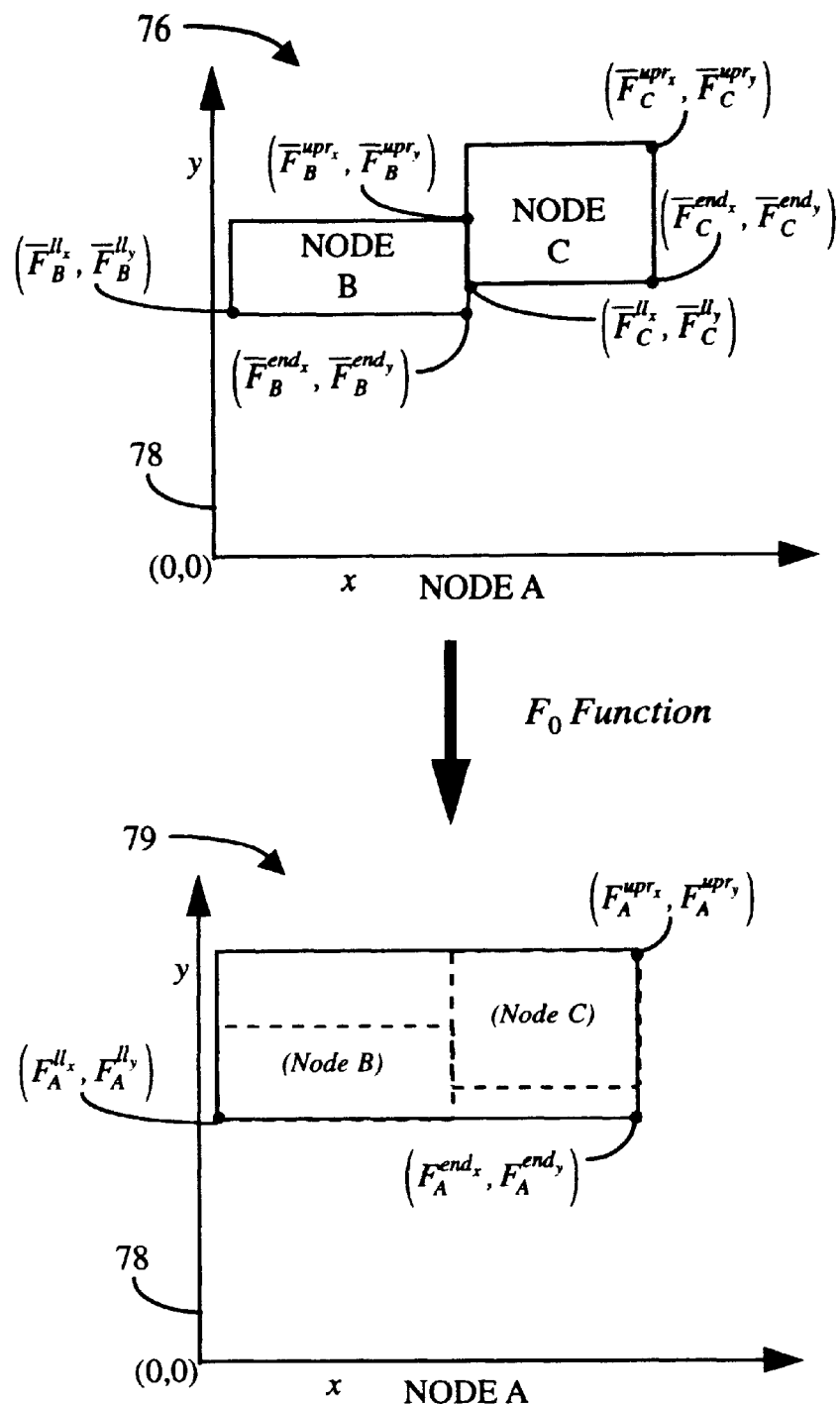
FIG. 10 shows the computation of the synthesis attributes of the image constituent produced in the transformation shown in FIG. 9, using a third component synthesis function defined in the illustrated implementation of the present invention.

Therefore, when specifying the $F_0$ function for each rule in the grammar, only the information needed to calculate the end point is necessary. FIG. 10 illustrates the $F_0$ function as applied to the results of the $T_{10}$ function of FIG. 9, showing in graph 79 the box metrics of node A in local image coordinate system 78 of Node A. The outlines of the image constituents at nodes B and C are shown in dashed lines for reference purposes. While FIG. 10 shows that the end point for the image constituent at Node A is computed straightforwardly from the end points of image constituents that are positioned adjacent to each other, it is clear that if image constituents overlap (intersect) or are positioned one on top of another, the computed end point for the image constituent at Node A reflects a different spatial relationship that can be captured in the parameter(s) of the $F_0$ end point component function.

iv. Overlapping Image Constituents.

Figure 11:
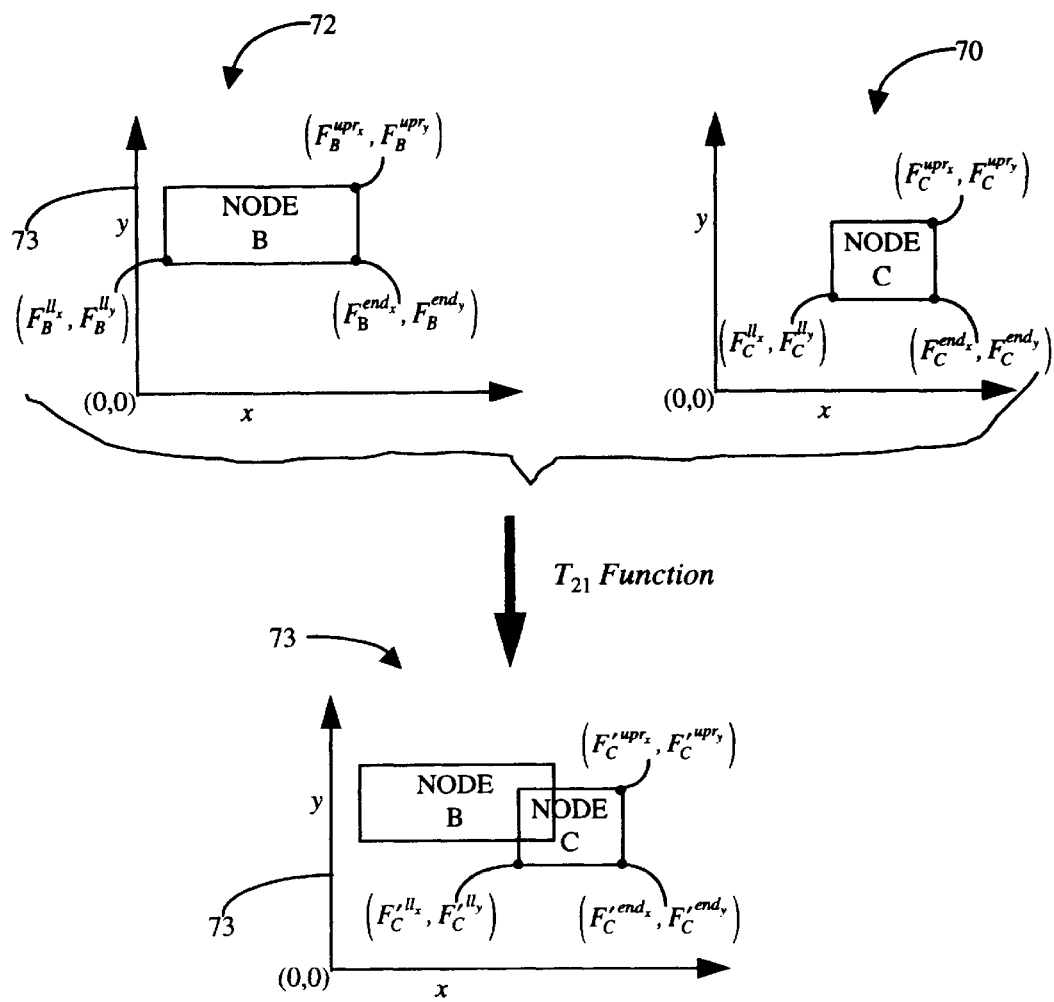
FIG. 11 illustrates: the position of two overlapping image constituents in a local coordinate system after applying the transformation illustrated in FIG. 8.
Figure 30:
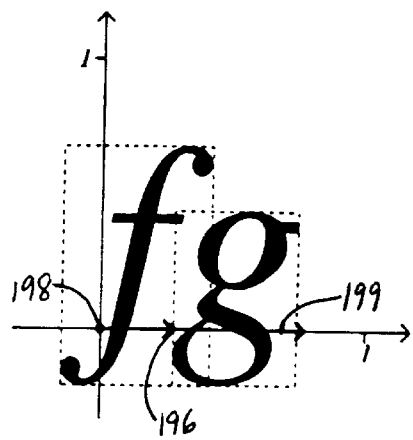

As noted below in the discussion accompanying FIG. 30 in the Appendix material, the sidebearing model of character positioning allows the bounding boxes of glyphs to overlap subject to the constraint that two glyphs have disjoint supports; that is, two glyphs cannot share foreground pixels in common. The 2D image grammar of the present invention allows for two image constituents to be positioned with respect to each other such that their bounding boxes may overlap. In particular, the $T_{21}$ function may cause the bounding boxes of nodes B and C to overlap or intersect as image constituents B and C are positioned relative to each other. FIG. 11 illustrates this type of image constituent positioning. In FIG. 11, the $T_{21}$ function causes Node C to maintain its original scale, and to be positioned below the base line of Node B, with a portion of the bounding box of Node C positioned within the bounding box of Node B.

d. The Synthesis Function Expressed in Terms of its Component Functions.

The synthesis function $\mathcal{F}$ can now be defined for each rule A→BC in the grammar in terms of the functions $T_{21}$, $T_{10}$, and $F_0$. Let $$T_{21} = T_{21}(F_B, F_C) \qquad (8)$$

$$T_{10} = T_{10}(F_B, F_C, T_{21}) \qquad (9)$$

$$\bar{F}_B = T_{10} \cdot F_B \qquad (10)$$

$$\bar{F}_C = T_{10} \cdot (T_{21} \cdot F_C) \qquad (11)$$

Then, $$\mathcal{F}(F_B, F_C) = F_0(\bar{F}_B, \bar{F}_C), \qquad (12)$$

where $F_B$ and $F_C$ are the box metrics for nodes B and C respectively. For rules of the form A→B the equations are the same except the terms involving $F_C$ are removed.

e. The Inheritance Function.

The inheritance function $\mathcal{G}$ for each rule constructs the global coordinate transformation (or equivalently the inherited attributes) for each non-root node in the parse tree. For rules of the form A→B, $G_B = \mathcal{G}(F_B, G_A)$, and for rules of the form A→BC, $G_B = \mathcal{G}_B(F_B, F_C, G_A)$, $G_C = \mathcal{G}_C(F_B, F_C, G_A)$. The inheritance function for rules of the form A→BC is composed of the three functions $T_{21}$, $T_{10}$, and $F_0$ supplied in the layout grammar. Using Equations (8) and (9), $\mathcal{G}$ is defined as $$G_B = \mathcal{G}_B(F_B, F_C, G_A) = T_{10}^{-1} \cdot G_A \qquad (13)$$

$$G_C = \mathcal{G}_C(F_B, F_C, G_A) = T_{21}^{-1} \cdot (T_{10}^{-1} \cdot G_A) \qquad (14)$$

where $\mathcal{G}_B$ and $\mathcal{G}_C$ are the component functions of $\mathcal{G}$ for nodes B and C, respectively, and $G_A$ is the global transformation for node A. For rules of the form A→B the equations are the same except that the terms involving $F_C$ are removed and $G_C$ is not computed.

Figure 12:
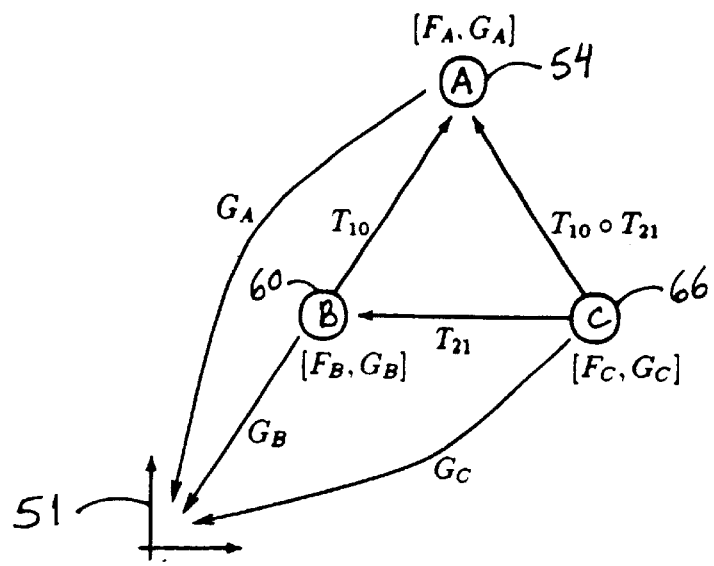
FIG. 12 is a schematic illustration of the relationship among coordinate systems of parent and child nodes in a portion of the parse tree of FIG. 7, showing the direction of coordinate transformations from the local coordinate system of an origin node to the local coordinate system of a destination node, and from each node to the global coordinate system.

FIG. 12 illustrates the relationship among coordinate systems of parent and child nodes in a parse tree and shows the synthesis functions $T_{21}$ and $T_{10}$ operating among nodes 54, 60 and 66 represented by lines with arrows showing the direction of the coordinate transformations from the local coordinate system of an origin node to the local coordinate system of a destination node. FIG. 12 also shows the inheritance functions $G_A$, $G_B$ and $G_C$, also represented by lines with arrows, operating from the local coordinate systems of nodes 54, 60 and 66 to the global page coordinate system 51 of the image.

f. Introduction of Random Layout to the 2D Image Model.

Although the 2D image source model in the form of a stochastic attribute grammar assigns a probability for each message string, the layout process of rendering that string into an image is an entirely deterministic process. In this illustrated implementation of the model, an element of randomness is introduced into the layout process that allows the model to capture a number of different deterministic layout programs. The notion of random layout can account for variations in layout between formatters, and even a single formatter with a single set of parameters actually results in different renderings of the same logical structures. Similarly, any long-range deterministic effect that cannot be produced by the 2D image layout grammar may be regarded as random noise. A conspicuous example is line justification, which cannot be performed easily by attribute grammars. Thus, introducing randomness may reduce the effect of inaccuracies in the layout grammar when the trained grammar is used for subsequent document processing operations, such as document recognition. Finally, if layout is done by hand, or if the message string is handwritten, it is proposed that the randomness in the layout process can be more accurately modeled by introducing randomness as described here.

Figure 13:
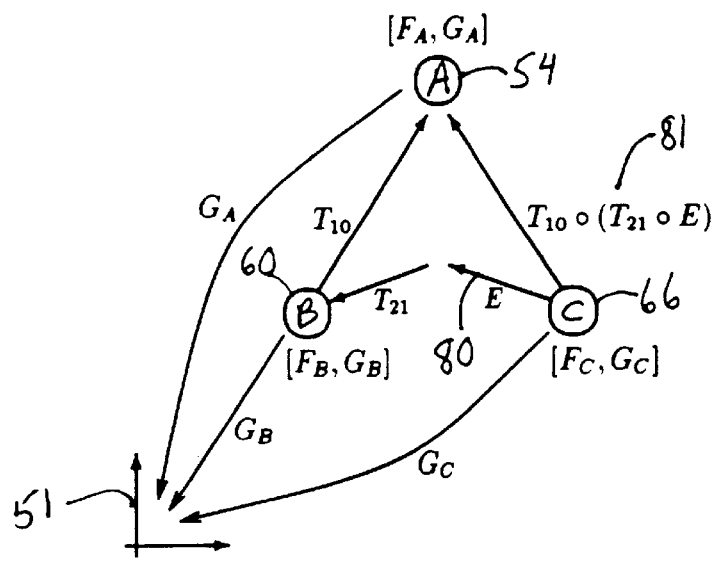
FIG. 13 is the schematic illustration of FIG. 12 showing the relationship among coordinate systems of parent and child nodes in a portion of the parse tree of FIG. 7, and also showing the affect on the transformations of the introduction of a randomness element into a component synthesis function, according to the present invention.

To add randomness to the layout model, Equation (8) is modified to $$\tilde{T}_{21} = T_{21}(F_B, F_C) \cdot E, \quad (15)$$

where E is a random transformation and where $T_{21}$ and $\tilde{T}_{21}$ are the predicted and observed $T_{21}$ transformations, respectively. As with previous transformations, E is required to be a uniform scaling translation. Although not required, for purposes of this illustrated implementation, it is assumed that $\log(E^{scale})$, $E^{shift_x}$ and $E^{shift_y}$ are all independent Gaussian random variables, where the variance of each is dependent on the particular rule being used and is supplied in the layout grammar. The introduction of randomness has the effect shown in FIG. 13 where, before computing the layout relationship between two nodes 60 and 66, the box metrics of second node 66 are perturbed by some random amount.

The effect of introducing randomness into the layout process impacts the computation of the probability of a parse tree, $T^\alpha$, as follows. When the layout process was deterministic, every message string, M, produced exactly one attributed layout grammar (assuming an unambiguous grammar) which meant $P(T^\alpha|M)$ was a degenerative probability distribution (zero except when $M=M(T^\alpha)$). However, when the layout process is modeled with randomness, $$P(T^\alpha | M) = \prod_i P_E(r_i) \quad (16)$$

where $P_E(r_i)$ is the probability of E, the error transformation used in rule $r_i$. Using Equation (H.5) (in the Appendix), Equation (16) can be written recursively as $$P(T^\alpha|M) = P_E(r_i) P(T_1^\alpha | M_1) P(T_2^\alpha | M_2) \quad (17)$$

where $T_1^\alpha$ and $T_2^\alpha$ are the left and right subtrees of $T^\alpha$ and $M_1$ and $M_2$ are the corresponding message strings. By Bayes' rule, $$P(T^\alpha) = \frac{P(M) P(T^\alpha | M)}{P(M | T^\alpha)}.$$

Since M is a deterministic function of $T^\alpha$ this becomes $$P(T^\alpha) = P(M) P(T^\alpha|M).$$

Substituting Equations (G.5) and (17) into this gives $$P(T^\alpha) = p(r_i) P(M_1) P(M_2) P_E(r_i) P(T_1^\alpha | M_1) P(T_2^\alpha | M_2) \quad (18)$$

$$= p(r_i) P_E(r_i) P(T_1^\alpha) P(T_2^\alpha)$$

3. Producing a Layout View of the Training Image.

As previously noted, the syntax directed translation of a parse tree involves computing all of the synthesized and inherited attributes using the synthesis and inheritance functions to produce an annotated parse tree which completely represents the message content and physical layout of an image. A parse tree such as parse tree 50 (FIG. 7) makes certain initial structural assumptions about the images in the modeled class. In the case of most text images in English and modern European languages, such as image 40 in FIG. 7, images in the class of modeled text images are assumed to be rectangular, and to have an image coordinate system 51 in which the lower left corner of the image is at x=y=0, with x increasing to the right, y increasing upward.

a. The Channel Model.

As noted in the Appendix material below, in the communication theory framework of document recognition (see e.g., FIG. 28), a channel such as a printer or scanner, randomly degrades an ideal image Y produced by the 2D image source model (source and encoder) into an observed bitmap image Z. Then, an optimal decoder chooses the most likely underlying logical document structure X as a reconstructed image $\hat{X}$, based on the observed noisy image Z by minimizing a loss function (e.g., the expected error between the ideal image Y and the reconstructed image $\hat{X}$). In the remainder of this discussion of the illustrated implementation, the ideal image Y, the observed image Z, and the reconstructed image $\hat{X}$ are denoted as I, O, and M, respectively.

Construction of a decoder according to this general communications theory framework requires the introduction of a channel model. The channel is modeled as independent binary asymmetric noise $P(O|I)$ on the assumption that every white bit in the ideal image I flips with probability $\epsilon_0$ and every black bit with probability $\epsilon_1$. The channel model for the observed image produced from an ideal image generated by parse tree $T^\alpha$, denoted as $I(T^\alpha)$, is expressed as the recursive equation, $$P(O|I(T^\alpha)) = P_C(O) P(O | I_1(T_1^\alpha)) P(O | I_2(T_2^\alpha)), \quad (19)$$

where $I(T_1^\alpha)$ and $I(T_2^\alpha)$ are subimages of the ideal image generated by the subtrees $T_1^\alpha$ and $T_2^\alpha$, respectively, and $p_C(O)$ is a computed probability of bit flipping in the observed image that takes into account the probability of bit flipping in overlapping (i.e., intersecting) observed subimage areas. For more detail on the derivation of the channel model equation, see section 2.5 of the Hull reference cited above.

b. The Dynamic Programming Algorithm That Implements the Decoder.

i. The Decoder MAP Rule.

The decoder is implemented using a dynamic programming algorithm based on a recursive equation that describes the optimal message string and document structure produced by the layout grammar. As just noted above and in the Appendix material below, an optimal decoder is a deterministic function that chooses the most likely underlying logical document structure as a reconstructed image based on the observed noisy image O by minimizing a loss function. The decoder in this illustrated implementation finds the optimal attributed parse tree $\hat{T}^\alpha$ given by $$\hat{T}^\alpha = \arg\max_{T^\alpha} P(T^\alpha) P(O | T^\alpha)$$

$$= \arg\max_{T^\alpha} P(O, T^\alpha)$$

$$= \arg\max_{T^\alpha} P(O, I(T^\alpha))$$

$P(O, I(T^\alpha))$ can be computed using Equations (18) and (19) for the encoder and channel models, respectively, to give $$P(O, I(T^\alpha)) = \begin{cases} P(O, I(c)) & \text{if } T^\alpha \text{ is a terminal node} \\ & \text{representing a character } c \\ p(r_i)P_E(r_i)p_C(O) \\ P(O_1 I_1(T_1^\alpha))P(O_2 I_2(T_2^\alpha)) & \text{otherwise} \end{cases} \quad (20)$$

For additional details about the derivation of Equation (20), see Chapter 3 of the Hull reference.

ii. The Modified Heuristic A* Search Algorithm.

Equation (20) is the basis of the dynamic programming algorithm that the decoder uses to find $\hat{T}^\alpha$ in this illustrated implementation of the invention. The algorithm is a modification of the standard A* search used for finding the shortest path between a goal node and a start node in a directed graph. In the instant case, the directed graph represents a graph of possible parse trees, and the shortest path sought is the path that is the most likely representation of the input training image. The modification consists of adding a heuristic component that provides an estimated completion distance that may be used to evaluate the most likely shortest path available from among many alternative paths to select. The use of some type of heuristic search in combination with a context-free grammar to achieve fast parsing of the grammar is known in the art, but known techniques have not previously been carried out in the domain of image representations, where a very high level of ambiguity in the grammar is required to adequately represent a wide variety of document layout structures. In the case of the stochastic context-free grammar used in this illustrated implementation, many decorated parse tree representations of a training image are possible, and the decoder must be able to efficiently find the most likely one. The modified A* search described herein has been developed in a rigorous manner that permits a proof of its ability to find the optimal parse tree.

Briefly reviewing some terminology before proceeding, a graph consists of a set of nodes N and a set of directed edges E connecting pairs of nodes. An edge e going from node n to n' is denoted (n, n'). A graph has two distinguished nodes: the start node s and the target, or goal, node t. If there is an edge from n to n' then n' is said to be a successor of n and n is said to be the parent of n'. Every edge e∈E has associated with it a real number d(e) referred to as the length of edge e. A path from node $n_1$ to node $n_k$ is a sequence of nodes $n_1$, $n_2$, $n_3$, ..., $n_k$ such that $n_{i+1}$ is a successor of $n_i$ for every $1 \leq i < k$. The length of a path is the sum of the lengths of the edges in the path. The shortest path from n to n' is the path from n to n' that has minimum length. A shortest path problem consists of finding the shortest path from the start node s to the target node t. A standard algorithm for finding the shortest path in a directed graph is called the "best first" algorithm. The A* search algorithm is a modification of the best first algorithm. Additional information on the A* search algorithm may be found in computer science books and texts including J. Pearl, *Heuristics: Intelligent Search Strategies for Computer Problem Solving*, Addison-Wesley, Reading, Mass., 1984 and in P. H. Winston, *Artificial Intelligence*, Addison-Wesley, Reading, Mass., 1992.

The algorithm used to build the decoder in the illustrated implementation is a modified version of the A* search algorithm that uses a heuristic completion estimate to aid in determining which path to follow to reach the goal node. Both the standard (unmodified) A* search algorithm and the modified algorithm used herein each keeps two lists of nodes during processing: the first list is called the OPEN list and consists of nodes that have been reached but whose successors have not yet been explored. The second, called CLOSED, consists of all nodes that have been reached and whose successors have been explored. The standard (unmodified) A* search algorithm manages the sorting of the nodes on the OPEN list by calculating a function for each node, $$f(n) = d(s, n) + \text{est}(n, t)$$

that includes a distance score d(s, n) from the start node s to n plus an estimated distance est(n, t) from n to the target node, where the estimated distance between n and the target node on a planar graph is just the Cartesian distance between them.

Figure 14:
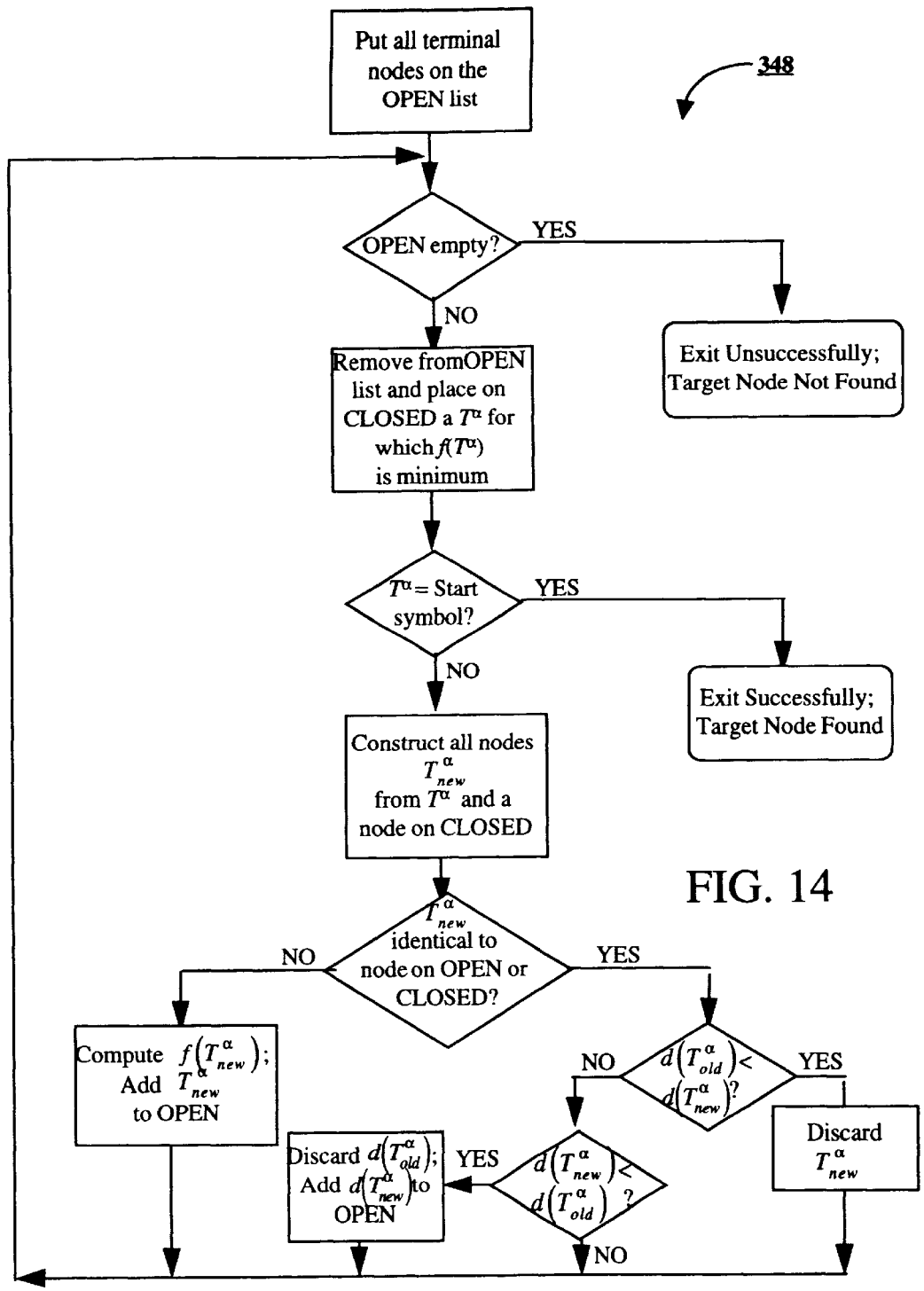
FIG. 14 is a flow chart illustrating the implementation of the decoder that produces an annotated parse tree according to an illustrated implementation of the present invention.

In this illustrated implementation of the training technique, the decoder implements a modified A* search as shown in Table 1 and in FIG. 14.

TABLE 1

Modified A* Search Algorithm for Image Recognition

1. Put all of the terminal nodes on OPEN.
2. If OPEN is empty, exit with failure.
3. Remove from OPEN and place on CLOSED a $T^\alpha$ for which $f(T^\alpha)$ is minimum.
4. If $T^\alpha$ is the start symbol and describes the whole image, exit successfully with the solution obtained by constructing M from $T^\alpha$.
5. Otherwise construct all nodes $T_{new}^\alpha$ that can be generated from $T^\alpha$ and a node on CLOSED using a rule in the grammar. For every new generated node $T_{new}^\alpha$,
   (a) If $T_{new}^\alpha$ is not already on OPEN or CLOSED, calculate $f(T_{new}^\alpha)$ and add $T_{new}^\alpha$ to OPEN.
   (b) If $T_{new}^\alpha$ is identical to a node $T_{old}^\alpha$ already on OPEN or CLOSED, then
      i. if $d(T_{old}^\alpha)$ is less than $d(T_{new}^\alpha)$ discard $T_{new}^\alpha$
      ii. if $d(T_{new}^\alpha)$ is less than $d(T_{old}^\alpha)$ discard $T_{old}^\alpha$ and add $T_{new}^\alpha$ to OPEN.
6. Go to step 2.

In the decoder, distance $d(t^\alpha)$ is defined as the negative log likelihood of a decorated parse tree $T^\alpha$ given by $$d(T^\alpha) = -\log(P(O, I(T^\alpha))) \quad (21)$$

while the heuristic function is defined as $$f(T^\alpha) = d(T^\alpha) + \text{est}(T^\alpha) \quad (22)$$

where est($T^\alpha$) is the heuristic completion estimate. In Step 1 of the algorithm in Table 1, $d(T^\alpha)$ and therefore $f(T^\alpha)$ can be calculated for all of the terminal nodes because by Equations (20) and (21)

$$d(T^\alpha) = -\log(P(O, I(c))) \quad (23)$$

where c is the character that $T^\alpha$ represents. In step 5, $d(T_{new}^\alpha)$ can be calculated because, again by Equations (20) and (21), $$d(T_{new}^\alpha) = d(T^\alpha) + d(T_{closed}^\alpha) - \log((p(r_i)p_E(r_i)p_C(O)),$$

where $T_{closed}^\alpha$ is the node from CLOSED used to create $T_{new}^\alpha$. Note that in the illustrated implementation, two parse trees are defined to be identical when the box metrics of their root nodes are the same. Other definitions of identical are possible and may be more appropriate for a particular grammar.

iii. The Heuristic Completion Estimate.

The heuristic completion estimate est must be an optimistic estimate of the distance to completion. As noted earlier, in the context of image recognition, distance is the negative log likelihood of parse tree $T^\alpha$. Therefore, if $T^\alpha$ is a completed parse tree and $T_1^\alpha$ is a subtree, then the constraint that est must be an optimistic estimate of the distance to completion means that, when constructing an est function, one should be able to estimate the probability of the observed image O given the ideal image as represented by $T^\alpha$ based on pixel counts in the observed image represented by subtree $T_1^\alpha$. This notion can be expressed as follows:

$$est(T_1^\alpha) \leq -\log \frac{P(O, I(T^\alpha))}{P(O, I_1(T_1^\alpha))}. \tag{24}$$

Let $O_1$ be the portion of observed image O defined to have the same bounding box as the ideal image $I_1$ represented by $T_1^\alpha$, and let $\bar{I}=I-I_1$ and $\bar{O}=O-O_1$. It can be shown that a valid estimator is given by $$est(T_1^\alpha) = -\log((1-\epsilon_0)^{white(\bar{O}_1)}(1-\epsilon_1)^{black(\bar{O}_1)}). \tag{25}$$

where, as noted in the discussion of the channel model above, $\epsilon_0$ is the probability of a white bit flipping to black in the ideal image, $\epsilon_1$ is the probability of a black bit flipping to white in the ideal image, while white($\bar{O}$) is the number of white points in $\bar{O}$ and black($\bar{O}$) is the number of black points in $\bar{O}$. For additional details of the development of this estimator function, see Section 3.4.1 of the Hull reference cited earlier. An actual implementation of the decoder using this est function confirms that the function improves the performance of the decoder during alignment (and recognition as well) without negatively affecting the accuracy of the decoder. See Chapter 7 of the Hull reference for the reported results of an implementation of the decoder used to train layout parameters for a 2D image grammar that models images containing complex equations.

See the Miscellaneous Features section below for information on ways in which the performance of the decoder in this illustrated implementation can be improved.

c. The Alignment Process.

When the 2D image grammar is fully specified (i.e., all parameters are trained), the decoder just described is the central part of a recognition operation that has as its goal to find the message string $\hat{M}$ that maximizes the posterior probability of the message $\hat{M}$ given the image O; that is, the goal of the decoder in recognition is to maximize $P(\hat{M}|O)$. The message string $\hat{M}$ is the most likely message contained in the input image being recognized. The decoder produces $\hat{M}$ by using the 2D image grammar to produce the most likely parse tree that corresponds to the input image, a process also called alignment of the image with the grammar. In the context of the stochastic attribute grammar of this illustrated environment, as shown in operation 330 of FIG. 4, the annotated parse tree $T^\alpha$ is the most likely representation of an input training image, and $\hat{M}$ is available from $T^\alpha$. The alignment process produces a parse tree that essentially identifies the location and label of the image constituents in an input text image. The box metrics of an image constituent are then available from this path, and the synthesis and inheritance functions are then used to compute the synthesized and inherited attributes at all nodes to produce the annotated parse tree $T^\alpha$.

When the parameters of the synthesis and inheritance functions in the layout grammar are not fully trained, the alignment produced by the decoder is at best likely to be inefficiently performed and at worst is likely to be unsuccessful. Therefore, the alignment operation in the context of training layout parameters is a simplification of a recognition operation in which the decoder described above uses a restricted form of the 2D layout grammar that is only capable of parsing the input training image. This significantly reduces the number of paths the decoder must investigate during the decoding process. The process of decoding the training image aligns this restricted, or constrained, 2D layout grammar with the training image to produce the annotated parse tree $T^\alpha$. Because of the significantly fewer paths it must consider, the decoder can perform alignment with a higher degree of accuracy using the restricted 2D layout grammar, even when the restricted grammar itself is poorly specified (untrained), than it can perform recognition with the general, or unrestricted, and untrained 2D layout grammar. The characteristic flexibility of having the image model in the form of the layout grammar as an explicit input to a general purpose decoder allows the layout grammar to be modified to produce the desired output data structure needed for training purposes without modification to the decoder itself.

Figure 15:
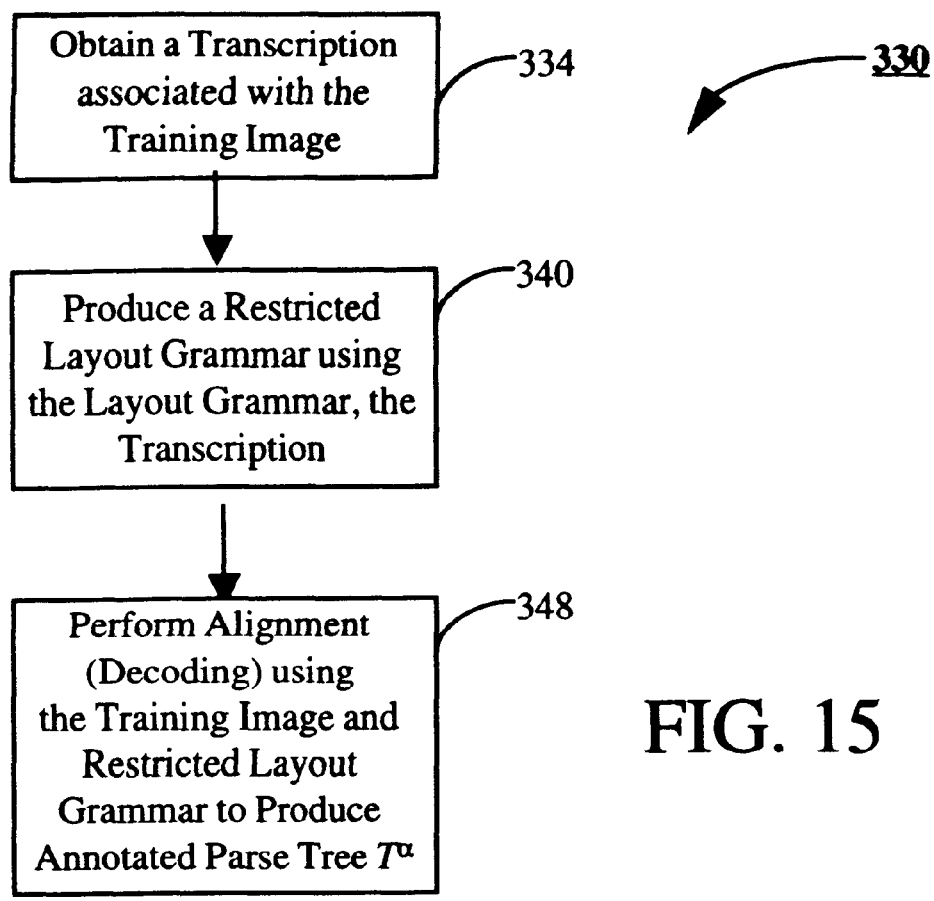
FIG. 15 is a flow chart further illustrating the operation of a portion of the decoder illustrated in FIG. 14.

A restricted 2D layout grammar in the context of training layout parameters is a version of the 2D layout grammar that is only capable of parsing the training image to produce its message content. The restricted 2D layout grammar may be produced in a number of different ways, all of which typically involve using a transcription associated with the training image. Thus operation 330 of FIG. 4 is broadly comprised of the three operations shown in FIG. 15. One method for constructing the restricted layout grammar using the transcription, in box 340 of FIG. 15, proceeds as follows. First, the set of all transcription strings is described using a context-free grammar. Then, an automatic transcription parser parses the transcription string. The transcription parser produces the restricted grammar file, in Chomsky normal form, from the parsed transcription string by outputting one or two rules for each node in the parse tree.

In a supervised mode of training, a transcription of the training image is explicitly provided as an input to the training operation, and the restricted 2D layout grammar used for alignment is straightforward to produce according to the method suggested above. In an unsupervised mode of training, the transcription of the training image is not provided; producing the restricted layout grammar then essentially requires a level of recognition of the training image that may require several iterations of decoding (alignment) before sufficiently accurate transcription information is available from the annotated parse tree.

4. Computing Values for the Layout Parameters From the Training Data.

a. Theoretical Basis for Computing Layout Parameter Values.

As noted earlier, the goal of recognition is to maximize $P(\hat{M}|O)$. The goal the training operation is to find the set of parameters in the model that maximize $P(\hat{M}, O)$ for a given M and O, where M is the transcription associated with a given input observed image O. This set of parameters is the maximum likelihood estimate. In particular, for multiple training examples, the maximum likelihood estimate is $$\underset{\text{Model Parameters}}{\arg\max} \prod_i P(\hat{M}_i, O_i), \qquad (26)$$

where the index i ranges over the training examples. The joint probability P(M, O) is given by $$P(M, O) = \sum_I P(M) P(I|M) P(O|I). \qquad (27)$$

Combining Equations (26) and (27) gives $$\underset{\text{Model Parameters}}{\arg\max} \prod_i P(\hat{M}_i, O_i) = \qquad (28)$$

$$\underset{\text{Model Parameters}}{\arg\max} \prod_i \left( \sum_I P(M_i) P(I|M_i) P(O_i|I) \right),$$

and $\Sigma_I P(M_i) P(I|M_i) P(O_i|I)$ is approximated by $P(M_i) P(\hat{I}_i|M_i) P(O_i|\hat{I}_i)$ where $\hat{I}_i$ maximizes $P(M_i) P(I|M_i) P(O_i|I)$. Therefore, Equation (28) becomes $$\underset{\text{Model Parameters}}{\arg\max} \prod_i P(\hat{M}_i, O_i) \approx \qquad (29)$$

$$\underset{\text{Model Parameters}}{\arg\max} \prod_i P(M_i) P(\hat{I}_i|M_i) P(O_i|\hat{I}_i).$$

Since the layout grammar only affects P(I|M), Equation (29) becomes $$\underset{\text{Layout Parameters}}{\arg\max} \prod_i P(\hat{I}_i|M_i) = \underset{\text{Layout Parameters}}{\arg\max} \prod_i \sum_{T_i^\alpha: I(T_i^\alpha) = \hat{I}_i} P(T_i^\alpha|M_i) \qquad (30)$$

$$\approx \underset{\text{Layout Parameters}}{\arg\max} \prod_i \max_{T_i^\alpha: I(T_i^\alpha) = \hat{I}_i} P(T_i^\alpha|M_i)$$

$$= \underset{\text{Layout Parameters}}{\arg\max} \prod_i P(\hat{T}_i^\alpha|M_i),$$

where, as before, $\hat{T}_i^\alpha$ is the $T_i^\alpha$ that maximizes $P(T_i^\alpha|M_i)$ given that $I(T_i^\alpha)=\hat{I}_i$. With reference to Equation (16), the quantity being maximized in Equation (30) is now given by $$\underset{\text{Layout Parameters}}{\arg\max} \prod_i \prod_j p_{E_{ij}}(r_{k_{ij}}), \qquad (31)$$

where $E_{ij}$ is the error transformation observed while applying the jth rule in the message string $M_i$ and $p_{E_{ij}}(r_{k_{ij}})$ is the probability of this error transformation. Furthermore, $p_{E_{ij}}(r)$ has a Gaussian distribution with an assumed unit variance on each of its components. Information on estimating this variance is provided below in the discussion surrounding Equations (45) and (46). Since $p_{E_{ij}}(r)$ is Gaussian, $$\prod_i \prod_j p_{E_{ij}}(r) = \prod_i \prod_j \frac{1}{2\pi^{3/2}} e^{-1/2 E_{ij}^T E_{ij}} \qquad (32)$$

$$= \frac{1}{(2\pi)^{3n/2}} e^{-1/2 \sum_i \sum_j E_{ij}^T E_{ij}},$$

where $E_{ij}^T = [E_{ij}^{shift_x}, E_{ij}^{shift_y}, E_{ij}^{scale}]$. Furthermore, since the only term in Equation (32) affected by the layout model is the error $E_{ij}$, it follows that $$\underset{\text{Layout Parameters}}{\arg\max} \frac{1}{(2\pi)^{\frac{3n}{2}}} e^{-\frac{1}{2}\sum_i \sum_j E_{ij}^T E_{ij}} = \underset{\text{Layout Parameters}}{\arg\min} \sum_i \sum_j E_{ij}^T E_{ij}. \qquad (33)$$

This means that the maximum likelihood estimate of the layout parameters is the set of parameters that minimize the total mean squared error.

Details now follow about how the synthesis functions $T_{21}$, $T_{10}$ and $F_0$ are parameterized and how the values of the parameters are computed. In general, it will be shown in the discussion below that the maximum likelihood estimate of the layout parameters is equivalent to finding the linear least squares solution $\vec{x}$ to an equation of the form $$A\vec{x} = \vec{b} - \epsilon,$$

where A is an m by n matrix, $\vec{x}$ is an n dimensional column vector, $\vec{b}$ is an m dimensional column vector, and $\epsilon$ is an m dimensional column vector whose norm, $\epsilon^T \epsilon$, is being minimized.

b. Training Iterations.

It was noted earlier that it may be desirable to train the parameters in phases, rather than all at one, by only computing some subset of the values of the layout parameters in the synthesized functions while assigning reasonable guesses to the other layout parameters and holding them constant during a training phase. In the illustrated implementation, the training of the layout parameters was done in three phases. First the values for the layout parameters in the $T_{21}$ functions were computed while holding the values for the layout parameters in the $T_{10}$ and $F_0$ functions constant. Next, the values for the layout parameters in the $F_0$ functions were computed while using the previously computed values for the layout parameters in the $T_{21}$ functions and while holding the values of the layout parameters in the $T_{10}$ functions constant. Finally, the values for the layout parameters in the $T_{10}$ functions were computed while using the previously computed values for the layout parameters in the $T_{21}$ and $F_0$ functions. The 2D layout grammar was then used to recognize some test images to evaluate the recognition performance of the model with the computed layout parameters after one iteration of training, and, if recognition performance did not meet an expected accuracy standard, these three training phases were repeated.- c. Defining and Computing Values for the Layout Parameters of the $T_{21}$ Function.

As stated earlier, the $T_{21}$ function for a rule of the form A→BC is a function of the box metrics, $F_B$ and $F_C$, for nodes B and C respectively. In this illustrated implementation of training operation 200 (FIG. 2), the relationship between these nodes, as expressed by the $T_{21}^{shift_x}$, $T_{21}^{shift_y}$ and $T_{21}^{scale}$ component functions is assumed to be linear, and nonlinear layout rules are ignored. The relationship among the component $T_{21}$ functions is defined as follows $$\frac{T_{21}^{shift_x}}{T_{21}^{scale}} = a_0 F_B^{ll_x} + a_1 F_C^{ll_x} + a_2 F_B^{upr_x} + \quad (34)$$
$$a_3 F_C^{upr_x} + a_4 F_B^{end_x} + a_5 F_C^{end_x} + a_6$$

$$\frac{T_{21}^{shift_y}}{T_{21}^{scale}} = b_0 F_B^{ll_y} + b_1 F_C^{ll_y} + b_2 F_B^{upr_y} + \quad (35)$$
$$b_3 F_C^{upr_y} + b_4 F_B^{end_y} + b_5 F_C^{end_y} + b_6$$

$$\log T_{21}^{scale} = c_0, \quad (36)$$

where $a_0, \ldots, a_6, b_0, \ldots, b_6$, and $c_0$, the coefficients of these functions, are the layout parameters for which values are to be computed.

Recall that Equation (15) is the modified version of the $T_{21}$ function specified in Equation (8) and provides that $$\tilde{T}_{21} = T_{21}(F_B, F_C) \cdot E,$$

where $T_{21}$ and $\tilde{T}_{21}$ are the predicted and observed $T_{21}$ transformations, respectively. Solving for E gives $$E = (T_{21})^{-1} \cdot \tilde{T}_{21}. \quad (37)$$

Since the mean squared error of E is being minimized, Equation (37) says that an observation of $\tilde{T}_{21}$ constrains $T_{21}$. That is, when predicting $T_{21}$, an observation of a rule $r_1$ produces $\tilde{T}_{21}$ ($r_1:\tilde{T}_{21}$), placing a restriction on the corresponding $r_1:T_{21}$. Thus, each observation $r_1:\tilde{T}_{21}$ provides an equation for $r_1:T_{21}$. One can collect together all of the equations for each rule $r_1:T_{21}$ and solve them. Collecting together all such equations for each rule in the layout grammar results in a set of equations that look like $$E_1 = (T_{21}^1)^{-1} \cdot \tilde{T}_{21}^1 \quad (38)$$

$$E_2 = (T_{21}^2)^{-1} \cdot \tilde{T}_{21}^2 \quad (39)$$

.
.
.

$$E_n = (T_{21}^n)^{-1} \cdot \tilde{T}_{21}^n \quad (40)$$

where $T_{21}^i$ and $\tilde{T}_{21}^i$ are the predicted and observed $T_{21}$ transformations for the ith use of the rule r in the training data. Similarly, $E_i$ is the observed error transformation for the ith use of the rule r in the training data. Note that this is a change in the notation from the previous notation of $E_{ij}$. With this new notation, for each rule r $$\sum_j E_j^T E_j$$

is being minimized. Letting $$\epsilon^T = [E_1^{shift_x}, E_2^{shift_x}, \ldots, E_n^{shift_x}, E_1^{shift_y}, \ldots, E_n^{shift_y}, E_1^{lscale}, \ldots, E_n^{lscale}],$$

it suffices to minimize $\epsilon^T\epsilon$. Finally, the equations for E in component form are $$E^{shift_x} = \frac{\tilde{T}_{21}^{shift_x} - T_{21}^{shift_x}}{T_{21}^{scale}} \quad (41)$$

$$E^{shift_y} = \frac{\tilde{T}_{21}^{shift_y} - T_{21}^{shift_y}}{T_{21}^{scale}} \quad (42)$$

$$E^{lscale} = \log(\tilde{T}_{21}^{scale}) - \log(T_{21}^{scale}). \quad (43)$$

Combining Equations (34)–(36), Equations (38)–(40) and Equations (41)–(43) gives $$A\vec{x} = \vec{b} - \epsilon \quad (44)$$

where $$A = \begin{bmatrix} {}_1F_B^{ll_x} & {}_1F_C^{ll_x} & {}_1F_B^{upr_x} & {}_1F_C^{upr_x} & {}_1F_B^{end_x} & {}_1F_C^{end_x} & 1 & 0 & 0 & 0 & 0 & 0 & 0 & 00 \\ {}_2F_B^{ll_x} & {}_2F_C^{ll_x} & {}_2F_B^{upr_x} & {}_2F_C^{upr_x} & {}_2F_B^{end_x} & {}_2F_C^{end_x} & 1 & 0 & 0 & 0 & 0 & 0 & 0 & 00 \\ & & & & \vdots & & & & & & & & & \\ {}_nF_B^{ll_x} & {}_nF_C^{ll_x} & {}_nF_B^{upr_x} & {}_nF_C^{upr_x} & {}_nF_B^{end_x} & {}_nF_C^{end_x} & 1 & 0 & 0 & 0 & 0 & 0 & 0 & 00 \\ 0 & 0 & 0 & 0 & 0 & 0 & 0 & {}_1F_B^{ll_y} & {}_1F_C^{ll_y} & {}_1F_B^{upr_y} & {}_1F_C^{upr_y} & {}_1F_B^{end_y} & {}_1F_C^{end_y} & 10 \\ 0 & 0 & 0 & 0 & 0 & 0 & 0 & {}_2F_B^{ll_y} & {}_2F_C^{ll_y} & {}_2F_B^{upr_y} & {}_2F_C^{upr_y} & {}_2F_B^{end_y} & {}_2F_C^{end_y} & 10 \\ & & & & \vdots & & & & & & & & & \\ 0 & 0 & 0 & 0 & 0 & 0 & 0 & {}_nF_B^{ll_y} & {}_nF_C^{ll_y} & {}_nF_B^{upr_y} & {}_nF_C^{upr_y} & {}_nF_B^{end_y} & {}_nF_C^{end_y} & 10 \\ 0 & 0 & 0 & 0 & 0 & 0 & 0 & 0 & 0 & 0 & 0 & 0 & 0 & 01 \\ 0 & 0 & 0 & 0 & 0 & 0 & 0 & 0 & 0 & 0 & 0 & 0 & 0 & 01 \\ & & & & \vdots & & & & & & & & & \\ 0 & 0 & 0 & 0 & 0 & 0 & 0 & 0 & 0 & 0 & 0 & 0 & 0 & 01 \end{bmatrix},$$

$$\vec{x} = \begin{bmatrix} a_0 \\ a_1 \\ a_2 \\ a_3 \\ a_4 \\ a_5 \\ a_6 \\ b_0 \\ b_1 \\ b_2 \\ b_3 \\ b_4 \\ b_5 \\ b_6 \\ c_0 \end{bmatrix}, \text{ and } \vec{b} = \begin{bmatrix} {}_1\tilde{T}_{21}^{shift_x} / {}_1T_{21}^{scale} \\ {}_2\tilde{T}_{21}^{shift_x} / {}_2T_{21}^{scale} \\ \vdots \\ {}_n\tilde{T}_{21}^{shift_x} / {}_nT_{21}^{scale} \\ {}_1\tilde{T}_{21}^{shift_y} / {}_1T_{21}^{scale} \\ {}_2\tilde{T}_{21}^{shift_y} / {}_2T_{21}^{scale} \\ \vdots \\ {}_n\tilde{T}_{21}^{shift_y} / {}_nT_{21}^{scale} \\ \log\left({}_1\tilde{T}_{21}^{scale}\right) \\ \log\left({}_2\tilde{T}_{21}^{scale}\right) \\ \vdots \\ \log\left({}_n\tilde{T}_{21}^{scale}\right) \end{bmatrix}$$

There is one of these equations for each type of layout rule in the grammar, such that one type of $T_{21}$ function is learned for each type of layout rule. The equations are solved iteratively. First the values in $\vec{x}$ are computed and then the values in $\vec{b}$ are computed based on the new value of $\tilde{T}_{21}^{scale}$. The iteration continues until the parameter values stabilize. Note that, because this second level iteration is being carried out inside an overall iteration of computing the parameter values of the $T_{21}$, $F_0$, and then $T_{10}$ function, the values in $\vec{x}$ are computed only once for each overall iteration. A discussion of a technique for solving these equations is discussed below, in the disclosure surrounding Equations (72) and (73).

d. Estimating the Variance of the Error.

Previously it was assumed that E has a Gaussian distribution with unit variance in each component. Here, E is allowed to have an arbitrary 3 by 3 covariance matrix $\Lambda_r$, where $\Lambda_r$ is specific to the rule r. In addition, $\Lambda_r$ shall be estimated based on the training data. Hence, the probability density for E is of the form $$p_E(r) = \frac{1}{2\pi^{3/2}}|\Lambda_r|^{-1/2}e^{-1/2E^T\Lambda_r^{-1}E}, \quad (45)$$

where $\Lambda_r$ is the covariance matrix for the rule r. Note that the maximum likelihood estimate in this more general case is still given by the linear least squares solution to Equation (44). The maximum likelihood estimate of $\Lambda_r$ is given by $$\Lambda_r = VV^T, \quad (46)$$

where $$V = \begin{bmatrix} E_1^{shift_x} & E_2^{shift_x} & \ldots & E_n^{shift_x} \\ E_1^{shift_y} & E_2^{shift_y} & \ldots & E_n^{shift_y} \\ \log(E_1^{scale}) & \log(E_2^{scale}) & \ldots & \log(E_n^{scale}) \end{bmatrix}$$

e. Defining and Computing Values for the Layout Parameters of the $F_0$ Function.

The $F_0$ function for a rule of the form A→BC or A→B is the function that computes the box metrics for the internal node A. Refer to the discussion above for the complete definition of the $F_0$ function. Since the first two vectors of the box metrics of any node are simply the lower left and upper right coordinates for that node, these two vectors are always calculated in the same manner and the $F_0$ function needs only to calculate the end point of the bounding box of the node. Therefore, the $F_0$ function is parameterized as $$F_0^{end_x} = d_0\bar{F}_B^{ll_x} + d_1\bar{F}_C^{ll_x} + d_2\bar{F}_B^{upr_x} + d_3\bar{F}_C^{upr_x} + d_4 \quad (47)$$

$$F_0^{end_y} = e_0\bar{F}_B^{ll_y} + e_1\bar{F}_C^{ll_y} + e_2\bar{F}_B^{upr_y} + e_3\bar{F}_C^{upr_y} + e_4. \quad (48)$$

For rules of the form A→B, the $F_0$ function should, in principle, be a linear function of all of the components of $\bar{F}_B$. However, in practice, the $F_0$ function for rules of the form A→B is usually $$F_0^{end_x} = \bar{F}_B^{end_x} \quad (49)$$

$$F_0^{end_y} = \bar{F}_B^{end_y} \quad (50)$$

The one exception to this rule occurs when B is a terminal symbol and the font metrics (namely $end_x$ and $end_y$) of terminal symbol B are not known. Thus, in this illustrated implementation of the 2D layout grammar, the $F_0$ functions for the rules of the form A→B are only parameterized when B is a terminal symbol, and take the form of $$F_0^{end_x} = d_0 \quad (51)$$

$$F_0^{end_y} = e_0. \quad (52)$$

In effect, this constitutes learning the end point of the font metrics for terminal symbol B.

Computing the values of the parameters in the $F_0$ functions is more complex than the computation required for the parameters in the $T_{21}$ functions because the parameter values in the $F_0$ functions, unlike the $T_{21}$ functions, cannot be computed on a rule-by-rule basis. The same is true for the $T_{10}$ functions. The reasons for this are as follows. In the phased approach to training the layout parameters, it is assumed that the layout parameter values just computed for the $T_{21}$ functions in a prior phase are held constant when computing the values for the parameters in the $F_0$ and the $T_{10}$ functions. The consequence of this is that the only way to reduce the mean square error is to change the arguments to the $T_{21}$ function. FIG. 8 shows that the inputs to the $T_{21}$ function are the box metrics of nodes B and C denoted as $F_B$ and $F_C$ respectively. The $F_B$ and $F_C$ box metrics are themselves computed by their respective synthesis functions associated with these nodes for other rules, say $r_2$ and $r_3$. In particular, the values of the box metrics $F_B$ and $F_C$ of nodes B and C are determined by the layout functions $r_2{:}F_0$, $r_2{:}T_{10}$, $r_3{:}F_0$, and $r_3{:}T_{10}$. Therefore, the constraint that $E^T E$ must be minimized introduces an equation involving the layout functions for both rules $r_2$ and $r_3$. This in turn means that there is one large linear least squares problem where all the parameters of every $F_0$ function (and later every $T_{10}$ function) are solved for simultaneously.

It is assumed that the $F_0$ function for rules of the form A→B is given by Equations (49) and (50) unless B is a terminal symbol. When this is true, the training of the values of the layout parameters in the $F_0$ function involve four distinct cases of node relationships, as shown in FIGS. 16(a) through 16(d). Note that, in these figures, and in the equations for computing the $F_0$ function that follow, the notation of a rule A→BC is changed to $A_1 \rightarrow A_2 A_3$. In the case 80 shown in FIG. 16(a), both of the children nodes 83 and 84 of node 82 are binary nodes. In cases 86 and 88 in FIGS. 16(b) and 16(c), one child node of parent node 82 is a terminal node, and in case 90 in FIG. 16(d) both children nodes are terminal nodes. Since the $F_0$ function for a terminal node is parameterized differently, each of these cases is handled differently.

Figure 16A:
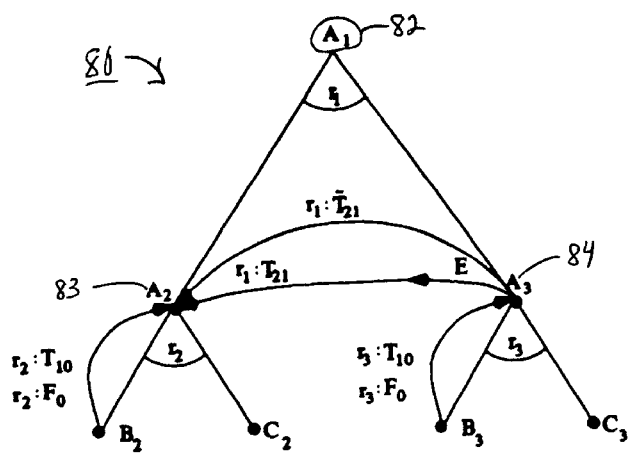
FIGS. 16(a), 16(b), 16(c), and 16(d) show four different configurations of nodes in a partial parse tree, each of which requires special consideration when defining parameters for their respective synthesis functions.
Figure 16C:
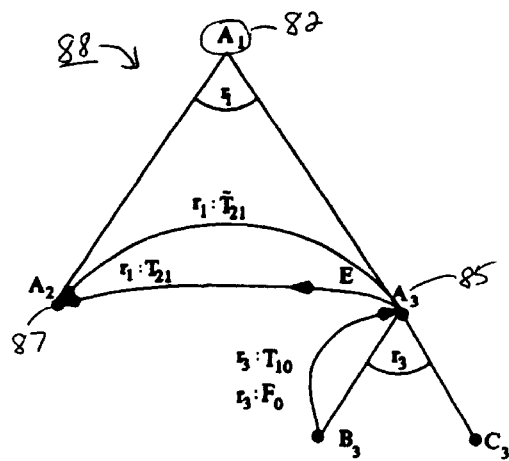
Figure 16B:
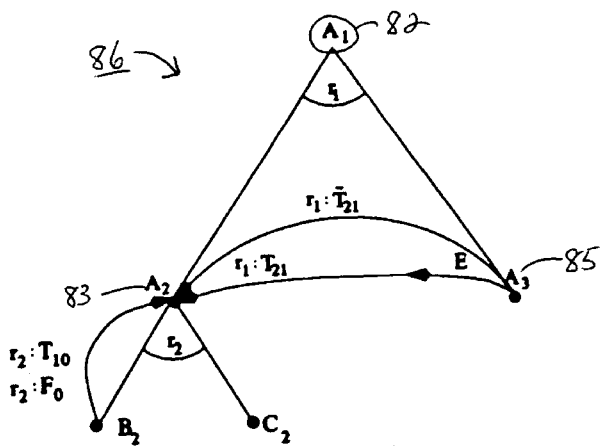
Figure 16D:
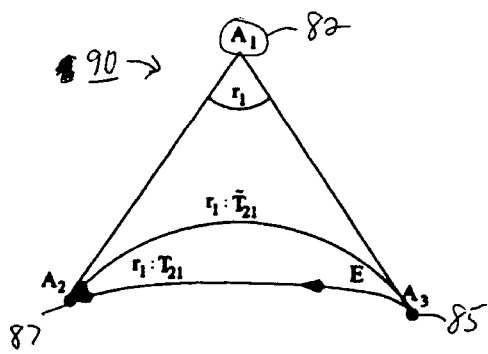

With reference to case 90 in FIG. 16(d), the parameterization of both $r_2{:}F_0^{end_x}$ and $r_3{:}F_0^{end_x}$ are described by Equation (51). Hence, there are now two $d_0$ coefficients which shall be distinguished as $d_0^{r_2}$ and $d_0^{r_3}$. Combining Equations (34) and (51) gives $$\frac{T_{21}^{shift_x}}{T_{21}^{scale}} = a_0 F_{A_2}^{ll_x} + a_1 F_{A_3}^{ll_x} + a_2 F_{A_2}^{upr_x} + a_3 F_{A_3}^{upr_x} + a_6 + a_4 d_0^{r_2} + a_5 d_0^{r_3}. \tag{53}$$

Note that only the terms for $F_{A_2}^{end_x}$ and $F_{A_3}^{end_x}$ have changed from Equation (34). Collecting together all the constant terms in Equation (53) and combining them with Equation (38) while keeping the $T_{21}$ coefficients $a_0, \ldots, a_6$ constant gives $$K-E^{shift_x} = d_0^{r_2} a_4 + d_0^{r_3} a_5, \tag{54}$$

where $$K = \frac{\tilde{T}_{21}^{shift_x}}{T_{21}^{scale}} - a_0 F_{A_2}^{ll_x} - a_1 F_{A_3}^{ll_x} - a_2 F_{A_2}^{upr_x} - a_3 F_{A_3}^{upr_x} - a_6. \tag{55}$$

Cases 86 and 88 in FIGS. 16(b) and 16(c) are symmetrical. The discussion that follows with respect to case 86 of FIG. 16(b) is equally applicable to case 88 of FIG. 16(c). In FIG. 16(b), node 85 ($A_3$) is a terminal node and the parameterization of $r_3{:}F_0^{end_x}$ is again described by Equation (51). However, node 83 ($A_2$) is a binary node and $r_2{:}F_0^{end_x}$ is given by Equation (47). Therefore, the equivalent of Equation (53) for case 90 of FIG. 16(d) for case 86 of FIG. 16(b) is obtained by combining Equations (34), (47) and (51), yielding $$\frac{T_{21}^{shift_x}}{T_{21}^{scale}} = a_0 F_{A_2}^{ll_x} + a_1 F_{A_3}^{ll_x} + a_2 F_{A_2}^{upr_x} + a_3 F_{A_3}^{upr_x} + a_6 + \tag{56}$$

$$a_4 \left[ \begin{array}{c} d_0^{r_2} F_{B_2}^{ll_x} + d_1^{r_2} F_{C_2}^{ll_x} + d_2^{r_2} F_{B_2}^{upr_x} + \\ d_3^{r_2} F_{C_2}^{upr_x} + d_4^{r_2} \end{array} \right] +$$

$$a_5 d_0^{r_3}.$$

As in the previous case (FIG. 16(d)), Equation (56) is combined with Equation (38), giving $$K-E^{shift_x} = d_0^{r_2}(\bar{F}_{B_2}^{ll_x} a_4) + d_1^{r_2}(\bar{F}_{C_2}^{ll_x} a_4) +$$

$$d_2^{r_2}(\bar{F}_{B_2}^{upr_x} a_4) + d_3^{r_2}(\bar{F}_{C_2}^{upr_x} a_4) + d_4^{r_2} a_4 + d_0^{r_3} a_5, \tag{57}$$

where K is defined by Equation (55).

Case 80 illustrated in FIG. 16(a) is similar to cases 86 and 88 in FIGS. 16(b) and 16(c), except that both nodes 83 and 84 are nonterminals. Thus, both $r_2{:}F_0^{end_x}$ and $r_3{:}F_0^{end_x}$ are parameterized by Equation (47). Thus, the equivalent of Equations (53) and (56) for case 80 of FIG. 16(a) is $$\frac{T_{21}^{shift_x}}{T_{21}^{scale}} = a_0 F_{A_2}^{ll_x} + a_1 F_{A_3}^{ll_x} + a_2 F_{A_2}^{upr_x} + a_3 F_{A_3}^{upr_x} + a_6 + \tag{58}$$

$$a_4 \left[ \begin{array}{c} d_0^{r_2} F_{B_2}^{ll_x} + d_1^{r_2} F_{C_2}^{ll_x} + d_2^{r_2} F_{B_2}^{upr_x} + \\ d_3^{r_2} F_{C_2}^{upr_x} + d_4^{r_2} \end{array} \right] +$$

$$a_5 \left[ \begin{array}{c} d_0^{r_3} F_{B_3}^{ll_x} + d_1^{r_3} F_{C_3}^{ll_x} + d_2^{r_3} F_{B_3}^{upr_x} + \\ d_3^{r_3} F_{C_3}^{upr_x} + d_4^{r_3} \end{array} \right],$$

and the equation for case 80 that is analogous to Equations (54) and (57) in case 90 and cases 86 and 88 respectively is $$K-E^{shift_x} = d_0^{r_2}(\bar{F}_{B_2}^{ll_x} a_4) + d_1^{r_2}(\bar{F}_{C_2}^{ll_x} a_4) +$$

$$d_2^{r_2}(\bar{F}_{B_2}^{upr_x} a_4) + d_3^{r_2}(\bar{F}_{C_2}^{upr_x} a_4) +$$

$$d_4^{r_2} a_4 + d_0^{r_3}(\bar{F}_{B_3}^{ll_x} a_5) + d_1^{r_3}(\bar{F}_{C_3}^{ll_x} a_5) +$$

$$d_2^{r_2}(\bar{F}_{B_3}^{upr_x} a_5) + d_3^{r_2}(\bar{F}_{C_3}^{upr_x} a_5) + +d_4^{r_3} a_5, \tag{59}$$

where $$K = \frac{\tilde{T}_{21}^{shift_x}}{T_{21}^{scale}} - a_0 F_{A_2}^{ll_x} - a_1 F_{A_3}^{ll_x} - a_2 F_{A_2}^{upr_x} - a_3 F_{A_3}^{upr_x} - a_6. \tag{60}$$

In all four cases the equations involving $e_0^{r_2}, \ldots, e_4^{r_2}$, $e_0^{r_3}, \ldots, e_4^{r_3}$ correspond exactly to those for $d_0^{r_2}, \ldots, d_4^{r_2}$, $d_0^{r_3}, \ldots, d_4^{r_3}$ except that all x-component terms are replaced by equivalent y-component terms.

Collecting together all the equations that represent all four cases 80, 86, 88 and 90 in FIGS. 16(a)–(d) gives one large system of linear equations. This linear system resembles $$\begin{bmatrix} *** & \cdots & * & \cdots & \cdots & \cdots \\ \cdots & \cdots & *** & \cdots & * & \cdots \\ \cdots & * & \cdots & \cdots & \cdots & ***** \\ & & \vdots & & & \\ \cdots & * & \cdots & \cdots & * & \cdots \end{bmatrix} \begin{bmatrix} d_0^{r1} \\ \vdots \\ d_4^{r1} \\ d_0^{r2} \\ d_0^{r3} \\ \vdots \\ d_0^{rn} \\ \vdots \\ d_4^{rn} \end{bmatrix} = \vec{K} - \varepsilon, \quad (61)$$

where * represents nonzero terms and $\vec{K}$ is the vector of constant terms. The $F_0$ functions are parameterized with either one coefficient $d_0$ or with five coefficients $d_0, \ldots, d_4$. Therefore, each row of the matrix in Equation (61) either has two non-zero terms (case 90), six nonzero terms (cases 86 and 88) or has ten nonzero terms (case 80). There is a similar system of linear equations for the $e_0, \ldots, e_4$ coefficients.

f. Defining and Computing Values for the Layout Parameters of the $T_{10}$ Function.

As stated earlier and as illustrated in FIG. 9, the $T_{10}$ function for a rule of the form A→BC or A→B is a coordinate transformation from the coordinate system of B to the coordinate system of A. When the rule is of the form A→B this function depends only on the box metrics of B. However, when the rule is of the form A→BC, this function depends on the box metrics of B and C ($F_B$ and $F_C$) as well as on $T_{21}$, the transformation between them. In expressing the relationship among the component $T_{10}$ functions for rules of the form A→BC, the dependence on $T_{21}$ and $F_C$ is made implicit by using only $\hat{F}_C = T_{21} \cdot F_C$ in the expression for the $T_{10}$ function. The relationship among the component $T_{10}$ functions for rules of the form A→BC is expressed as $$T_{10}^{shift_x} = f_0 F_B^{ll_x} + f_1 \hat{F}_C^{ll_x} + f_2 F_B^{upr_x} + f_3 \hat{F}_C^{upr_x} + f_4 F_B^{end_x} + f_5 \hat{F}_C^{end_x} + f_6 \quad (62)$$

$$T_{10}^{shift_y} = h_0 F_B^{ll_y} + h_1 \hat{F}_C^{ll_y} + h_2 F_B^{upr_y} + h_3 \hat{F}_C^{upr_y} + h_4 F_B^{end_y} + h_5 \hat{F}_C^{end_y} + h_6 \quad (63)$$

$$\log T_{10}^{scale} = j_0, \quad (64)$$

The parameterization of the $T_{10}$ function for rules of the form A→B should, in principle, depend only on the box metrics of B ($F_B$). However, for purposes of this illustrated implementation of the layout parameter training operation, the $T_{10}$ function for rules of the form A→B is the identity transformation, except when B is a terminal node. When B is a terminal node, the $T_{10}$ function for rules of the form A→B determines the origin and font size of the character that B represents, and the relationship among the component $T_{10}$ functions is expressed as $$T_{10}^{shift_x} = f_0 \quad (65)$$

$$T_{10}^{shift_y} = h_0 \quad (66)$$

$$\log T_{10}^{scale} = j_0. \quad (67)$$

As with the $F_0$ function, computing the values for the layout parameters of the $T_{10}$ function associated with terminal nodes differs from computing the values for the parameters of the $T_{10}$ function associated with binary nodes, and the same four cases illustrated in FIGS. 16(a)–(d) arise. Explanation for case 86 (FIG. 16(b)) will be provided here; the other cases follow straightforwardly from this, and from the previous disclosure.

The goal of the process for computing the values for the layout parameters of the $T_{10}$ function is again to minimize the mean squared error of Equation (56), except that, for the $T_{10}$ function, the following expressions are substituted for the terms in Equation (56):

$$F_{A_2}^{ll_x} = T_{10}^{scale} \min(F_{B_2}^{ll_x}, \hat{F}_{C_2}^{ll_x}) + T_{10}^{shift_x} \quad (68)$$

$$F_{A_2}^{upr_x} = T_{10}^{scale} \max(F_{B_2}^{upr_x}, \hat{F}_{C_2}^{upr_x}) + T_{10}^{shift_x} \quad (69)$$

$$\overline{F}_{B_2} = T_{10} \cdot F_{B_2} \quad (70)$$

$$\overline{F}_{C_2} = T_{10} \cdot \hat{F}_{C_2}. \quad (71)$$

There is a similar set of equations for $F_{A_3}^{ll_x}$, $F_{A_3}^{upr_x}$, $\overline{F}_{B_3}$, and $\overline{F}_{C_3}$ that are not provided here. Combining Equations (56) and (57), Equations (62)–(64), Equations (65)–(67) and Equations (68)–(71) yields $$K_1 - E = f_0^{r2}(F_{B_2}^{ll_x} K_2) + f_1^{r2}(F_{C_2}^{ll_x} K_2) +$$

$$f_2^{r2}(F_{B_2}^{upr_x} K_2) + f_3^{r2}(F_{C_2}^{upr_x} K_2) + f_4^{r2}(F_{B_2}^{end_x} K_2) + f_5^{r2}(F_{C_2}^{end_x} K_2) +$$

$$f_6^{r2}(K_2) + f_0^{r3}(K_3) + j_0^{r2}(K_4) + j_0^{r3}(K_5)$$

where $$K_1 = \frac{\tilde{T}_{21}^{shift_x}}{T_{21}^{scale}} - a_4 d_4^{r2} + a_5 d_0^{r3} - a_6$$

$$K_2 = a_0 + a_2 + a_4(d_0^{r2} + d_1^{r2} + d_2^{r2} + d_3^{r2})$$

$$K_3 = a_1 + a_3$$

$$K_4 = a_0 \min(F_{B_2}^{ll_x}, \hat{F}_{C_2}^{ll_x}) + a_2 \max(F_{B_2}^{upr_x}, \hat{F}_{C_2}^{upr_x}) + a_4(d_0^{r2} F_{B_2}^{ll_x} + d_1^{r2} \hat{F}_{C_2}^{ll_x} + d_2^{r2} F_{B_2}^{upr_x} + d_3^{r2} \hat{F}_{C_2}^{upr_x})$$

$$K_5 = a_1 \min(F_{B_3}^{ll_x}, \hat{F}_{C_3}^{ll_x}) + a_3 \max(F_{B_3}^{upr_x}, \hat{F}_{C_3}^{upr_x})$$

The equations for the y-components $h_0, \ldots, h_6$ are similar. Collecting together all the equations of the above form, there is once again a system of linear equations for which the linear least squares solution is found. The main difference between this case and the $F_0$ case is that the x-coefficients $f_0, \ldots, f_6$ and the y-coefficients $h_0, \ldots, h_6$ can no longer be solved for independently because they both involve the scale term $j_0$.

g. Least Squares Technique for Solving the Collected Equations.

Finding the linear least squares solution $\vec{x}$ to Equation (44) is complicated by the fact that $\vec{x}$ is often both overdetermined—that is, there are more equations than unknowns—and underdetermined—that is, the rows of the m by n matrix A are not linearly independent. The fact that $\vec{x}$ is overdetermined means that the $\epsilon^T \epsilon$ term will not be zero. However, if $\vec{x}$ is underdetermined, namely matrix A is singular, then there is more than one solution for $\vec{x}$ that will minimize $\epsilon^T \epsilon$. In this case one particular member of the solution set is chosen, namely the $\vec{x}$ with minimal norm $|\vec{x}|$. This $\vec{x}$ is found by using the singular value decomposition (SVD) of A. Any m by n matrix A can be decomposed into the form $$A = UDV^T,$$

where D is an n by n diagonal matrix, and U and V are m by n and n by n matrices, respectively. Furthermore, U and V satisfy $$U^T U = V^T V = I.$$

Let $w_i$ be the ith diagonal element of D. If m=n and if A is non-singular, then $$A^{-1} = V[\text{diag}(1/w_i)]U^T.$$

Hence, $$\vec{x} = A^{-1}\vec{b} = V[\text{diag}(1/w_i)]U^T\vec{b}. \quad (72)$$

Furthermore, it turns out that when m≠n then Equation (72) gives the linear least squares estimate of $\vec{x}$. If A is singular, then Equation (72) is no longer meaningful because there will be at least one $w_i$ that equals zero. However, with one slight modification it produces the $\vec{x}$ desired, namely $$\vec{x} = V\left[\text{diag}\begin{pmatrix} 0 & \text{if } w_i = 0 \\ 1/w_i & \text{otherwise} \end{pmatrix}\right] U^T\vec{b}. \quad (73)$$

Equation (73) is the expression used to calculate the linear least squares estimate of $\vec{x}$.

D. Two Training Examples
1. Training a Layout Parameter in a Text Image.

In this first example, a 2D image model in the form of a stochastic context free attribute grammar is defined for papers in a conference proceedings having the layout of text image 22 shown in FIG. 17. The text image layout parameter that defines the spatial relationship between consecutively positioned author blocks 423 and 424 is trained according to the training operation 300 (FIG. 4) of the illustrated implementation of the present operation.

Each document in the conference proceedings has a title, an author block, and a body. A portion of the 2D image grammar that models this layout is defined in Table 2:

TABLE 2

| 2D Image Grammar Example (fragment) | | | |
|---|---|---|---|
| <Doc> → | <title><AuthorsAndBody> | : 1.0 | "<head><title>%1</title></head><body><h1>%1</h1>%2</body>" |
| <AuthorsAndBody> → | <Author List><Body> | : 1.0 | "%1%2" |
| <Author List> → | <Author> | : 0.5 | "</address>%1</address>" |
| <Author List>$_1$ → | <Author List>$_2$ <Author> | : 0.5 | "%1%2" |
| ... | | | |

In this grammar, image constituents are denoted by < >, such as the constituent <Body>, and rules take the form of A→BC and A→B. In the class of documents being modeled, a document comprises a title, an author list, and the document body. The author list is a single author, or a sequence of authors. The synthesized attributes in this grammar, shown on the right side of each rule after the probability, produce hypertext markup language (HTML).

Figure 18:
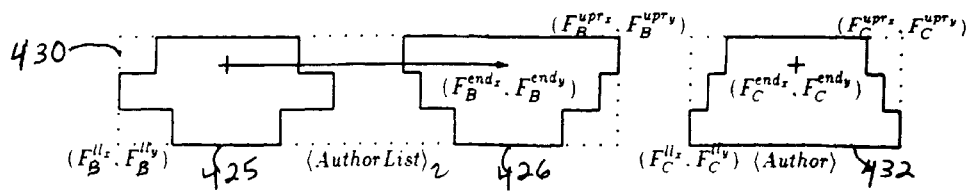
FIG. 18 illustrates the layout rule of image constituents according to a 2D grammar that models a class of journal papers, toward illustrating an example of training layout parameters according to an illustrated implementation of the present invention.

Text blocks 423 and 424 text image 22 shown in FIG. 17 are each an example of the <Author> image constituent of the production rules shown in Table 2, and together they comprise an <Author List>. In particular, the rule <Author List>$_1$→<Author List>$_2$ <Author> states that an Author List is recursively an Author List followed by an Author block. In terms of layout, each Author block is tacked onto the end of an existing Author List. This layout structure is illustrated in FIG. 18, where dotted line outline 430 is the bounding box of an Author List consisting of two Author blocks 425 and 426 followed by Author block 432.

Figure 19A:
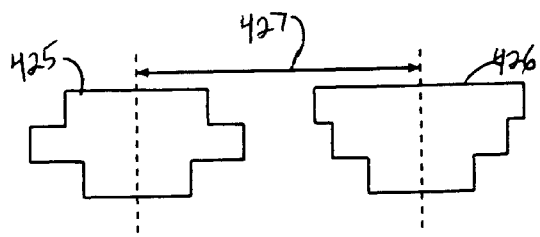
FIGS. 19(a) and 19(b) show two possible layout rules for the image constituents of FIG. 18.
Figure 19B:
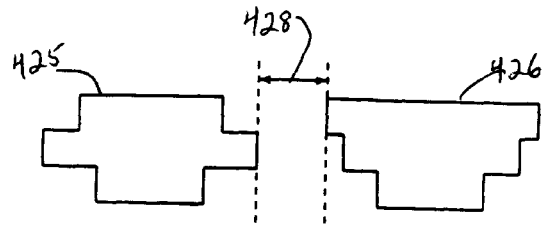
Figure 20:
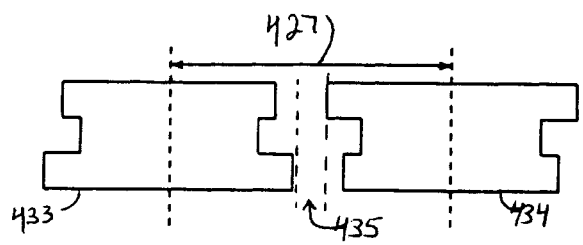
FIG. 20 shows a second pair of image constituents spatially arranged according to the layout rule illustrated in FIG. 19(a)

It isn't entirely clear, from examining the layout of the single example of a paper in the conference proceedings provided by text image 22 shown in FIG. 17, exactly what the layout rule is for blocks in an Author List. FIGS. 19(a) and 19(b) illustrate two possible layout rules given author blocks 425 and 426: a first possible rule is to lay out author blocks 425 and 426 horizontally, as shown in FIG. 19(a), so that their midpoints are separated by a constant distance 27. Another possible rule is to lay out author blocks 425 and 426 horizontally as shown in FIG. 19(b), so that their bounding boxes are separated by constant distance 428. A second example of another image in this class of images, such as the Author List shown in FIG. 20, distinguishes between the two possibilities since it can be seen from two measured distances 427 and 435 between Author blocks 433 and 434 that their midpoints are separated by a constant distance 427, as in the possible layout rule of FIG. 19(a), and their bounding boxes are not separated by constant distance 428, as in the possible layout rule of FIG. 19(b).

For notational simplicity in the discussion that follows, rewrite the rule <Author List>$_1$→<Author List>$_2$ <Author> generically as A→BC. Associated with each image constituent A, B and C are the synthesized and inherited attributes $F_A$, $G_A$, $F_B$, $G_B$, and $F_C$, $G_C$, respectively, where F is a triple of points representing the lower left corner ($F^{ll_x}$, $F^{ll_y}$) of the bounding box, the upper right corner ($F^{upr_x}$, $F^{upr_y}$) of the bounding box, and the endpoint ($F^{end_x}$, $F^{end_y}$) of the constituent, and G is a triple of parameters representing a uniform scaling translation. Of these attributes, $G_A$, $F_B$, and $F_C$ are assumed known; from these known attributes $F_A$, $G_B$, and $G_C$ must be computed by the synthesis function $F_A = \mathcal{F}(F_B, F_C)$ and the inheritance functions $G_A = \mathcal{G}_B(G_A, F_B, F_C)$ and $G_C = \mathcal{G}_C(G_A, F_B, F_C)$, respectively. The functions $\mathcal{F}(F_B, F_C)$, $\mathcal{G}_B(G_A, F_B, F_C)$ and $\mathcal{G}_C(G_A, F_B, F_C)$, are the layout functions for the grammar rule A→BC, and are given by the component functions described earlier. Specifically, the $\mathcal{F}(F_B, F_C)$ function is computed using Equation (15) for the $T_{21}$ function, Equation (9) for the $T_{10}$ function, and Equations (10), (11) and (12) for the $F_0$ function; the $\mathcal{G}_B(G_A, F_B, F_C)$ and $\mathcal{G}_C(G_A, F_B, F_C)$ functions are computed using Equations (13) and (14) for the $G_C$ function. These functions are parameterized using Equations (34), (35) and (36) (the $T_{21}$ function), Equations (47) and (48) (the $F_0$ function), and Equations (62), (63) and (63) (the $T_{10}$ function). The layout parameters of these parameterized functions, i.e., $a_0, \ldots, a_6$, $b_0, \ldots, b_6, c_0, f_0, \ldots, f_6, h_0, \ldots, h_6, j_0, d_0, \ldots, d_6$, and $e_0, \ldots, e_6$ characterize the layout of an author block with respect to a previous sequence of author blocks.

Consider the following two examples of parameter values and their consequences with respect to the layout of author blocks in image 22 (FIG. 17). Assume for purposes of both examples that, after training the parameter values according to the technique shown in FIG. 4 and described in the previous section, the values for $f_0, \ldots, f_6, h_0, \ldots, h_6$, and $j_0$ are all equal to zero. These are the parameters for the $T_{10}$ function, an example of which is illustrated in FIG. 9 and which provides the coordinate transformation of nodes B and C in the coordinate system of B to the coordinate system of A. Parameter values of zero indicate that this is an identity transformation, and that the coordinate system of the Author List (node A) is the same as the coordinate system of its first Author block (node B). Assume further for purposes of both examples that the values for $d_0, \ldots, d_6$ are equal to 0, ½, 0, ½, and 0, respectively, while the values for $e_0, \ldots, e_6$ are all equal to zero. These are the parameters for the $F_0$ function, an example of which is illustrated in FIG. 10 and which computes the box metrics for the combined nodes B and C in the coordinate system of A. These parameter values mean that the horizontal endpoint, $F_0^{end_x}$, of an Author List is equal to the midpoint of its last block, while the vertical endpoint $F_0^{end_y}$ of an Author List is at the origin. Finally, also assume that the values for $b_0, \ldots, b_6$ are all equal to zero. These are the parameters for a component of the $T_{21}$ function, an example of which is illustrated in FIG. 8, and which provides the transformation of node C from its own local coordinate system to the coordinate system of node B. This means that the last Author block of an Author List is not scaled, and is placed on the same horizontal line as the other blocks in the Author List.

With these assumptions in place, consider these two examples of parameter values for the $a_0, \ldots, a_6$ parameters, which are also parameters for a component of the $T_{21}$ function. First, when $$(a_0, \ldots, a_6) = (0, 0, 0, 0, 1, 0, a_6),$$

the distance from the endpoint of the Author List ($F_B^{end_x}$) to the origin of the last Author block is a constant ($a_6$). However, when $$(a_0, \ldots, a_6) = (0, 0, 1, 0, 0, 0, a_6),$$

the distance from the bounding box of the Author List ($F_B^{upr_x}$) to the origin of the last Author block is a constant ($a_6$). Along with the origin of the Author block, which is determined by the $T_{10}$ function in another rule, these two alternatives respectively implement either the constant distance between midpoints of successive author blocks, as shown as distance 428 in FIG. 19(b), or the constant distance between bounding boxes of successive author blocks, shown as distance 427 in FIG. 19(a). With sufficient data collected from training examples of journal papers, the least squares optimization process 370 (FIG. 4) will discover the values of the parameters that fit the examples best, and consequently train the layout functions for the Author List rule from the sample training images.

2. Training Layout Parameters in Images That Contain Equations.

The present invention has been implemented to train layout parameters included in a 2D layout grammar that models images that include equations. Rules in the layout grammar specify the spatial relationships between image constituents in common mathematical situations such as addition, multiplication, division, and exponentiation. The layout function associated with each rule is parameterized as described above to represent the particular spatial relationship between the two image constituents in the rule. For example, for a rule of the form A→BC, consider a rule representing the exponentiation of B by C (i.e., $B^C$); the $T_{21}$ function for might look like the following:

$$T_{21}^{scale} = 0.7$$

$$T_{21}^{shift_x} = F_B^{end_x}$$

$$T_{21}^{shift_y} = 0.5(F_B^{upr_y} - F_B^{end_y}),$$

where $F_B$ is the box metric for node B. These equations specify that the scale of the exponent should be 0.7 of the scale of the expression being exponentiated, the x-coordinate of the origin of the exponent should be the same as if these two expressions were being multiplied (namely equal to the endpoint of the image constituent at node B), and the y-coordinate of the origin of the exponent should be halfway between the base line and the top of the expression being exponentiated. The values 0.7 and 0.05 are examples of parameter values that can be trained using the training operation of the present invention. The $T_{10}$ function for the rule representing the exponentiation of B by C, would most likely be the identity transformation:

$$T_{10}^{scale} = 1.0$$

$$T_{10}^{shift_x} = 0.0$$

$$T_{10}^{shift_y} = 0.0$$

The $F_0$ function for the rule representing the exponentiation of B by C includes the functions identified in Equations (4)–(7) above for the lower left and upper right coordinates of the bounding box of the image constituent at node A, plus the function for computing the end point. For exponentiation, these could be expressed as $$F_0^{end_x} = \bar{F}_C^{end_x}$$

$$F_0^{end_y} = F_B^{end_y}$$

The training operation for training equation layout parameters was supervised, with an accurate transcription of each training image equation provided to the training operation. In the initial layout grammar, the box metrics for the terminal nodes were known (i.e., the $F_0$ and $T_{10}$ functions for rules of the form A→B were provided), and for nonterminal nodes they were assumed to take the form $$F_0^{end_x} = F_C^{upr_x}$$

$$F_0^{end_y} = F_B^{ll_y}$$

$$T_{10}^{shift_x} = 0.0$$

$$T_{10}^{shift_y} = 0.0$$

$T_{10}^{scale}$ is assumed to be 1. The $T_{21}$ function for all rules was defined to be $$T_{21}^{scale} = 1.0$$

$$T_{21}^{shift_x} = F_B^{end_x}$$

$$T_{21}^{shift_y} = F_B^{end_y}.$$

In this example, all three layout functions were estimated simultaneously. FIGS. 21(a), (b) and (c) are a series of images that illustrate an example of the training process. FIG. 21(a) shows an original equation image 400. FIG. 21(b) shows image equation 410 which is produced using this initial untrained grammar, with the layout functions defined as indicated above; the layout grammar takes a transcription of image 400 and lays it out according to the untrained rules. FIG. 21(c) shows image equation 420 which is produced using the trained layout grammar after one iteration of training using 80 training images; the trained layout grammar takes a transcription of image 400 and lays it out using the trained layout functions associated with each rule.

E. Applications of the Trained 2D Image Model

Figure 23:
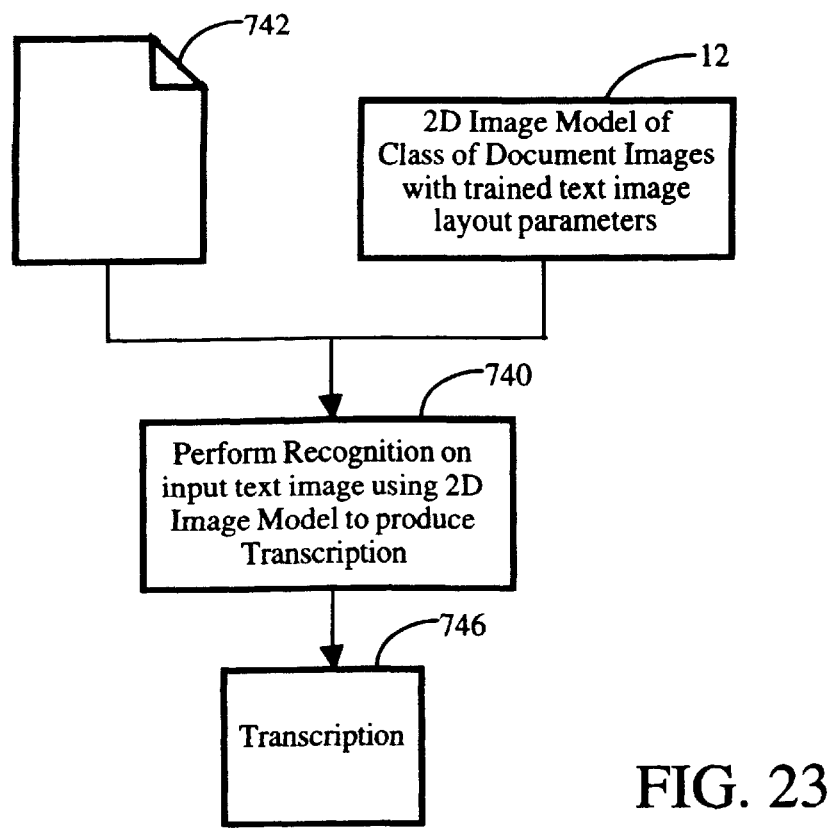
FIG. 23 is a simplified block diagram showing a second application of the trained 2D image grammar of the present invention.
Figure 24:
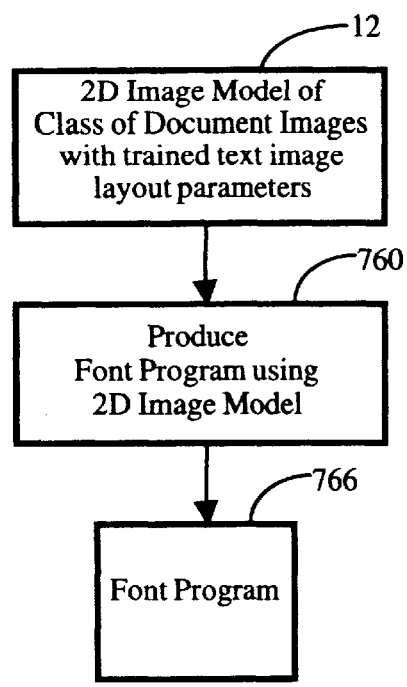
FIG. 24 is a simplified block diagram showing a third application of the trained 2D image grammar of the present invention.

Trained 2D image model 12 produced by training operation 200 (FIG. 1) may be used in a variety of tasks after the layout parameters have been trained. Some of these are illustrated in FIGS. 22, 23 and 24. The trained layout grammar 12 (FIG. 22) may be used in a document production operation 720 where an input transcription 722 of a desired text image and the trained image model 12 are used to generate a document image 726 having the layout specified by model 12 and the content specified by transcription 722. The trained layout grammar 12 (FIG. 23) may also be used in a document recognition operation 740 to produce a transcription 746 of an input image 742 that has the layout of the class of documents modeled by image grammar 12. In addition, one of the results of the training operation may be to train the layout parameters for the box metrics of the terminal symbols. As mentioned earlier, these box metrics are the font metrics of the symbol (see e.g., FIGS. 29 and 30). FIG. 24 shows that the trained image grammar 12 may also be used in an operation 760 to generate a font program 766 that may then be used to generate document images in the font that has been trained.

Figure 25:
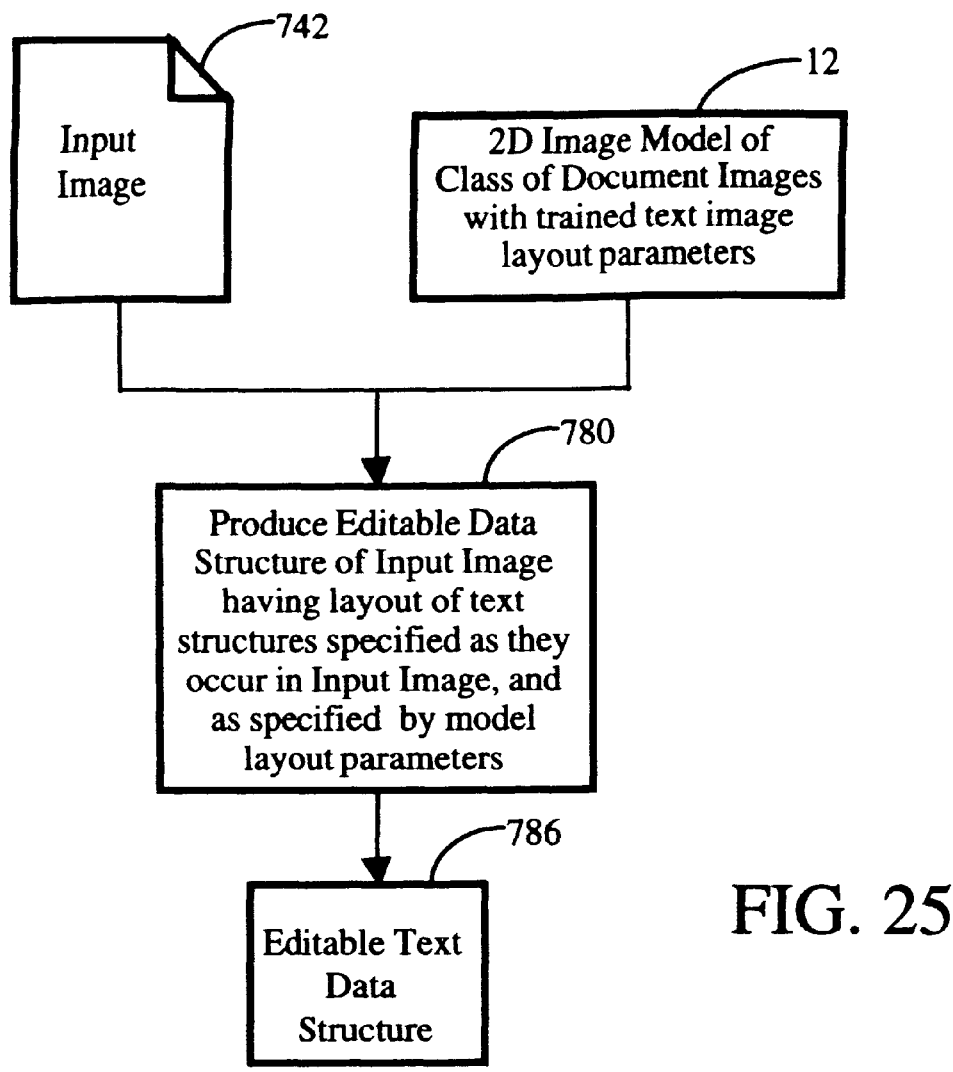
FIG. 25 is a simplified block diagram showing a fourth application of the trained 2D image grammar of the present invention.

Note also that some commercial OCR applications produce a data structure format of the transcription of a recognized document image that is editable by commonly-used word processing applications. This editable data structure represents text structures and relationships between them according to the conventions of the particular application so that these structures can be edited and modified. The representation in this word-processing-editable data structure of certain types of text structures may be improved for images in the class of images modeled by the trained layout grammar by using information derived from the layout parameters in the grammar. For example, with reference to the example shown in FIGS. 17–20, suppose that, as a result of training the layout parameters, it is determined that the Author List rule implements the constant distance between midpoints of successive author blocks (shown in FIG. 19(a)). This information, along with other information about line width, may be used to compute positions of centering tab stops for use in representing the text on these lines in a word-processing-editable data structure that represents image 22 in FIG. 17. Thus, a trained layout grammar may be used to produce a word-processing-editable data structure for an input text image by first performing recognition on the input image and then using information derived from the layout parameters in the model to determine the formatting of certain text structures in the data structure. This application is illustrated in FIG. 25.

F. The Machine Environment and Software Product of the Invention

1. Machine Environment.

Figure 26:
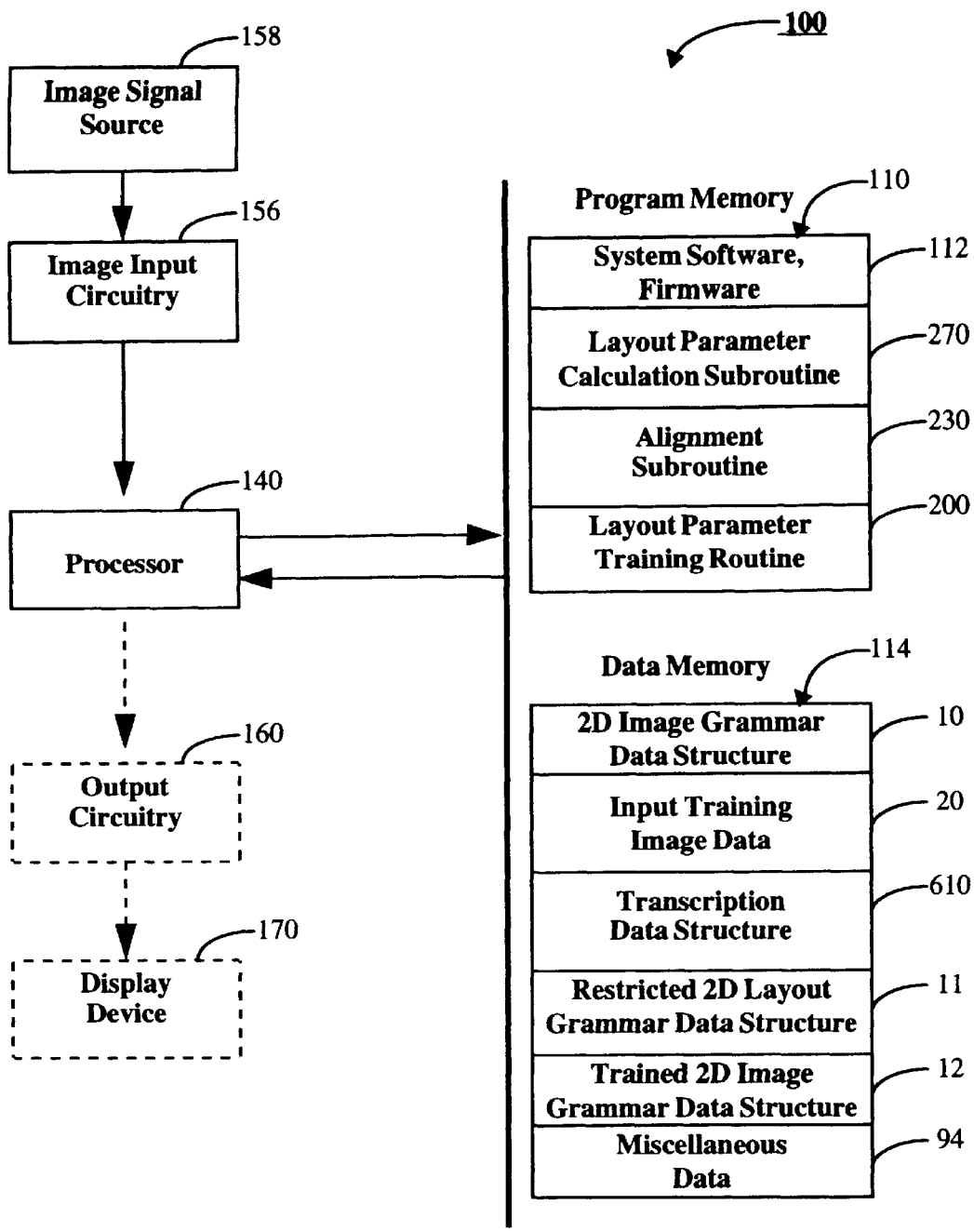
FIG. 26 is a simplified block diagram illustrating the hardware components of the machine that the present invention may operate.

FIG. 26 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed and optimized for the purpose of carrying out the invention, or it may comprise a general purpose computer selectively activated or reconfigured by a computer program stored in the computer, or it may be a combination of a general purpose computer and auxiliary special purpose hardware. When a machine such as machine 100 is suitably programmed to embody the present invention, the machine is not a standard or known configuration.

An image signal source 158 provides the input training image data required by layout parameter training operation 200. Image signal source 158 may be any image data capture device, such as a scanning device, a digital camera, or an interface device that produces a digital image definition data structure from another type of image signal. An input text training image provided by image signal source 158 is forwarded via image input circuitry 156 to processor 140 and may be stored in data memory 114.

Machine 100 may also include input circuitry (not shown) for receiving signals from a signal source for obtaining the data structure or file indicating the 2D image grammar. Such sources include signals from another processor performing an operation, or signals from a memory device. This signal source may also include user interaction devices controllable by a human user that produce signals in response to actions by the user, such as a pointing device or a keyboard. Another type of user interaction device is a stylus device that the user moves over a special data collecting surface, which might be the display area of a display device (not shown). These input signals are also forwarded via input circuitry to processor 140 and may be stored in data memory 114.

Machine 100 may optionally include a conventional display device 170 capable of presenting images, such as a cathode ray tube, a liquid crystal display (LCD) device, a printing device, or any other device suitable for presenting images. Display device 170 and its associated output circuitry 160 are shown as having dashed line outlines to indicate that these components may not be necessary in all implementations of the present invention.

Processor 140 operates by accessing program memory 110 to retrieve instructions, which it then executes. Program memory 110 includes layout parameter training instructions 200 that implement the functions shown in flowchart 200 of FIG. 2. Program memory 110 includes instructions for the subroutines needed to accomplish the training task according to instructions 200. During execution of the instructions, processor 140 may access data memory 114 to obtain or store data necessary for performing its operations. Data memory 114 stores the image definition data structures 20 defining each training image as well as 2D layout grammar data structure 10. Data memory 114 also stores transcription data structure 610 and restricted layout grammar 11; transcription data structure 610 is used in the illustrated embodiment to produce restricted layout grammar which is used by alignment subroutine 230 to produce the annotated parse tree. Data memory 114 may also store the trained 2D image grammar 12 after training is completed. Data memory 114 also stores various other miscellaneous data 94 necessary for carrying out training operation 200 in accordance with the present invention.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.)

2. The Software Product of the Invention.

Figure 27:
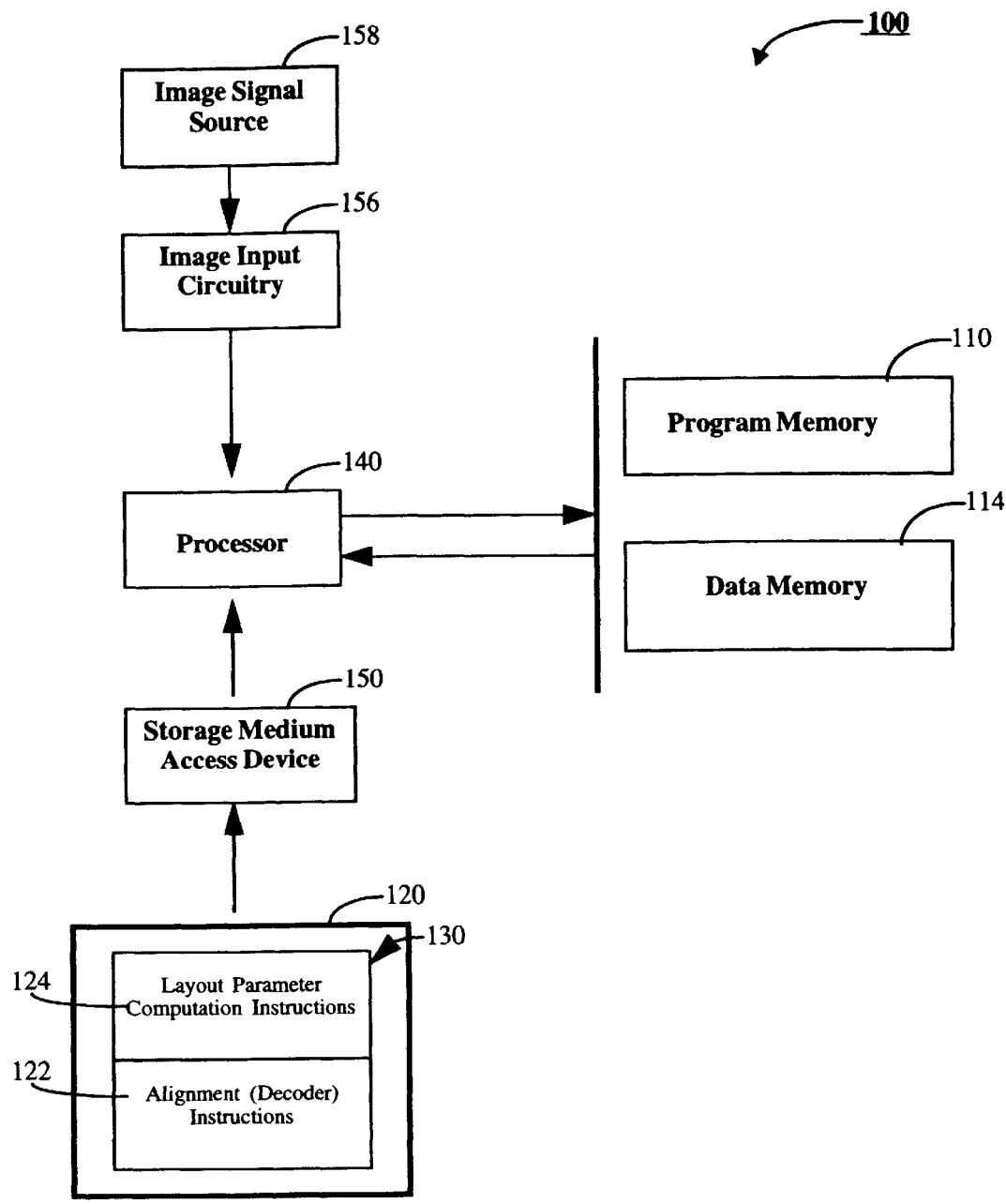
FIG. 27 is a simplified block diagram illustrating the software product of the present invention and its relationship to the machine that the present invention may operate.

FIG. 27 shows software product 120, an article of manufacture that can be used in a machine that includes components like those shown included in machine 100. Software product 120 includes data storage medium 130 that can be accessed by storage medium access circuitry 150. Data storage medium 130 stores instructions for executing the operation of the present invention for training layout parameters in the 2D image grammar, as illustrated in FIGS. 1, 2 and 3, and may include instructions for performing the method according to the illustrated embodiment of the invention illustrated in the flowcharts of FIGS. 4, 14 and 15.

Software product 120 may be commercially available to a consumer in the form of a shrink-wrap package that includes data storage medium 130 and appropriate documentation describing the product. In that case, a data storage medium is a physical medium that stores instruction data and includes one or more distinct units of a medium that together store a body of data. Examples of data storage media include magnetic media such as one or more floppy disks, diskettes and PC cards (also known as PCMCIA memory cards), optical media such as one or more CD-ROMs, and semiconductor media such as semiconductor ROMs and RAMs. "Storage medium access circuitry" is circuitry that can access data on a data storage medium. Storage medium access circuitry 150 may be contained in a distinct physical device into which data storage medium 130 is inserted in order for the storage medium access circuitry to access the data stored thereon. Examples of storage medium access devices include disk drives and CD-ROM readers. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 130 when data storage medium 130 is stored as part of a remotely-located storage device, such as a server in a networked client-server environment. Software product 120 may be commercially or otherwise available to a user in the form of a data stream indicating instruction data for performing the method of the present invention that is transmitted to the user over a communications facility from the remotely-located storage device. In the latter case, article 120 is embodied in physical form as signals stored on the remotely-located storage device; the user purchases or accesses a copy of the contents of data storage medium 130 containing instructions for performing the present invention, but typically does not purchase or acquire any rights in the actual remotely-located storage device. When software product 120 is provided in the form of a data stream transmitted to the user over a communications facility from the remotely-located storage device, instruction data stored on data storage medium 130 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

Data storage medium 130 stores instruction data which is provided to processor 140 for execution when the method for training layout parameters of a 2D image grammar is to be used. The stored data includes all of the instruction data necessary to perform training operation 200 according to the flowchart of FIG. 2. FIG. 27 illustrates two representative sets of instructions that are provided: alignment instructions 122 and layout parameter computation instructions 124. When alignment instructions 122 are provided to processor 140, and processor 140 executes them, the machine is operated to perform the alignment of a training image with the 2D image grammar, as represented in box 230 of FIG. 2, or in box 348 in the flowchart of the illustrated embodiment in FIG. 15. When parameter layout computation instructions 124 are provided to processor 140, and processor 140 executes them, the machine is operated to compute values for the layout parameters using the training data, as represented in box 270 of FIG. 2.

G. Miscellaneous Features

The invention has been described herein in relation to software implementations, but the invention might be implemented with specialized hardware.

There are at least two methods for improving the performance of the decoder to produce the annotated parse tree, $T^\alpha$. In Equation (20), the $p_E(r_i)$ term describes how well the trees $T_1^\alpha$ and $T_2^\alpha$ are laid out relative to one another. However, because $p_E(r_i)$ is a Gaussian distribution it never drops to zero. This means there is a non-zero probability that any two nodes in the grammar model can be combined. Furthermore, if $T^\alpha$ is a large parse tree representing a significant portion of the image and $T_1^\alpha$ is a small parse tree composed of two very unlikely subtrees, then it may be the case that $P(O|T^\alpha)$ is less than $P(O|T_1^\alpha)$. This means that the decoder removes $T_1^\alpha$ from the OPEN list before it removes $T^\alpha$. However, the decoder should not waste time processing $T_1^\alpha$ because it has such a small probability of being in the final parse tree. Therefore, to capture the notion that small unlikely expressions should be ignored, the decoder discards any node $T^\alpha$ in which $p_E(r_i)<$thres. The quantity thres is referred to as the "rule threshold" and should be a value appropriately chosen given the accuracy of the layout model and the quality of the image. In an actual implementation of the decoder it was found that when $-\log(\text{thres})$ increases past 3000, the recognition time grows rapidly ii without improving performance. Therefore the optimal value for $-\log(\text{thres})$ is approximately 3000.

The layout model allows two image constituents (e.g., two subimages $O_1$ and $O_2$, in an input training image) to have arbitrary overlap, and ultimately to be placed on top of each other. However, in practice, although the bounding boxes of adjacent image constituents or characters may overlap to a certain extent, the probability of them being directly on top of one another is actually quite small. To capture this intuition the decoder has an "overlap" parameter, expressed as a percentage. The decoder discards a node if $$\frac{black(O_1 \cap O_2)}{black(O_1)} > overlap$$

or $$\frac{black(O_1 \cap O_2)}{black(O_2)} > overlap$$

As a result of the actual implementation, it was found that the overlap percentage decreased accuracy when it was set too small, and drastically increased recognition time (without an improvement in accuracy) when it was set too large.

H. Appendix

The following discussion provides technical background about document recognition in a communication theory framework. This material is excerpted and paraphrased from the Kopec and Chou, "Document Image Decoding" reference and from the Chou and Kopec, "A stochastic attribute grammar model" reference, both of which are cited above in the Background section. The latter reference discusses document recognition using a stochastic context-free attribute grammar. A document recognizer based on the technology discussed in the Kopec and Chou, "Document Image Decoding" reference is disclosed in U.S. Pat. No. 5,321,773.

Document Image Decoding (DID) refers to the process of document recognition within a communication theory framework. In the communication theory view, a message, or string, carried in a logical structure is communicated by encoding the structure and message as an ideal image, transmitting the ideal image through a noisy channel, and decoding the degraded image into a message and logical structure as close to the original structure and message as possible, on average. In this framework, the document recognizer performs optimal reconstruction by explicitly modeling the source of logical structures and messages, the encoding procedure, and the channel noise; thus, the document recognizer is essentially a decoder that inverts the effects of the encoder and noisy channel. Ambiguities are resolved by knowledge of the prior probabilities of different logical structures and messages. The logical structure of a message can be viewed as the relative relationships between message substrings (as opposed to their actual physical positions in an image), and, for brevity, a message and its logical structure will be collectively referred to as a logical document structure.

Figure 28:
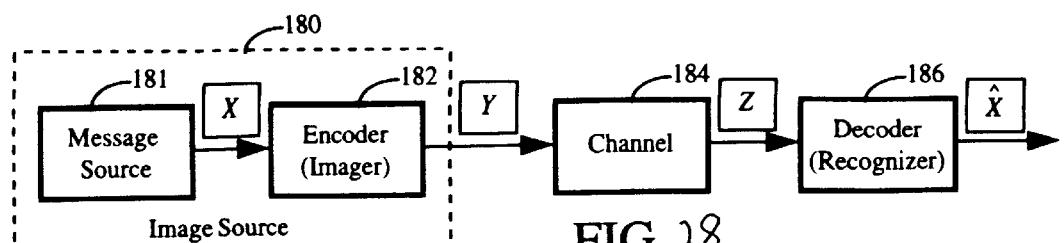
FIG. 28 is a schematic block diagram representing a communications theory framework for document generation and recognition.

More specifically with reference to FIG. 28, a source 181 (e.g., a person), randomly produces logical document structure X; an imager 182, or encoder, encodes X into an ideal bitmapped image Y; a channel 184, such as a printer, a scanner, and everything in between, randomly degrades Y into an observed bitmapped image Z; and a recognizer 186, or a decoder, deterministically maps Z into a reconstructed logical document structure $\hat{X}$. The optimal decoder 186 in this framework is the deterministic function g that minimizes the expected error between the source structure X and the reconstructed structure $\hat{X}$. That is, the optimal g minimizes El(X, g(Z)), where l(X, $\hat{X}$) is a loss function appropriate for the problem. For example, a loss function appropriate for the problem of document recognition may be an editing distance between X and $\hat{X}$. A simple special case is the 0-1 loss function, $$l(X, \hat{X}) = \begin{cases} 0 & \text{if } X = \hat{X} \\ 1 & \text{otherwise} \end{cases} \quad (H.1)$$

For this loss function, it is well known that the optimal decoder g is the maximum a posteriori (MAP) rule $$\hat{X} = g(Z) = \underset{X}{\operatorname{argmax}} P(X \mid Z), \quad (H.2)$$

where P(X|Z) is the posterior probability of X given Z. That is, the optimal decoder 186 (FIG. 28) chooses the most likely underlying logical document structure X based on the observed noisy scanned image Z. But by Bayes' rule, P(X|Z)=P(X, Z)|P(Z)=$\Sigma_y$P(X, Y, Z)|P(Z), and since X, Y, Z is a Markov chain, P(X, Y, Z)=P(X)P(Y|X)P(Z|Y). Furthermore since logical document structure X is encoded by encoder 182 deterministically as Y=f(X) for some function f, P(Y|X) equals 1 if Y=f(X) and equals 0 otherwise. Hence the MAP rule (H.2) becomes $$\hat{X} = g(Z) = \underset{x}{\operatorname{argmax}} P(X)P(Z \mid f(X)). \quad (H.3)$$

To implement the optimal decoder g in a real-world document recognition system, it is fundamentally important to realistically model the source P(X), the encoder f(X), and the channel P(Z|Y); and to efficiently perform the arg max over all X.

As just noted, in the communication theory framework illustrated in FIG. 28, document recognition is the inverse of document production, and a document recognizer 186 incorporates within it an explicit model of the document production source 180. In U.S. Pat. No. 5,321,773, an example of the document recognizer is implemented using as a source a 2D image model having the form of a stochastic regular grammar. Reference should be made to the patent for a complete mathematical description of this image source, but it may be briefly summarized as follows: The structure of a set of images is captured formally by modeling image source 180 (FIG. 28) as a Markov source consisting of a finite set of states (nodes, vertices) $\mathcal{N}$ and a set of directed transitions (branches, edges) $\mathcal{B}$. Each transition t connects a pair of states. With each transition t is associated a 4-tuple of attributes ($Q_t$, $m_t$, $a_t$, $\vec{\Delta}_t$), where $Q_t$ is a template, $m_t$ is a message string, $a_t$ is a transition probability, and $\vec{\Delta}_t$ is the vector displacement of t. A path in a Markov source is a sequence of transitions with their associated attributes: a composite message formed by concatenating the message strings of the transitions of the path, and a composite image formed from placing a template at its associated position. The set of messages generated by complete paths through an image source is a regular language and the source model itself is a finite-state automaton that accepts that language. Thus, an implementation of the 2D image source model disclosed in U.S. Pat. No. 5,321,773 models document images as a regular grammar that defines a relation between message strings and images by way of an underlying path and the mathematical relationships that define a composite message string and a composite image.

A Markov source defines a probability distribution on complete paths and induces a probability distribution on messages. A grammar with associated probabilities is called a "stochastic" grammar, and parametrically models the probability distribution of strings in the language, thus modeling structural as well as stochastic constraints. A major advantage of stochastic grammars over non-stochastic grammars is that ambiguity is resolved in a natural way, by ranking different parse trees of the same sentence in order of their probability, and choosing the most likely. Thus, the goal of the document production source model represented as a stochastic grammar is to assign a probability to every valid composite message string.

As noted in Chou and Kopec, "A stochastic attribute grammar model," a document recognizer can also be based on a stochastic attribute grammar model of document production. Using the model illustrated in FIG. 28 and set forth above, identify logical document structure X as a parse tree, P(X) (the source) as a stochastic attribute grammar, and f(X) (the encoder) as a syntax-directed translation, which is defined briefly below. Attribute grammars invite the use of compiler technology to efficiently perform the arg max, and the decoder can be regarded as a parser for the observed image Z. By choosing P(Z|Y) to be an independent binary noise, the arg max can be specified recursively which leads to a dynamic program for the optimal decoder g.

When the source model that produces logical document structure X (having message M) is a stochastic context-free attribute grammar, the following concepts, definitions and notation apply. Grammar $\mathcal{G}=(\mathcal{V}, \mathcal{T}, \mathcal{P}, S)$, where $\mathcal{V}=\{A, B, C, \ldots\}$ is a set of variables, or nonterminal symbols, $\mathcal{T}=\{a, b, c, \ldots\}$ is a set of terminal symbols, and $S \in \mathcal{V}$ is a start symbol. $\mathcal{P}=\{A \rightarrow \sigma, B \rightarrow \tau, \ldots\}$ is a finite set of production rules, where A is a variable and $\sigma$ is a string of symbols from $(\mathcal{V} \cup \mathcal{T})$. Elements of $\mathcal{P}$ are written as r: $\alpha \rightarrow \beta$, where r is a unique label. Associated with each production rule r is a probability P(r) such that $0<P(r)\leq 1$, and for each variable A, $\Sigma_{r: A \rightarrow \sigma} P(r)=1$. A parse tree, denoted as T, represents logical document structure X. The probability of a parse tree T is $$P(T) = \prod_i P(r_i) \tag{H.4}$$

where $r_i$ is the rule used at the ith internal node of the parse tree. This can be written recursively as $$P(T) = P(r_0)\prod_k P(T_k) \tag{H.5}$$

where $T_1, T_2, \ldots T_k$ are children of T and $r_0$ is the production rule for the root of T. A parse tree can be generated at random by placing the start symbol at the root and selectively applying production rules according to their probabilities until only terminal symbols remain at the leaves. The resulting parse tree is the logical document structure produced by source 181 (FIG. 28). The process of selectively choosing a production rule according to its probability induces a probability measure on a parse tree and the message it creates.

An attribute grammar is specified by declaring for each symbol in the grammar a collection of attributes, each of which may be either "synthesized" or "inherited", and by associating with each production rule a collection of functions that includes a function called a synthesis function for each synthesized attribute on the left side of the rule and a function called an inheritance function for each inherited attribute on the right side of the rule. A production rule in a stochastic attribute grammar is written as r: $A \rightarrow \beta$, p(r)({$f_i$}, {$g_i$}), where p(r) is the probability of the rule, and the $f_i$ and $g_i$ are the synthesis and inheritance functions of the production rule. (The subscripted f and g functions distinguish this notation for the synthesis and attribute functions in the production rules from the notation of the deterministic mapping function f of the encoder and the decoder function g used elsewhere in this discussion.) The synthesis and inheritance functions take as arguments the other attributes appearing in the rule, that is, the inherited attributes on the left and the synthesized attributes on the right. The synthesis functions compute the values of the synthesized attributes of the symbol on the left side of the production rule from the values of the synthesized attributes of the symbols on the right side of the production rule. The inheritance functions compute the value of the inherited attributes of the symbols on the right side of the production rule based on the synthesized and inherited attributes of the symbol on the left side of the production rule.

In any parse tree in an attribute grammar, each instance of a symbol maintains its own attribute values. The attributes that do not depend on any other attributes are the synthesized attributes at the leaves and the inherited attributes at the root. These attributes are initialized before other attributes are computed. Thus, given a parse tree T in which each node is labeled by a symbol and in which each internal node is also labeled by a production rule, and given the initial values of the inherited attributes at the root and the values of the synthesized attributes at the leaves, the synthesized attributes at each node can be computed (bottom up) from attributes of its children, and the inherited attributes at each node can be computed (top down) from attributes of its parent and siblings, according to a schedule of evaluation determined in general by a directed acyclic graph of the attribute dependencies. The attributes on which no other attributes depend are the inherited attributes at the leaves and the synthesized attributes of the root. These attributes are considered the end product of the computations. The process of computing the attributes for the symbols in a parse tree is called "annotating" or "decorating" the parse tree, and a parse tree for which the attributes have been computed is referred to as an annotated parse tree or a decorated parse tree. A syntax-directed translation of parse tree T refers to the value of any synthesized attribute of the root or the values of any inherited attribute of the leaves of a parse tree T in an attribute grammar, i.e., the end product of annotating or decorating the parse tree.

In the context of the present invention, two additional restrictions placed on the attribute grammar source model simplify the construction of a decoder. First, every production takes the form $A \rightarrow B$ or $A \rightarrow BC$, where B, $C \in (\mathcal{V} \cup \mathcal{T})$. Secondly, the grammar is assumed to be unambiguous, which means every valid message string, M, corresponds to one and only one parse tree. With these two restrictions, P(M) can be written using equation H.5 above as $$P(M)=P(T)=p(r_0)p(T_1)p(T_2)=p(r)P(M_1)P(M_2), \tag{H.6}$$

where, as noted earlier, T is a parse tree representing M. In addition, for purposes of the present invention herein, a synthesis function will depend only on the synthesized attributes of its children, and an inheritance function will depend only on the inherited attributes of its parents and the synthesized attributes of its siblings.

With reference again to FIG. 28, when source 181 is a stochastic context-free attribute grammar that produces logical document structure X having message M, encoder 182 is a deterministic mapping f from a parse tree T to an ideal bitmapped image, denoted as Y in FIG. 28; this mapping is the syntax directed translation of T, and must map logical document structure X carrying a message, M, to ideal bitmapped image Y; thus, the attributes declared for, and the synthesis and inheritance functions associated with, the production rules that comprise T must provide the necessary layout information to produce Y. This is accomplished by associating with each symbol in the grammar synthesized attributes called "box metrics," inherited attributes called "coordinate transformations," and synthesized attributes called "bitmaps".

Figure 29:
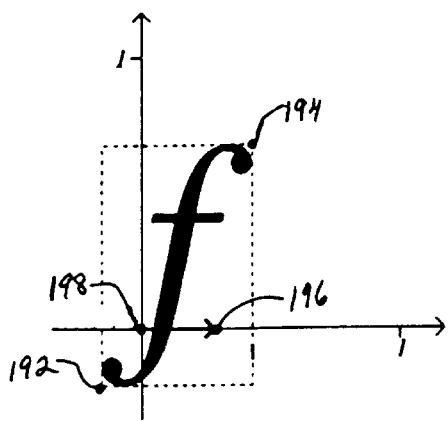
FIGS. 29 and 30 illustrate the font metrics of characters modeled according to the sidebearing model of letterform shape description and positioning used in the 2D image grammar of the present invention.

The box metric attributes of a symbol extend the notion of font metrics for a single character to metrics for a spatially localized collection (or box) of characters that are represented by that symbol. With reference to FIG. 29, the font metrics for a character consist of three two-dimensional vectors. The first two vectors, $(x_l, y_b)$ and $(x_r, x_t)$ represent the left bottom and right top corners 192 and 194, respectively, of the bounding box of the character in its local (character) coordinate system. The third vector, $(x_e, y_e)$, represents the endpoint 196 of the character from its origin 198, which is typically the location of the origin of the next character in the coordinate system of the current character, as shown in FIG. 30. (This is the same convention that is followed in the page description language PostScript®.) As can be seen in FIG. 30, character bounding boxes may overlap. Line 199 through origins 198 and 196 along $(x_e, y_e)$ is the baseline of a character. The local coordinate system of the character is oriented with x increasing to the right and y increasing upward, and is scaled so that unity equals the pointsize of the font, i.e., the nominal spacing between baselines in close-set type.

In a 2D image model of the type illustrated as image source 180 in FIG. 28, which models a document image as a stochastic attribute grammar as summarized above, the box metric attributes for a symbol when the symbol is a single character (i.e., when it is a terminal symbol) are precisely the font metrics for the character. The box metrics for a symbol when the symbol represents a collection of characters, such as a paragraph or paragraph fragment (i.e., when it is a nonterminal symbol) consist also of vectors $(x_l, y_b)$ and $(x_r, x_t)$ for the bounding box of the collection of characters in a local coordinate system, and usually also the vector $(x_e, y_e)$, representing a distinguished point where the origin of the "next" symbol (i.e., collection of characters) should be positioned. Sometimes additional vectors can be associated with a symbol, indicating other geometrically distinguished points, such as the locations of various character baselines. The size, or scale, of the local coordinate system for collection of characters is typically set so that unity equals the predominant point size in the collection. Thus, the box metric attributes of any nonterminal symbol define a rectangular region in the ideal image that includes the rectangular regions of its component, or child, symbols. A rectangular image region can be referred to as a "frame" and the box metrics of any frame can be computed from the box metrics of the frames of its components. Thus it can be seen that the box metrics for an entire ideal, page image, i.e., the root of the parse tree, can be computed in a bottom-up fashion from the leaves to the root.

Since each frame defined by the box metrics of a symbol is defined in the local coordinate system for that symbol, coordinate transformations are required to transform the local coordinates for each frame into a "global coordinate system" (also called the "root" or "page coordinate system") for the ideal image. The (inherited) coordinate transformation attributes of a symbol represent the coordinate transformation G (which is typically affine) that accomplishes this mapping, specified as $$G: (x, y) \mapsto (x, y)\begin{bmatrix} a_{11} & a_{12} \\ a_{21} & a_{22} \end{bmatrix} + (x_0, y_0). \tag{H.7}$$

The global coordinate system may be defined arbitrarily to be located at the left bottom corner of the first page, with x increasing to the right and y increasing upward, and scaled so that unity equals 1 point. Any such affine transformation can be represented by six parameters. It may suffice in practice to represent G by two, three, or four parameters, depending on whether G can be restricted to a simple translation, a uniform scaling followed by a translation, a uniform scaling followed by a rotation and a translation, or a non-uniform scaling (independent in x and y) followed by a translation. More generally. G could be some non-linear transformation and could require a large number of parameters for its specification. A possible additional piece of global coordinate transformation information is the page number. Page numbers can be interpreted as integer translations along a third axis, whose origin is located on page 0.

The coordinate transformation attributes for all the symbols in a parse tree can be computed top down, given the coordinate transformation at the root. At the internal nodes of the tree using a rule for a symbol A to lay out a series of component symbols along some baseline, the coordinate transformation of the component symbols can be computed from the coordinate transformations of A using functions associated with the rule: For example, the functions associated with the rule could provide for the scaling matrices of the component symbols to equal the scaling matrix for A, and the translations for the component symbols to equal the translation for A plus the endpoints of all the previous component symbols.

The bitmap attribute for a symbol is a bitmap of an ideal, page-sized image (at least conceptually). The bitmap attributes for all the symbols in a parse tree can be computed bottom up, given the coordinate transformations of every leaf. In principle this can be done by rendering or imaging each leaf into its bitmap at the appropriate coordinate transformation, and then ORing the bitmaps up through the tree. The bitmap at the root then becomes the ideal image Y. In practice, this computation can be done simply by rendering the leaves one at a time onto a single page-sized image.

In summary, the present invention provides a technique for automatically training text image layout parameters that enables the creation of powerful and flexible image grammars for describing the layout structure and content of images. Examples shown include images of equations that typically have very complex layout structures where image constituents are positioned with respect to one another above and below base lines of, and overlapping with, adjacent image constituents.

In addition to the, stochastic context-free attribute grammar used as the 2D image model in the illustrated embodiment, any 2D image model having the characteristics and properties defined above is suitable for use in the present invention and is intended to be encompassed by the appended claims. Other image representations that provided the required functionality specified herein are also intended to be included in the definition of a 2D image model. For example, SGML Document Type Definitions ("DTD's") are context-free-grammar-like formalisms for defining classes of documents that enable such documents to be processed by SGML software tools. An SGML DTD is similar, though not formally identical, to a context-free attribute grammar. A stochastic version of an SGML DTD defined with the functionality as specified for a 2D image model herein could serve as an alternative image model for the present invention.

Although the invention has been described in relation to various implementations, together with modifications, variations and extensions thereof, other implementations, modifications and extensions are within the scope of the invention, and neither this description nor the drawings are intended to limit the invention in any way. Accordingly, the invention as described herein is intended to embrace all modifications and variations that are apparent to those skilled in the art and that fall within the scope of the appended claims.

We claim:

1. A method for operating a processor-controlled machine to determine an unknown value of a text image layout parameter used with a two-dimensional (2D) image model; the machine including a signal source for receiving data; memory for storing data; and a processor connected for accessing instruction data which is stored in the memory for operating the machine; the processor being further connected for receiving data from the signal source; and connected for storing data in the memory; the method comprising:

obtaining a data structure indicating a 2D image model modeling as an image grammar an image layout structure common to a class of 2D text images; the 2D image model including a production rule indicating that first and second image constituents occurring in a 2D text image consistent with the image layout structure produce a third image constituent occurring therein; the production rule including a text image layout parameter that indicates the spatial relationship between the first and second image constituents; a value of the text image layout parameter being unknown;

receiving a plurality of input two-dimensional (2D) text image data structures from the signal source; each input 2D text image represented by the plurality of input 2D text image data structures having the image layout structure common to the class of 2D text images and including at least one occurrence of first and second image constituents;

for each respective input 2D text image, producing a data structure, using the 2D image model, indicating first and second image positions in the input 2D text image identifying respective locations of the first and second image constituents therein; and obtaining document-specific measurement data about the first and second image constituents from the data structure; and computing a value for the text image layout parameter using the document-specific measurement data obtained from the data structures for the respective input 2D text images; the value computed for the text image layout parameter representing a class-specific value for all text images in the class of 2D input text images being modeled by the 2D image model.

2. The method for determining an unknown value of a text image layout parameter according to claim 1 wherein the production rule specifies the spatial relationship between the first and second image constituents as a mathematical function of a characteristic of at least one of the first and second image constituents; the mathematical function including the text image layout parameter as a parameter therein;

obtaining document-specific measurement data from the data structure includes determining a value for the mathematical function indicating the spatial relationship between the first and second image constituents in a respective input 2D text image; and computing a value for the text image layout parameter using the document-specific measurement data includes computing the value using the values for the mathematical function measured from each respective input training image.

3. The method for determining an unknown value of a text image layout parameter according to claim 2 wherein the characteristic of the at least one of the first and second image constituents is a physical characteristic including at least one of a size, magnitude, dimension, proportion, and extent of the image constituent.

4. The method for determining an unknown value of a text image layout parameter according to claim 2 wherein obtaining document-specific measurement data indicating the spatial relationship between the first and second image constituents identified therein includes obtaining data specified by the mathematical function to produce an equation having the text image layout parameter as an unknown parameter thereof; obtaining document-specific measurement data producing at least one equation for each respective input 2D text image; processing the plurality of input 2D text images producing a plurality of equations, each having the text image layout parameter as an unknown parameter thereof; and computing a value of the text image layout parameter using the document-specific measurement data includes solving the plurality of equations to obtain the value.

5. The method for determining an unknown value of a text image layout parameter according to claim 2 wherein the mathematical function specified by the 2D image model having the text image layout parameter as a parameter thereof is a linear function of the text image layout parameter.

6. The method for determining an unknown value of a text image layout parameter according to claim 2 wherein the mathematical function having the text image layout parameter as a parameter thereof computes image coordinates of a bounding box of the third image constituent using the text image layout parameter and image coordinate data of bounding boxes of the first and second image constituents; the mathematical function including a plurality of text image layout parameters indicating a scaling and translation of the second image constituent relative to the first image constituent.

7. The method for determining an unknown value of a text image layout parameter according to claim 1 wherein producing the data structure indicating the image positions identifying respective locations of the first and second image constituents in the input 2D text image includes prior to producing the data structure, constraining the 2D image model to produce a restricted 2D image model that models only the layout structure of the input 2D text image; and performing an alignment operation to align the restricted 2D image model with the input 2D text image.

8. The method for determining an unknown value of a text image layout parameter according to claim 7 further including receiving a transcription data structure associated with each of the plurality of 2D input text images; and wherein constraining the 2D image model to produce a restricted 2D image model uses the transcription data structure to produce the restricted 2D image model.

9. The method for determining an unknown value of a text image layout parameter according to claim 1 wherein computing the value for the text image layout parameter using the document-specific measurement data includes solving an optimization problem that determines a value for the text image layout parameter indicating the optimal spatial relationship between the first and second image constituents for the document-specific measurement data obtained from all of the respective input 2D text images.

10. The method for determining an unknown value of a text image layout parameter according to claim 9 wherein solving the optimization problem includes computing a maximum likelihood estimate as the value for the text image layout parameter.

11. The method for determining an unknown value of a text image layout parameter according to claim 10 wherein computing a maximum likelihood estimate as the value for the text image layout parameter includes using a least squares technique to compute the value.

12. The method for determining an unknown value of a text image layout parameter according to claim 1 wherein
the 2D image model models the class of 2D text images as a stochastic context-free attribute grammar; the production rule indicating a mathematical function representing the spatial relationship between the first and second image constituents as a function of a characteristic of at least one of the first and second image constituents; the text image layout parameter being a parameter of the mathematical function; and
the data structure indicating the image positions identifying respective locations of the first and second image constituents in the input 2D text image is an annotated parse tree indicating the layout structure and message content of the input 2D text image.

13. The method for determining an unknown value of a text image layout parameter according to claim 1 wherein the 2D image model includes a plurality of text image layout parameters each indicating a spatial relationship between a respective pair of plural pairs of first and second image constituents; a value of at least a first one of the text image layout parameters being unknown; and wherein the method further includes
prior to receiving the plurality of input 2D text images, receiving a signal from the signal source indicating a selected text image layout parameter selected from the plurality of text image layout parameters; and
wherein computing a value for the text image layout parameter includes computing a value for the selected text image layout parameter using the document-specific measurement data obtained from the data structures for the respective input 2D text images.

14. The method for determining an unknown value of a text image layout parameter according to claim 1 wherein the 2D image model that models the class of documents is a generative image grammar; the 2D generative image grammar being capable of synthesizing a 2D text image having a message content of an input message string arranged in the layout structure of the class of documents being modeled.

15. The method for determining an unknown value of a text image layout parameter according to claim 1 wherein the text image layout parameter indicates a scaling and translation of the second image constituent relative to the first constituent.

16. The method for determining an unknown value of a text image layout parameter according to claim 1 wherein the 2D image model that models the image layout structure common to a class of 2D text images represents each of the first and second image constituents as an image region defined by a bounding box; and wherein the production rule producing the third image constituent allows for the bounding boxes of the first and second image constituents to overlap.

17. A method for operating a processor-controlled machine to determine an unknown value of a text image layout parameter used with a two-dimensional (2D) image grammar; the machine including a signal source for receiving data; memory for storing data; and a processor connected for accessing instruction data which is stored in the memory for operating the machine; the processor being further connected for receiving data from the signal source; and connected for storing data in the memory; the method comprising:
obtaining a data structure indicating a 2D image grammar modeling a class of 2D text images as a stochastic context-free attribute grammar; the 2D image grammar including a production rule indicating that first and second image constituents occurring in a 2D text image included in the class produce a third image constituent occurring therein; the production rule indicating a mathematical function representing a spatial relationship between the first and second image constituents as a function of a characteristic of at least one of the first and second image constituents; the mathematical function including a text image layout parameter as a parameter therein; the text image layout parameter indicating the spatial relationship between the first and second image constituents; a value of the text image layout parameter being unknown;
receiving a plurality of input two-dimensional (2D) text image data structures from the signal source; each input 2D text image represented by the plurality of input 2D text image data structures having the image layout structure common to the class of 2D text images and including at least one occurrence of first and second image constituents;
for each respective input 2D text image,
producing an annotated parse tree representation of a layout and content of a respective input 2D text image using the 2D image grammar; and
obtaining from the annotated parse tree document-specific measurement data about the spatial relationship between the first and second image constituents and a document-specific value of the mathematical function indicated by the production rule producing the third image constituent from the first and second image constituents occurring in the 2D text image; and
constructing an overall function representing the document-specific measurement data and document-specific function values obtained for all input 2D text images as a function of the text image layout parameter; and
solving the overall function for an optimal value of the text image layout parameter.

18. The method for determining an unknown value of a text image layout parameter according to claim 17 wherein the optimal value of the text image layout parameter is a most likely value thereof computed using a maximum likelihood estimation procedure.

19. The method for determining an unknown value of a text image layout parameter according to claim 17 wherein the characteristic of the at least one of the first and second image constituents is a physical characteristic including at least one of a size, magnitude, dimension, proportion, and extent of the image constituent.

20. The method for determining an unknown value of a text image layout parameter according to claim 17 wherein the overall function of document-specific measurement data is a linear function of the text image layout parameter.

21. The method for determining an unknown value of a text image layout parameter according to claim 20 further including receiving a transcription data structure associated with each of the plurality of 2D input text images; and wherein constraining the 2D image grammar to produce the restricted 2D image grammar uses the transcription data structure to produce the restricted 2D image grammar.

22. The method for determining an unknown value of a text image layout parameter according to claim 17 wherein producing the annotated parse tree includes prior to producing the annotated parse tree, constraining the 2D image grammar to produce a restricted 2D image grammar that models only the layout structure of the input 2D text image; and performing an alignment operation to align the restricted 2D image grammar with the input 2D text image.

23. The method for determining an unknown value of a text image layout parameter according to claim 17 wherein the stochastic context-free attribute grammar that models the class of documents is a generative image grammar; the generative image grammar being capable of synthesizing a 2D text image having a message content of an input message string arranged in the layout structure of the class of documents being modeled.

24. An article of manufacture for use in a machine that includes a memory device for storing data; a storage medium access device for accessing a medium that stores data; and a processor connected for accessing the data stored in the memory device and for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, obtaining a data structure indicating a 2D image model modeling as an image grammar an image layout structure common to a class of 2D text images; the 2D image model including a production rule indicating that first and second image constituents occurring in a 2D text image consistent with the image layout structure produce a third image constituent occurring therein; the production rule including a text image layout parameter that indicates the spatial relationship between the first and second image constituents; a value of the text image layout parameter being unknown;

the processor, further in executing the instructions, receiving a plurality of input two-dimensional (2D) text image data structures from the signal source; each input 2D text image represented by the plurality of input 2D text image data structures having the image layout structure common to the class of 2D text images and including at least one occurrence of first and second image constituents;

the processor, still further in executing the instructions, for each respective input 2D text image, producing a data structure, using the 2D image model, indicating first and second image positions in the input 2D text image identifying respective locations of the first and second image constituents therein; and obtaining document-specific measurement data about the first and second image constituents from the data structure;

the processor, still further in executing the instructions, computing a value for the text image layout parameter using the document-specific measurement data obtained from the data structures for the respective input 2D text images; the value computed for the text image layout parameter representing a class-specific value for all text images in the class of 2D input text images being modeled by the 2D image model.

25. The method for determining an unknown value of a text image layout parameter according to claim 24 wherein the 2D image model that models the class of documents is a generative image grammar; the 2D generative image grammar being capable of synthesizing a 2D text image having a message content of an input message string arranged in the layout structure of the class of documents being modeled.

* * * * *